(12) United States Patent
Takeya et al.

(10) Patent No.: US 6,240,054 B1
(45) Date of Patent: *May 29, 2001

(54) MULTIPLE LAYER DISK REPRODUCING APPARATUS, AND APPARATUS FOR REPRODUCING INFORMATION RECORD MEDIUM

(75) Inventors: Noriyoshi Takeya; Hideki Kobayashi, both of Tokorozawa (JP)

(73) Assignee: Pioneer Electronic Corporation, Tokyo-to (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/855,369

(22) Filed: May 13, 1997

(30) Foreign Application Priority Data

May 15, 1996 (JP) .................................................. 08-144966
Jun. 7, 1996 (JP) .................................................. 08-145346

(51) Int. Cl.[7] .................................................. G11B 7/095
(52) U.S. Cl. .................................... 369/44.29; 369/53.28; 369/53.37
(58) Field of Search ............................ 369/44.26, 44.27, 369/44.28, 44.29, 54, 58

(56) References Cited

U.S. PATENT DOCUMENTS 5,263,011  11/1993 Maeda et al. ..................... 369/44.27
5,612,939 * 3/1997 Ueki et al. .

FOREIGN PATENT DOCUMENTS

724256 A2  7/1996 (EP) .

* cited by examiner

Primary Examiner—W. R. Young
(74) Attorney, Agent, or Firm—Pitney, Hardin, Kipp & Szuch LLP

(57) ABSTRACT

An apparatus for reproducing a multiple layer disk, which comprising a plurality of layers each having an information record surface on which record information is recorded, is provided with: a read device for reading the record information from each of the layers; a reproduction process device for applying a predetermined reproduction process to the record information read by the read device in accordance with a reproduction process parameter, which is set therein and which comprises at least one of a gain value and an equalizer value, to thereby output a reproduction information signal; a drive device for driving the read device to jump from one reading state for reading one of the layers to another reading state for reading another of the layers; a memory for storing a plurality of reproduction process parameters corresponding to the layers in advance of reproduction; and a set device for reading out one of the stored reproduction process parameters, corresponding to another of the layers as a destination of jumping of the read device, from the memory and setting the read out reproduction process parameter in the reproduction process device, in case that the read device is driven to jump by the drive device.

11 Claims, 28 Drawing Sheets

FIG. 8
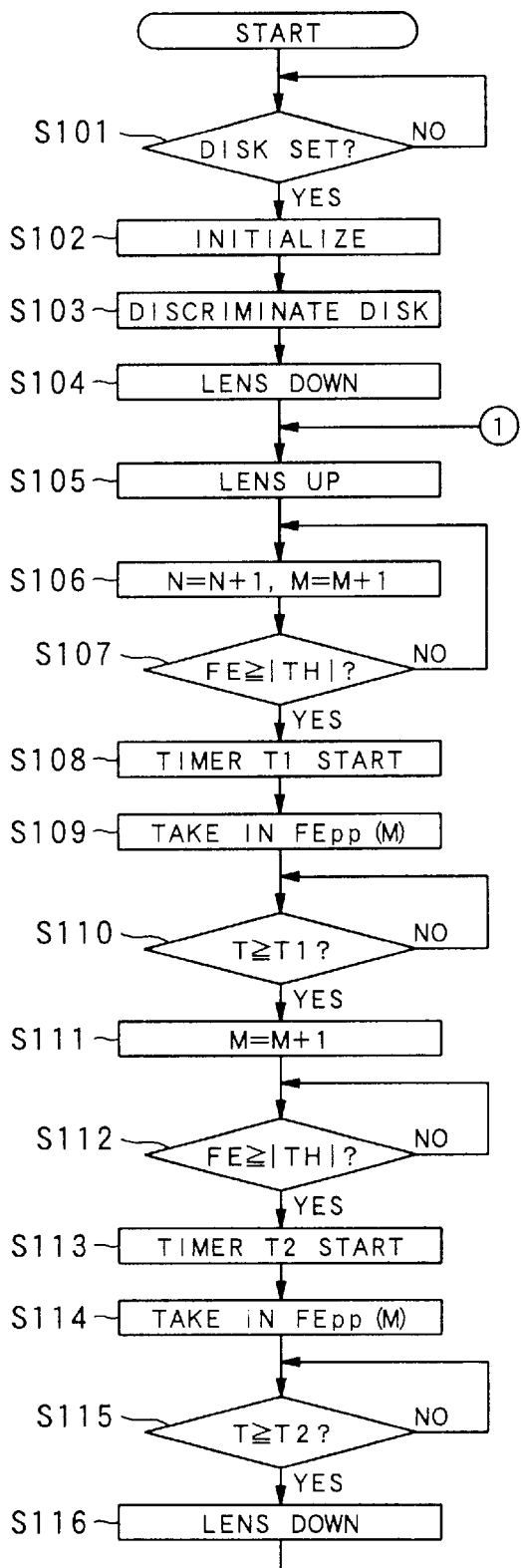
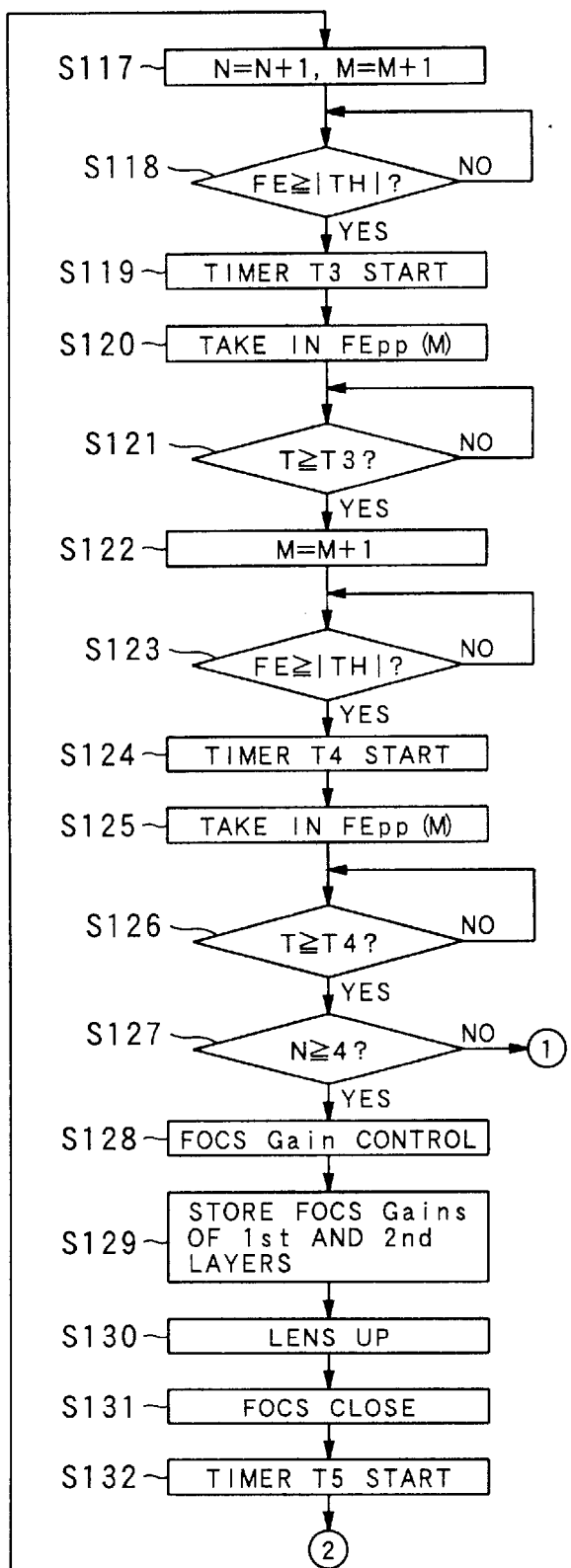

FIG. 26
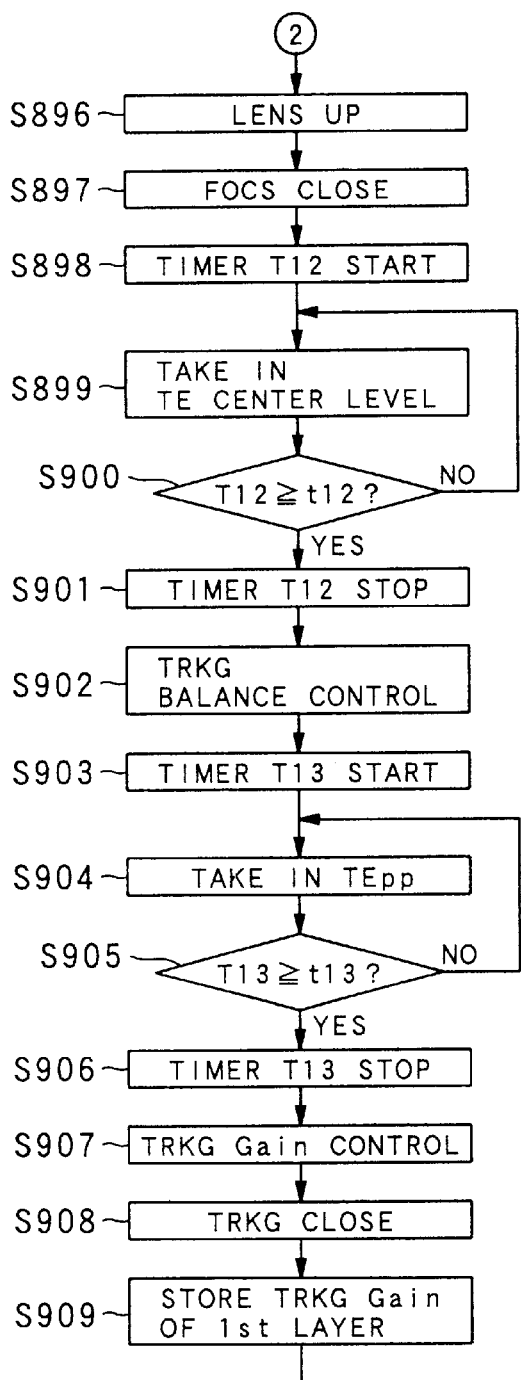
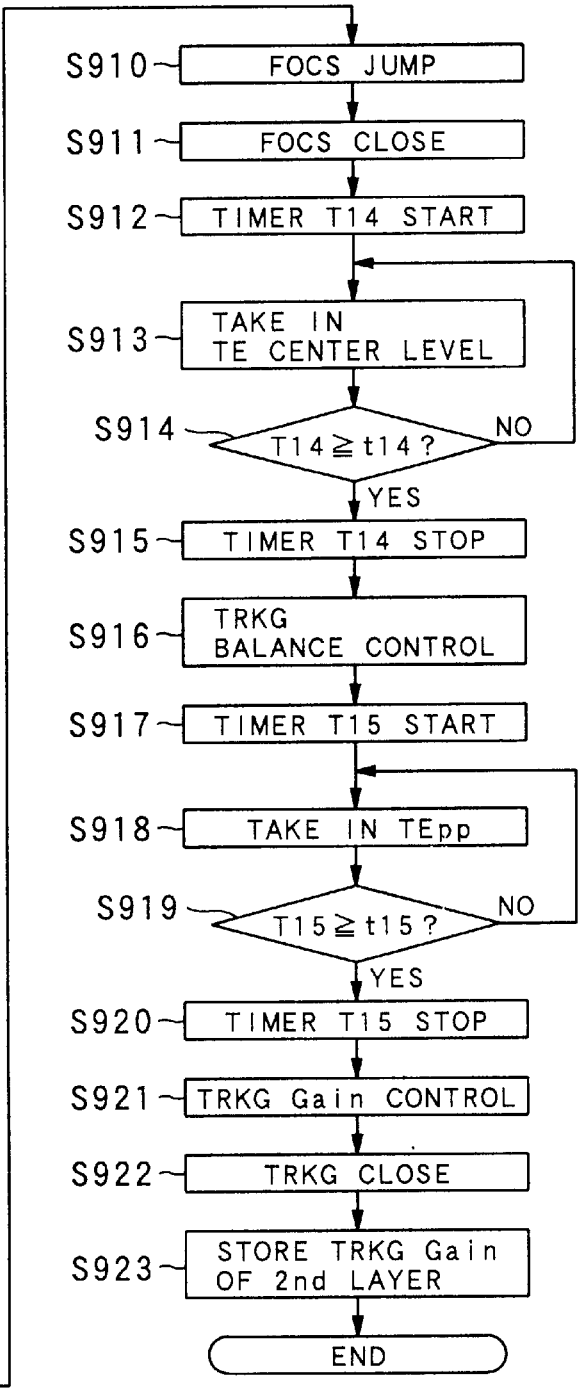

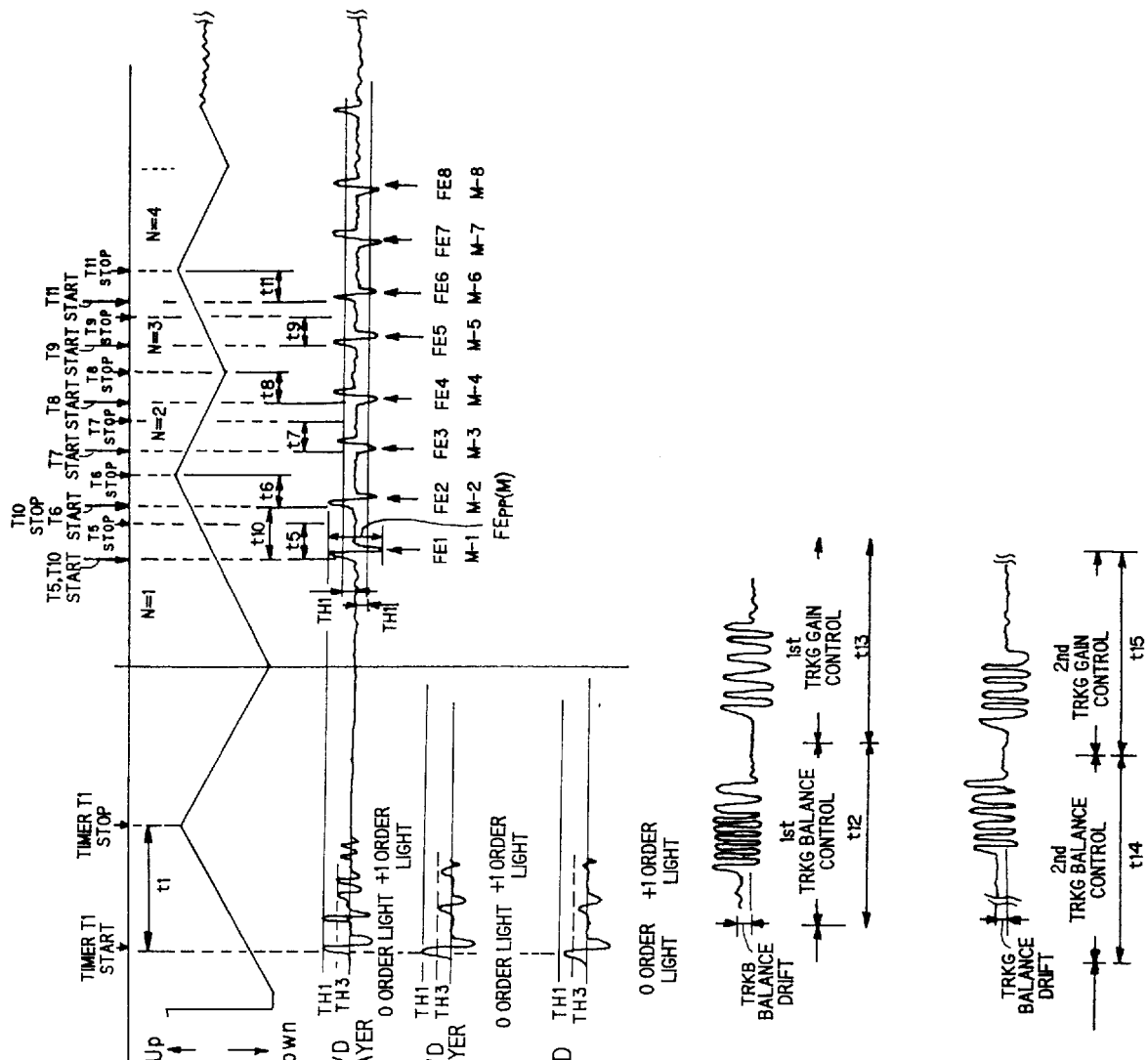
FIG. 28A
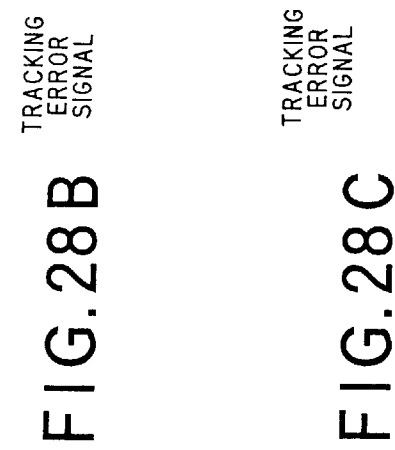
FIG. 28B
FIG. 28C

MULTIPLE LAYER DISK REPRODUCING APPARATUS, AND APPARATUS FOR REPRODUCING INFORMATION RECORD MEDIUM

BACKGROUND OF THE INVENTION

1. Field of the Invention

The present invention is related with an apparatus for reproducing information of an information record medium such as an optical disk, on which the information is recorded magnetically or by means of a phase pit and the like, and in which an information record layer is formed in multiple layers or a one-layer. The present invention is also related with an apparatus for automatically setting, in the reproducing apparatus for reproducing the multiple-layer disk, each loop gain value and/or equalizer value in a focus servo and a tracking servo, and a level value and/or an equalizer value in an RF (Radio Frequency) signal, which are optimal for each layer.

2. Description of the Related Art

Recently, DVD (Digital Video or Versatile Disk) has been remarkably developed which dramatically improves a memory density over a conventional CD and services as a high density record medium that can record one movie and the like.

Although this DVD has a different disk substrate thickness from the CD, the principle of reading a record pit responsible for storing information is similar to that of the CD. Thus, a CD/DVD compatible type of a reproducing apparatus may be proposed. In this CD/DVD compatible type of the reproducing apparatus, in order to optimally collect an information recording beam on an information record surface of each disk, it is considered to employ a bifocal lens that can emit two light beams focused on different positions on one straight line, or a method of exchanging lenses so as to change a focal length in corresponding with the type of the disk, or other methods.

Incidentally, in the DVD, it is prescribed that a linear velocity thereof is higher than that of the CD from a request of making a density higher. So, it is necessary that servo gains and servo frequency bands in focus and tracking servo circuits are made different between the CD and the DVD. More actually, the DVD is set to be wider in servo band on a high frequency side than the CD. The DVD is set to be larger in servo gain than the CD.

Therefore, in order to share the servo circuit between the CD and the DVD in the CD/DVD compatible type of the reproducing apparatus, it is necessary to adjust the servo gain and the servo band based on the disk. Namely, prior to a reproduction operation, it is judged whether or not an optical disk to be reproduced is the CD or the DVD. The servo gain and the servo band for the disk are correctly adjusted on the basis of a signal indicative of a reflectance factor of the optical disk based on the judged result, for example, the S-shaped signal of the focus error, an RF signal or the like. The once adjusted value is maintained until the disk is exchanged.

There are a single layer disk, where an information record surface on which a pit responsible for recording the information is recorded is composed of a single layer, and a multiple-layer disk having a plurality of record layers (for example, two layers) within a same thickness portion, in the DVD. In a case of the multiple-layer disk, there is, for example, such a problem that if a gain set for a record layer of a first layer in a two-layer disk is used for a record layer in a second layer as it is, the optimization is not performed at the record layer in the second layer, because of a relative slope between the respective record layers, different reflectance factors of the respective record layers, and other reasons. To solve this problem, it is enough to perform a setting operation of the gain on the basis of the focus error signal and the like so as to set to a gain corresponding to the record layer at the jump destination, each time the reading beam is jumped from the record layer in the first layer to the record layer in the second layer during reproducing or from the record layer in the second layer to the record layer in the first layer. However, in this case, initial setting for the gain and the band should be carried out each time the jump operation between the layers is performed. This results in a problem that the jump operation takes a long time to complete. Therefore, in a case of recording a series of related information, such as movies or the like, over two layers, the jump operation between the layers causes a continuous reproduction to be interrupted.

In this manner, there is a first problem in the above mentioned reproducing apparatus.

On the other hand, to reproduce the DVD, an apparatus is used which comprises an optical pickup for collecting light beams on a focus position of an information record layer of the DVD and keeps a distance between an object lens of the optical pickup and the information record layer constant by using a focus servo control, to stably read the information.

Here since an area in which a servo error signal can be detected is narrow in this focus servo control, a so-called focus search operation is required. In this focus search operation, prior to performing the focus servo control, a servo loop is made open, the objective lens is moved by a predetermined amount in a direction vertical to the information record layer, and a zero cross of a focus error signal (S-shaped signal) outputted at that time is checked, and thereby the servo loop is made close.

However, in case of the DVD of the multiple-layer disk type, since the information record layer is composed of multiple layers so as to record much information, it is required to perform the focus search operation for each layer, to reproduce such a multiple-layer disk from one side thereof.

That is, in a case of the multiple-layer disk type of the reproducing apparatus, it is necessary to jump the objective lens of the optical pickup to an appropriate position, each time the information record layer to be reproduced is switched. However, since intervals between the respective information record layers are different from each other in the respective disks within a disk standard, it is not possible to unconditionally set the jump amount. Thus, a standard position for the focus servo must be set by performing the focus search operation for each disk and each layer.

Therefore, in a case of the conventional apparatus for performing the focus search operation, it is necessary to detect the zero cross of the focus error signal each time the information record layers are switched. As a result, it is difficult to quickly switch between the information record layers in the multiple-layer DVD.

In this manner, there is a second problem in the above mentioned reproducing apparatus.

SUMMARY OF THE INVENTION

It is therefore a first object of the present invention, from the viewpoint of the above mentioned first problem, to provide a multiple-layer disk reproducing apparatus, which can quickly perform a stable servo control, even if the reading beam is jumped between the layers, at a time of reproducing the record information from the multiple-layer disk.

It is therefore a second object of the present invention, from the viewpoint of the above mentioned second problem, to provided an apparatus for reproducing the DVD or the like, which can perform a quick reproducing operation at a time of switching the record layers of the DVD or the like, in which the information record layers may be formed in multiple layers.

The above mentioned first object of the present invention can be achieved by a first apparatus for reproducing a multiple layer disk comprising a plurality of layers each having an information record surface on which record information is recorded. The first apparatus is provided with: a read device for reading the record information from each of the layers; a reproduction process device for applying a predetermined reproduction process to the record information read by the read device in accordance with a reproduction process parameter, which is set therein and which comprises at least one of a gain value and an equalizer value, to thereby output a reproduction information signal; a drive device for driving the read device to jump from one reading state for reading one of the layers to another reading state for reading another of the layers; a memory for storing a plurality of reproduction process parameters corresponding to the layers in advance of reproduction; and a set device for reading out one of the stored reproduction process parameters, corresponding to another of the layers as a destination of jumping of the read device, from the memory and setting the read out reproduction process parameter in the reproduction process device, in case that the read device is driven to jump by the drive device.

According to the first apparatus of the present invention, a plurality of reproduction process parameters corresponding to the layers are stored in the memory in advance of reproduction. In reproduction, the record information is read from each of the layers, by the read device such as an optical pickup. Then, a predetermined reproduction process is applied to the record information in accordance with a reproduction process parameter, which is set therein and which comprises at least one of a gain value and an equalizer value, by the reproduction process device, such as an RF amplifier, a low pass filter, an A/D converter, a focus gain controller, a digital equalizer and the like. Thus, the reproduction information signal is outputted from the reproduction process device. In case that the read device is driven by the drive device to jump from one reading state for reading one of the layers to another reading state for reading another of the layers, one of the stored reproduction process parameters, corresponding to this another of the layers as a destination of jumping of the read device, is read out from the memory, by the set device. Further, this read out reproduction process parameter is set in the reproduction process device, by the set device. Accordingly, after jumping, the predetermined reproduction process is applied to the record information appropriately in accordance with the reproduction process parameter, which readily corresponds to the layer at the jump destination. Therefore, it is not necessary to measure or determine the gain value and/or the equalizer value for the layer at the jump destination each time the jump is performed. Thus, a stable and quick servo control can be performed, even if the jumping operation between the layers is performed, according to the first apparatus of the present invention.

In one aspect of the first apparatus of the present invention, the memory stores the reproduction process parameters each comprising at least one of the gain value of a focus servo loop for the reproduction process device and the gain value of a tracking servo loop for the reproduction process device.

According to this aspect, since the gain value of the focus servo loop and/or the gain value of the tracking servo loop are stored in the memory, the stability of each servo loop in reproduction can be improved, so that the servo control operation can be quickly and stably performed.

The above mentioned first object of the present invention can be also achieved by a second apparatus for reproducing a multiple layer disk comprising a plurality of layers each having an information record surface on which record information is recorded. The second apparatus is provided with: a read device having an objective lens for optically reading the record information from each of the layers through the objective lens; a reproduction process device for applying a predetermined reproduction process to the record information read by the read device in accordance with at least one of a gain value and an equalizer value of a focus servo loop, and a gain value and an equalizer value of another servo loop other than the focus servo loop, which are set therein, to thereby output a reproduction information signal and a focus error signal corresponding to the reproduction information signal; a drive device for driving the read device to move the objective lens in a focus direction of the objective lens; a first measurement device for measuring at least one of the gain value and the equalizer value of the focus servo loop for each of the layers on the basis of the focus error signal of each of the layers; a second measurement device for measuring at least one of the gain value and the equalizer value of another servo loop for one of the layers on the basis of a reflectance factor of one of the layers; a memory for storing the measured gain values and equalizer values measured by the first and second measurement devices; a calculation device for calculating a ratio of at least one of the gain value and the equalizer value of the focus servo loop for one of the layers with respect to those for another of the layers; and a set device for setting the gain value and the equalizer value of another servo loop for another of the layers on the basis of the ratio calculated by the calculation device, to the reproduction process device.

According to the second apparatus of the present invention, in reproduction, the record information is optically read from each of the layers through the objective lens, by the read device. Then, a predetermined reproduction process is applied to this record information in accordance with at least one of a gain value and an equalizer value of a focus servo loop, and a gain value and an equalizer value of another servo loop other than the focus servo loop (e.g., a tracking servo loop, a spindle servo loop), which are set therein, by the reproduction process device. Thus, a reproduction information signal and a focus error signal corresponding to the reproduction information signal are outputted by the reproduction process device. In case that the read device is driven to move the objective lens in a focus direction of the objective lens between the layers, by the drive device, at least one of the gain value and the equalizer value of the focus servo loop for each of the layers is measured on the basis of the focus error signal of each of the layers, by the first measurement device. Further, at least one of the gain value and the equalizer value of another servo loop (e.g., a tracking servo loop, a spindle servo loop) for one of the layers is measured on the basis of a reflectance factor of this one of the layers, by the second measurement device. Then, these measured gain values and equalizer values are stored in the memory. Then, a ratio of the gain value and/or the equalizer value of the focus servo loop for this one of the layers with respect to those for another of the layers is calculated by the calculation device. Finally, the gain value and the equalizer value of another servo loop (e.g. a tracking servo loop, a spindle servo loop) for another of the layers is set on the basis of the calculated ratio to the reproduction process device, by the set device. Accordingly, before or after moving the objective lens in the focus direction, the predetermined reproduction process is applied to the record information appropriately in accordance with the gain value and/or the equalizer value, which readily corresponds to the layer before or after the movement of the objective lens. Since the gain value and/or the equalizer value of the servo loop for the layer or layers other than one layer is obtained by use of the ratio, the stability of each servo loop in reproduction can be improved while the servo control operation can be more stably and quickly performed, according to the second apparatus of the present invention.

In one aspect of the second apparatus of the present invention, the first measurement device takes in focus error signals of all the layers from the reproduction process device while the objective lens is moved up or down just once, to thereby measure at least one of the gain value and the equalizer value of the focus servo loop for each of the layers.

According to this aspect, the focus error signals of all the layers are taken in while the objective lens is moved up or down just once. Thus, the servo control operation can be even more stably and quickly performed.

On the other hand, in another aspect of the first apparatus of the present invention, the first apparatus is further provided with a detection device for detecting a maximum amplitude value of an RF signal of each of the layers, from the record information read by the read device. The memory stores at least one of the gain value and the equalizer value for the RF signal, which are obtained from the maximum amplitude value detected by the detection device.

According to this aspect, a maximum amplitude value of an RF signal of each of the layers, is detected from the record information read, by the detection device. Then, at least one of the gain value and the equalizer value for the RF signal, which are obtained from the maximum amplitude value detected by the detection device, are stored in the memory. Therefore, it is possible to reproduce the RF signal accurately in reproduction.

The above mentioned first object of the present invention can be also achieved by a third apparatus for reproducing a multiple layer disk comprising a plurality of layers each having an information record surface on which record information is recorded. The third apparatus is provided with: a read device for reading the record information from each of the layers; a detection device for detecting a maximum amplitude value of an RF signal of each of the layers, from the record information read by the read device; a reproduction process device for applying a predetermined reproduction process to the record information read by the read device in accordance with a reproduction process parameter, which is set therein and which comprises at least one of a gain value and an equalizer value, to thereby output a reproduction information signal; a memory for storing a plurality of predetermined reproduction process parameters in advance of reproduction; and a selection device for selecting one of the predetermined reproduction process parameters stored in the memory, on the basis of the maximum amplitude value detected by the detection device, and setting the selected reproduction process parameter in the reproduction process device.

According to the third apparatus of the present invention, a plurality of predetermined reproduction process parameters are stored in the memory in advance of reproduction. In reproduction, the record information is read from each of the layers, by the read device. Then, a maximum amplitude value of an RF signal of each of the layers is detected from the record information read, by the detection device. Then, a predetermined reproduction process is applied to this record information in accordance with a reproduction process parameter, which is set therein and which comprises at least one of a gain value and an equalizer value, by the reproduction process device. Thus, a reproduction information signal is outputted by the reproduction process device. At this time, if the layer to be reproduced is changed, one of the predetermined reproduction process parameters stored in the memory is selected on the basis of the detected maximum amplitude value, by the selection device. And that, the selected reproduction process parameter is set in the reproduction process device. Therefore, since the gain value and/or the equalizer value can be selected from the memory in accordance with the maximum amplitude value, the servo control operation for the RF signal can be reproduced quickly by use of the gain value and/or the equalizer value, which readily corresponds to the pertinent layer without the necessity of measuring and/or calculating the gain value and/or the equalizer value of the RF signal for the pertinent layer, according to the third apparatus of the present invention.

The above mentioned second object of the present invention can be achieved by a fourth apparatus for reproducing an information record medium comprising one or a plurality of layers each having an information record surface on which record information is recorded. The fourth apparatus is provided with: a read device having an objective lens for optically reading the record information from the information record surface through the objective lens; a reproduction process device for applying a predetermined reproduction process to the record information read by the read device, to thereby generate a reproduction information signal and a focus error signal corresponding to the reproduction information signal; a drive device for driving the read device to move the objective lens in a focusing direction of the objective lens according to a control signal; a time counting device for measuring a time interval between two successive focus error signals generated by the reproduction process device; an interval calculation device for calculating a layer interval between the layers on the basis of the time interval measured by the time counting device if a plurality of focus error signals are generated, which have signal levels exceeding a predetermined standard value set in advance, while the objective lens is moved in either one direction by the drive device; a selection device for selecting one parameter for the control signal, which corresponds to the layer interval calculated by the interval calculation device, among a plurality of parameters for the control signal, which are set in advance to move the objective lens between the layers; a parameter memory for storing the parameter selected by the selection device; and a control device for generating the control signal based on the parameter stored in the parameter memory, and thereby controlling the drive device to drive the read device to move the objective lens.

According to the fourth apparatus of the present invention, in reproduction, the record information is read from the information record surface through the objective lens, by the read device. Then, a predetermined reproduction process is applied to this record information, by the reproduction process device. Thus, a reproduction information signal and a focus error signal corresponding to the reproduction information signal are generated by the reproduction process device. In the operation of the fourth apparatus especially, a time interval between two successive focus error signals generated by the reproduction process device is measured by the time counting device. In this condition, if the read device is driven by the drive device to move the objective lens in the focusing direction according to the control signal i.e., if the objective lens is moved toward or away from the information record medium, the focal point of the objective lens passes through the information record surface of the layer or layers of the information record medium. Thus, the focus error signal is generated in correspondence with the passed information record surface. While the objective lens is moved in either one direction by the drive device in this manner, if a plurality of focus error signals are generated, which have signal levels exceeding a predetermined standard value set in advance, the layer interval (i.e. a distance between the information record surfaces of two adjacent layers) is calculated on the basis of the time interval measured by the time counting device, by the interval calculation device. Namely, such a fact that a plurality of focus error signals, which have signal levels exceeding the predetermined standard value, are generated during the movement of the objective lens in one direction in this way, indicates that the pertinent information record medium is a multiple layer type. Thus, the layer interval of the information record medium can be obtained by the relationship between the moving speed of the objective lens, which is a predetermined value, and the measured time interval. After the layer interval is calculated in this manner, one parameter for the control signal, which corresponds to the calculated layer interval, is selected among a plurality of parameters for the control signal, which are set in advance to move the objective lens between the layers, by the selection device. Then, this selected parameter is stored in the parameter memory. After that, the control signal is generated on the basis of the parameter stored in the parameter memory, by the control device, and that the drive device is controlled according to this generated control signal. Therefore, as long as a reproduction operation is performed with respect to any desirable layer of the pertinent information record medium, by outputting the control signal based on the stored parameter in the parameter memory, the objective lens can be moved to an appropriate position with respect to this desirable layer.

In this manner, it is possible to move the objective lens quickly and accurately so as to position its focal point on the information record surface of any desirable layer of the information record medium even if the information record medium comprises one layer or a plurality of layers, so that the reproduction of such an information record medium can be smoothly performed.

In one aspect of the fourth apparatus of the present invention, the drive device drives the read device to move the objective lens when a pulse signal is applied as the control signal to the drive device. The parameter for the control signal comprises at least one of a pulse width, a peak value, a brake time and a gain up time of the pulse signal.

According to this aspect, the objective lens is moved when the pulse signal is applied to the drive device. At this time, the moving distance and the stability of the movement of the objective lens depends upon the pulse width, the peak value, the brake time and the gain up time of the pulse signal. Therefore, by storing at least one of these parameters and by outputting the control signal based on these stored parameters to the drive device, it is possible to move the objective lens by a desirable moving distance i.e., to move the objective lens quickly and accurately so as to position its focal point on the information record surface of any desirable layer of the pertinent information record medium, so that the reproduction of such an information record medium can be smoothly performed.

In another aspect of the fourth apparatus of the present invention, the fourth apparatus is further provided with a discrimination device for discriminating a type of the information record medium on the basis of the time interval measured by the time counting device, as for the focus error signal, which is generated during a reciprocation motion of the objective lens by the drive device and which exceeds the predetermined standard value.

According to this aspect, if the objective lens is moved toward the information record medium, for example, the time interval from the time point of staring the movement until the focus error signal exceeding the standard value is generated, becomes shorter as the distance from the surface of the information record medium to the information record surface corresponding to the focus error signal becomes shorter, and becomes longer as this distance becomes longer. Further, in case of the information record medium of the multiple layer type, a plurality of successive focus error signals are generated. On the other hand, after the objective lens arrives at its upper limit position, if the objective lens is nextly moved away from the information record medium, for example, the time interval from a time point of starting this movement until the focus error signal firstly exceeding the standard level becomes shorter as the distance from the surface to the information record surface of the information record medium becomes longer, and becomes longer as this distance becomes shorter. Further, in case of the information record medium of the multiple layer type, a plurality of successive focus error signals are generated. Therefore, if the objective lens is moved in this way, the time interval between two successive focus error signals becomes shorter as the distance from the surface to the information record surface becomes longer, becomes longer as this distance becomes shorter, and becomes the shortest in case of the multiple layer type. On the other hand, if the moving order of the objective lens is inverted, an inverse relationship between the time interval and the distance of the above is obtained. In this manner, the type of the information record medium is discriminated by the discrimination device on the basis of the time interval measured by the time counting device, as for the focus error signal, which is generated during a reciprocation motion of the objective lens and which exceeds the predetermined standard value. Furthermore, if the type of the information record medium is discriminated as the multiple layer type, the calculation of the layer interval as well as the selection and storage of the parameter for the control signal based on the calculation result are performed.

Consequently, the movement of the objective lens for the desirable layer of the information record medium can be quickly and accurately performed, and, even in case of the information record medium of the multiple layer type, the reproduction can be smoothly performed. In correspondence with the type of the information record medium, the focus servo control can be performed accurately.

In another aspect of the fourth apparatus of the present invention, the reproduction process device further generates a tracking error signal corresponding to the reproduction information signal. And that, the fourth apparatus is further provided with: a servo calculation device for calculating at least one of a focus gain value and a tracking gain value of each of the layers on the basis of at least one of the focus error signal and the tracking error signal generated by the reproduction process device; a gain memory for storing at least one of the focus gain value and the tracking gain value calculated by the servo calculation device; and a servo control device for performing at least one of a focus servo control and a tracking servo control, on the basis of at least one of the focus gain value and the tracking gain value stored in the gain memory.

According to this aspect, in reproduction, a tracking error signal is further generated by the reproduction process device. Then, at least one of a focus gain value and a tracking gain value of each of the layers is calculated by the servo calculation device on the basis of at least one of the focus error signal and the tracking error signal. For example, the peak to peak values of the focus error signals are taken in and the average of these values is calculated, so that the focus gain value is calculated and stored into the gain memory, while the peak to peak values of the tracking error signals are taken in and the average of these values is calculated, so that the tracking gain value is calculated and stored into the gain memory. In this operation, at the time of taking in the focus error signals, the calculation of the layer interval as well as the selection and storage of the parameter for the control signal is performed. Therefore, in case of reproducing the information record medium of the multiple layer type, the movement of the objective lens for the desirable layer can be performed on the basis of the parameter stored in the parameter memory, and the focus servo control and/or the tracking servo control can be performed on the basis of the focus gain value and/or the tracking gain value stored in the gain memory.

Consequently, the reproduction of the information record medium, which may be the single layer type or the multiple layer type, can be performed even more smoothly.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 8 is one flow chart showing an operation of the second embodiment;

FIG. 26 is another flowchart, continued from FIG. 25, showing the operation of controlling the layer interval measurement in the ninth embodiment;

FIG. 28A is a timing chart showing a moving condition of an objective lens of an optical pickup, a focus error signal obtained thereat and a start and stop operation of a timer in the ninth embodiment;

FIG. 28B is one timing chart of balance control and tracking gain control operations in the ninth embodiment; and FIG. 28C is another timing chart of balance control and tracking gain control operations in the ninth embodiment.

DETAILED DESCRIPTION OF THE PREFERRED EMBODIMENTS

Construction of Reproducing Apparatus

Figure 1:
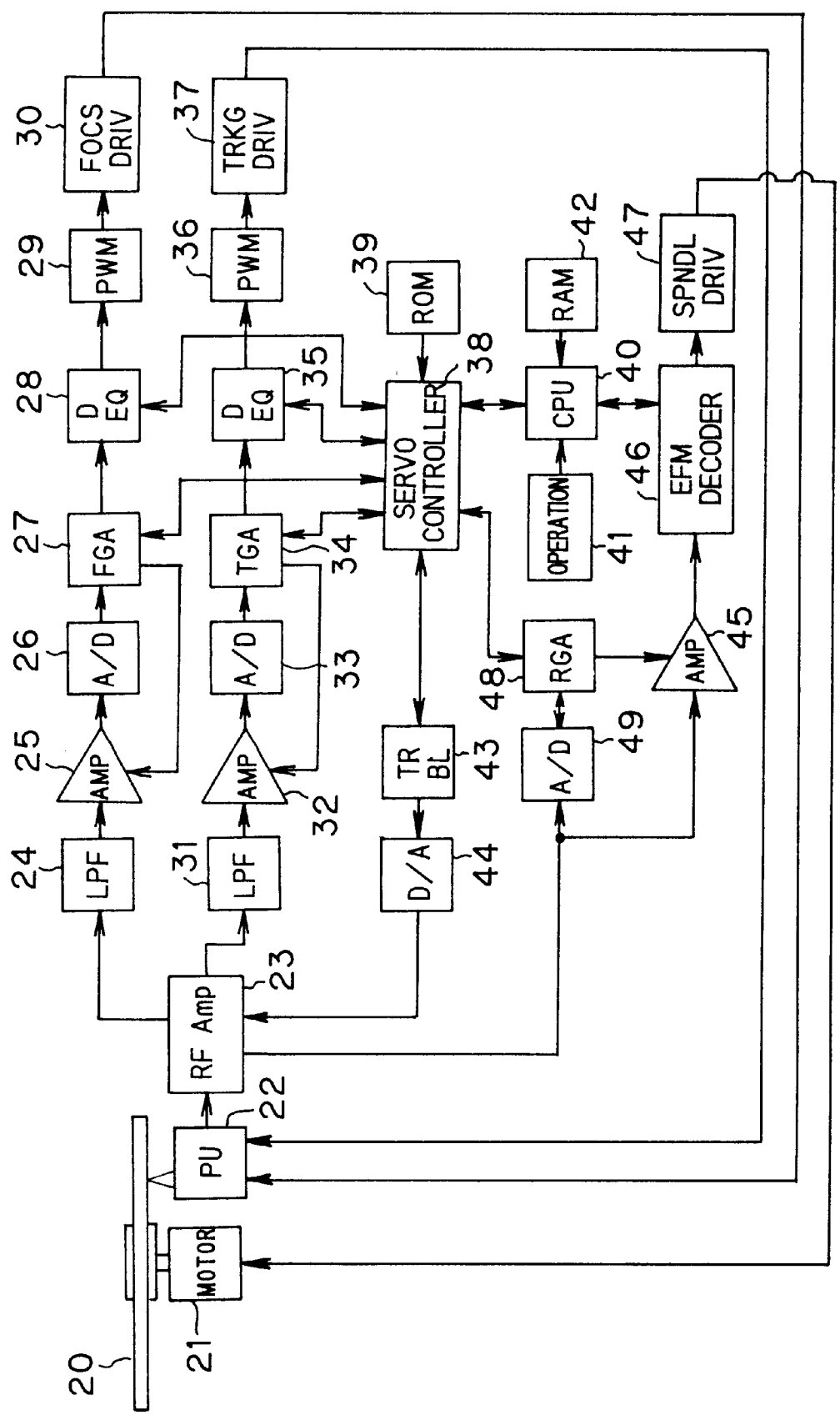
FIG. 1 is a block diagram of a multiple layer disk reproducing apparatus as a first embodiment of the present invention.

FIG. 1 shows a block diagram of a multiple-layer disk reproducing apparatus of an embodiment according to the present invention. An optical disk 20 to be reproduced is rotated at a defined rotation number by a spindle motor 21. An optical pickup 22 employing a bifocal lens reads out information, by means of a light beam, from a pit formed on an information record surface of the optical disk 20. An output signal from the optical pickup 22 is inputted to an RF Amp 23, and is outputted as an analog signal, such as a focus error signal, a tracking error signal or the like. A focus error signal outputted by the RF Amp 23 is sent to a variable amplifier 25, after unnecessary frequency components are removed through an LPF (Low Pass Filter) 24. A gain of this variable amplifier 25 is set by a command from an FGA (Focus GAin controller) 27 described later. An output signal from the variable amplifier 25 is converted from an analog signal into a digital signal by an A/D converter 26, and is then sent to the FGA 27.

An output from the FGA 27 is weighted into particular frequency ranges by a D.EQ (Digital Equalizer) 28, is pulse-width-converted by a PWM (Pulse Width Modulator) 29, and is then supplied to a focus coil (not shown) of the optical pickup 22 by a focus coil drive circuit 30. This PWM 29 is a circuit of sending a signal to the focus coil drive circuit 30. However, a command from a servo controller 38 described later can prevent the PWM 29 from sending the signal to the focus coil drive circuit 30. Thus, the PWM 29 also has a role as a focus loop switch used to make a focus loop in an open path state or a close path state.

On the other hand, the tracking error signal outputted by the RF Amp 23 is supplied to a variable amplifier 32, after unnecessary frequency components are removed through an LPF 31. An output signal from the variable amplifier 32 is converted from an analog signal into a digital signal by an A/D converter 33, and then supplied to a TGA (Tracking GAin controller) 34. An output from the TGA 34 is weighted into particular frequency ranges by a D.EQ 35, is pulse-width-converted by a PWM 36, and is then supplied to a tracking coil (not shown) of the optical pickup 22 by a tracking drive circuit 37. There is also the servo controller 38 for giving commands to the respective circuits on the basis of data obtained by the FGA 27, the TGA 34, the respective D EQs 28 and 35, and the like. Calculation of the data is performed, and the command is given, as the occasion demands, by the servo controller 38. A ROM 39 and a CPU 40, in which respective defined values required by the multiple-layer disk type of the reproducing apparatus are stored, are connected to the servo controller 38.

An operation section 41 and a RAM 42 are connected to this CPU 40. Various information detected at an initial operation in the multiple-layer disk type of the reproducing apparatus is stored in the CPU 40, and read therefrom as the occasion demands. A TR.BL (Tracking Balances control circuit) 43 is connected to the servo controller 38. After a control signal of a tracking balance is converted from a digital signal into an analog signal by a D/A converter 44, a signal is supplied to the RF Amp 23, and the optimal tracking balance is accordingly performed. On the other hand, the RF signal obtained by the RF Amp 23 is supplied through an amplifier 45 to an EFT (Eight to Fourteen Modulation) decoder 46. The spindle motor 21 is driven by a spindle motor drive circuit 47, and thereby the optical disk 20 is rotated at the defined rotation speed.

An RF gain that is optimal for each of the layers in the multiple-layer disk is supplied through an A/D converter 49 to an RGA (RF GAin control circuit) 48, by the command from the servo controller 38. Moreover, the amplifier 45 is controlled by the RGA 48 based on the control signal from the servo controller 38. The optimal data is supplied to the EFT decoder 46. Accordingly, the rotation speed of the spindle motor 21 is monitored and controlled. One example of a bifocal lens employed by the optical pickup 22 is explained here in detail with reference to FIGS. 1A and 1B.

Figure 1A:
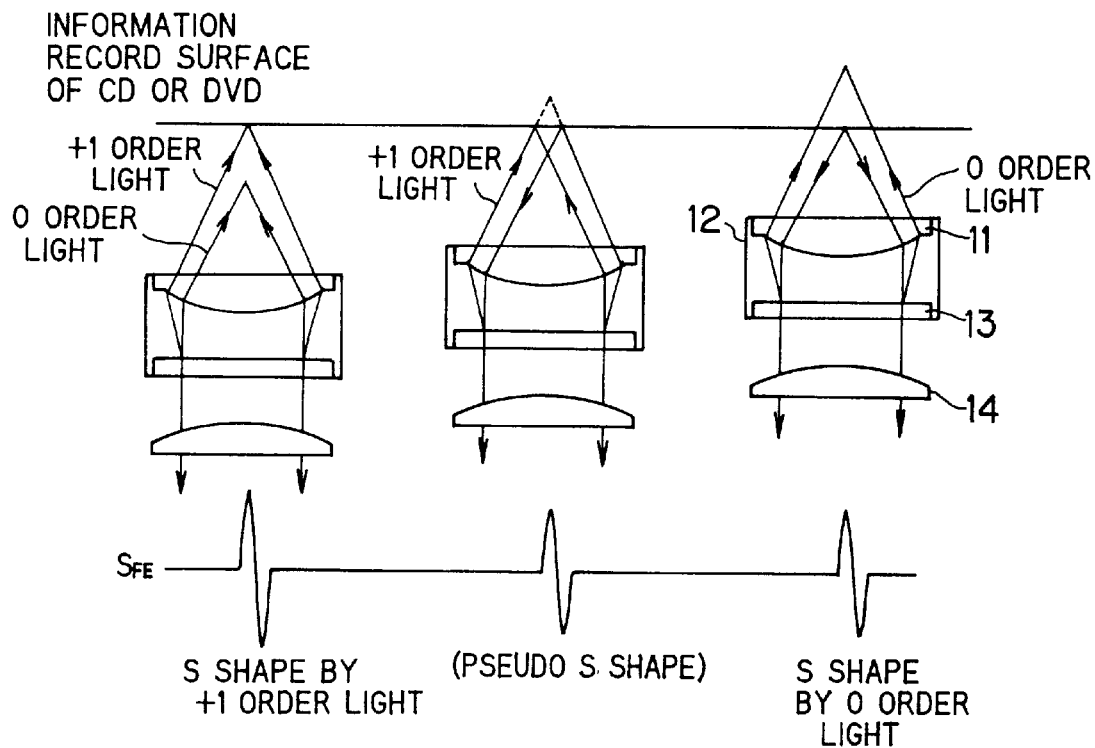
FIG. 1A is one diagram showing a wave form of a focus error generated by an optical pickup of bifocal lens type in a CD/DVD compatible reproducing apparatus for use in the embodiment.

As shown in FIG. 1A, a bifocal lens 12 has a configuration in which a diffraction grating 13 and an objective lens 11 are arranged on one optical path. Light beams made parallel to each other by a collimator lens 14 are divided into three beams: a 0 order light and ±1 order lights, by the diffraction grating 13 (the −1 order light is not shown). Utilization of a difference between the optical path lengths of the 0 order light and the +1 order light among them enables the 0 order light and the +1 order light to be focused on different positions on an one straight line.

Actually, for the information record surface of the DVD or the CD, the +1 order light is adapted to be focused on a farther position from the objective lens 11 than the 0 order light. Thus, the 0 order light is set so as to be optimally collected on the information record surface of the DVD, and the +1 order light is set to be optimally collected on the information record surface of the CD. In a case of considering that an optical pickup using this bifocal lens is gradually made close to an optical disk, the beam of the +1 order light is firstly emitted to the information record surface of the optical disk. Then, an S-shaped signal servicing as a focus error signal is outputted from a four-division photo diode built in the optical pickup (not shown) of the disk reproducing apparatus. Next, an S-shaped signal is obtained which services as a pseudo focus error signal generated when a reflection light from the optical disk of the +1 order light returns through the optical path of the 0 order light. Finally, an S-shaped signal is obtained which services as a focus error signal corresponding to the 0 order light.

Figure 1B:
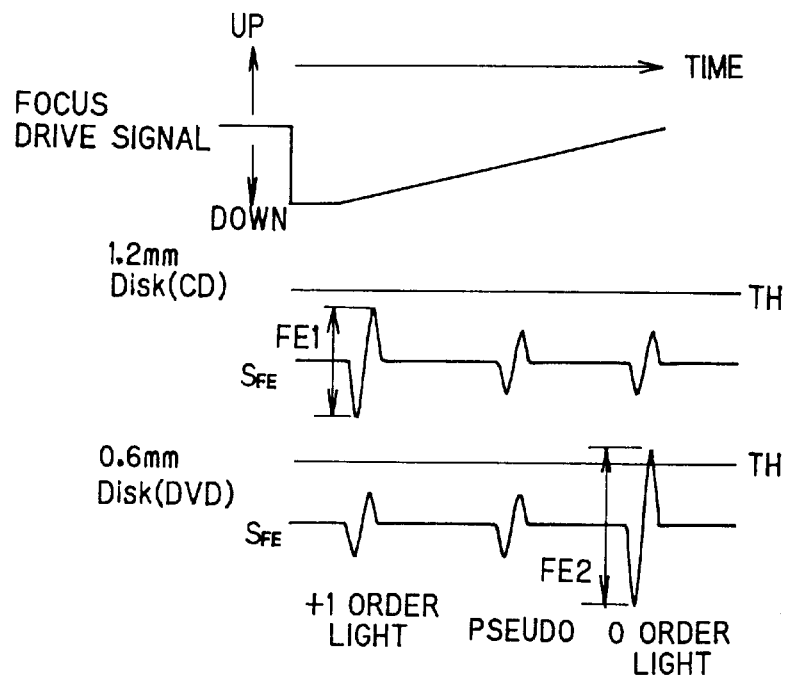
FIG. 1B is another diagram showing the wave form of the focus error generated by the optical pickup of bifocal lens type in the CD/DVD compatible reproducing apparatus for use in the embodiment.

FIG. 1B shows the manner in which the S shapes of the 0 order light, the pseudo light and the +1 order light are generated as mentioned above in a case that the bifocal lens is made close to the optical disk.

A light division ratio of the 0 order light to the +1 order light at the diffraction grating 13 is set to be substantially equal to each other. Since the optimal collection of the 0 order light is performed for the DVD and the optimal collection of the +1 order light is performed for the CD, the optimally collected situation cannot be kept for the reverse combination thereof, for example, because of generation of spherical aberration and the like. Thus, in a case that the optical disk is the CD, the S-shaped signal of the focus error signal corresponding to the +1 order light has the highest level (FE1), and the S-shaped signal of the focus error signal corresponding to the 0 order light has the lowest level. In contrast with this condition, in a case that the optical disk is the DVD, the S-shaped signal of the focus error signal corresponding to the 0 order light has the highest level (FE2), and the S-shaped signal of the focus error signal corresponding to the +1 order light has the lowest level.

Explanation of One-Sided Two-Layer Disk

Figure 2A:
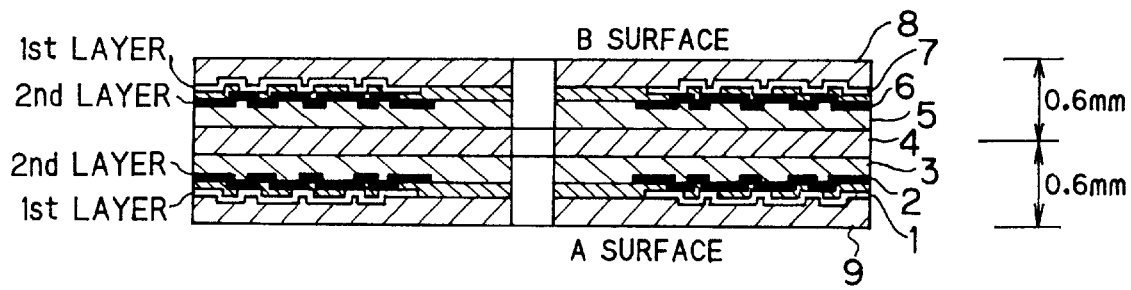
FIG. 2A is a cross-sectional view of a DVD of a multiple layer disk type to be reproduced in the first embodiment.

In a case of an optical disk for DVD shown in FIG. 2A, two transparent optical disk substrates are bonded together. Each of the substrates has a diameter of, for example, 120 mm and a thickness of, for example, 0.6 mm. A protective layer of a first optical disk (A surface) and a protective layer of a second optical disk (B surface), which are opposite to each other, are bonded together with adhesive, and thereby constitute the optical disk substrate having a thickness of 1.2 mm.

A pit for recording information on a surface of a transparent substrate 9 made of synthetic resin of polymethylene methacrylate and polycarbonate is concentrically or spirally formed on the A surface. A reflection layer 1 as a first translucent layer, in which a display pattern, such as a character, a symbol, a picture or the like, is constituted by a metallic thin film made of aluminum having silver-white color or the like, is formed on some surface of the transparent substrate 9 on which this pit is formed.

Moreover, a reflection layer 2 as a second layer composed of a metallic thin film having golden color made of gold and the like is formed on a top surface of the reflection layer 1 as the first layer and a top surface of the transparent substrate 9 on which the reflection layer 1 as the first layer is not formed. A surface where the reflection layer 1 as the first layer and the reflection layer 2 as the second layer are in contact with the pit has substantially same reflectance factors. A protective layer 3 made of ultraviolet curing resin is formed on a top surface of the reflection layer 2 as the second layer. That is, the A surface disk servicing as a first optical disk is an optical disk having the two-layer structure composed of the transparent substrate 9, the pit, the reflection layer 1 as the first layer, the reflection layer 2 as the second layer, the protective layer 3 and the like. Similarly to the surface disk, a pit for recording information on a surface of a transparent substrate 8 is formed on a second optical disk (B surface), and a protective layer 5 is formed on top surfaces of a reflection layer 7 as the first layer and a reflection layer 6 as the second layer. As mentioned above, the optical disk substrate having the thickness of 1.2 mm is constituted by making the protective layers 3 and 5 of these two optical disk substrates opposite to each other and bonding together with a hot melt type adhesive 4.

Figure 2B:
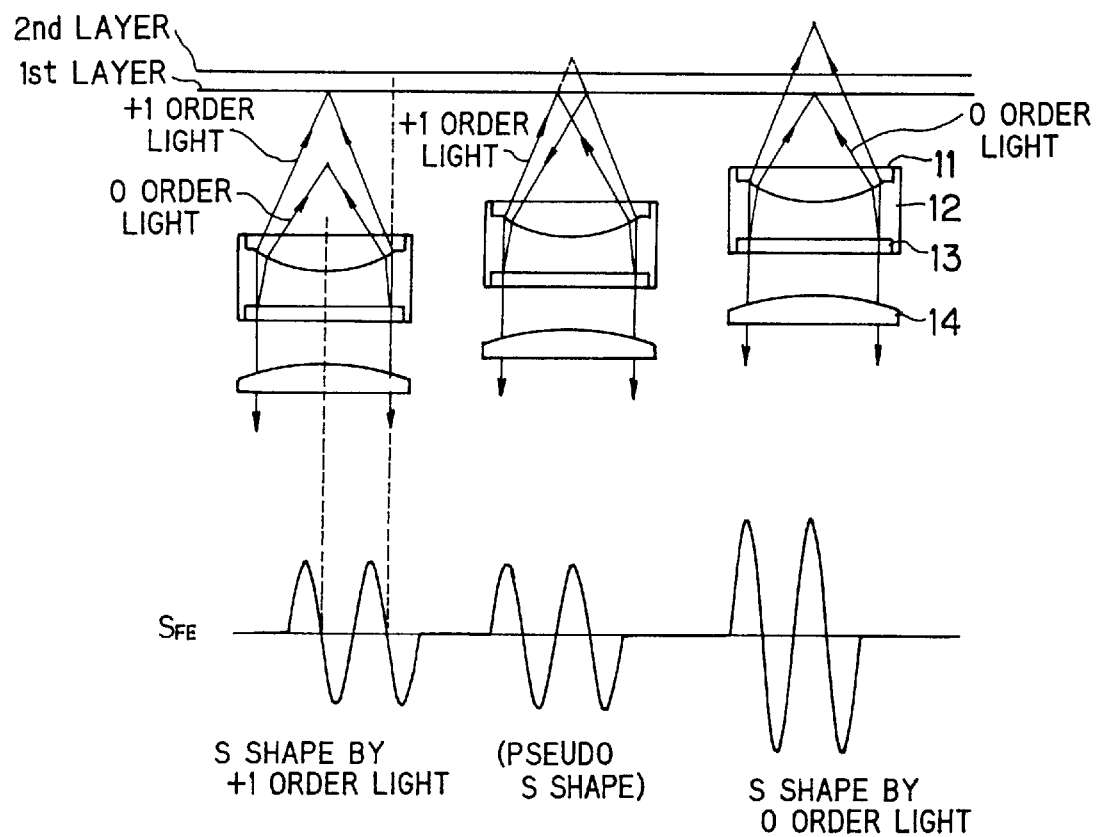
FIG. 2B is a diagram showing a relationship between a structure of a bifocal lens and a focus error signal in the embodiment.

When reproducing the multiple-layer disk substrate having the above mentioned multiple-layer structure from one side thereof, if reproducing by using a bifocal lens, S-shapes with respect to the first layer and the second layer are continuously generated for each of the 0 order light, the pseudo light and the +1 order light as shown in FIG. 2B, in a focus error signal generated when the lens is moved up and down, since an interval between the first layer and the second layer is narrow (approximately 40 $\mu$m).

First Embodiment of the Invention

In a first embodiment of the present invention, a focus error signal is extracted, which is generated from the first layer, among focus error signals generated by applying an UP or DOWN operation to the objective lens while emitting light beams to the one-sided two-layer disk loaded on a disk loading surface of the reproducing apparatus. A gain value is set for a focus servo on the basis of this focus error signal. After that, a balance adjustment and a gain value setting are performed for a tracking servo on the basis of a tracking error signal. Next, a focus jump is performed to a second layer, and the operation similar to that of the above mentioned case is performed for the second layer. The above mentioned operation is performed as a setup (initial setting) operation prior to an actual reproduction operation.

Figure 3A:
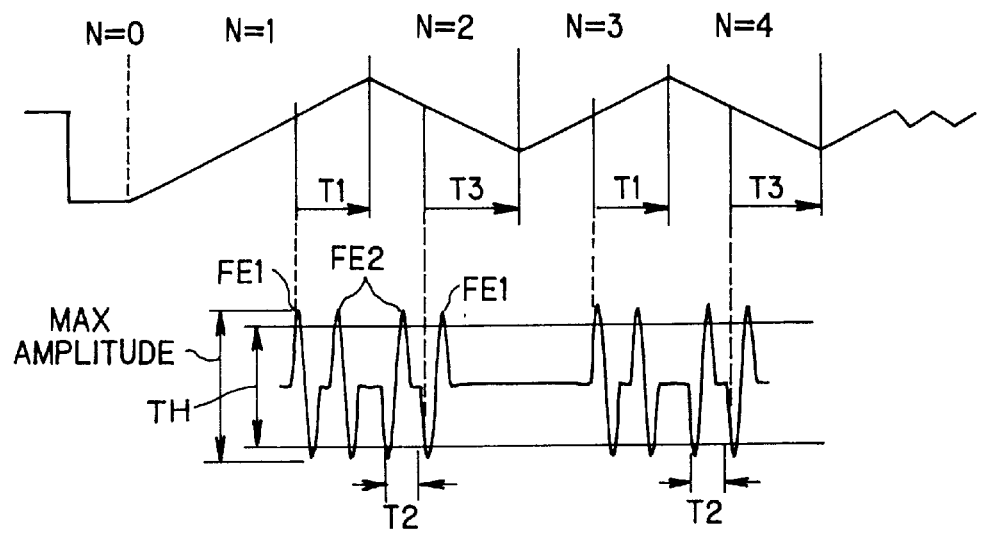
FIG. 3A is one time chart of a generation of a focus error signal of a first layer in the first embodiment.
Figure 3B:
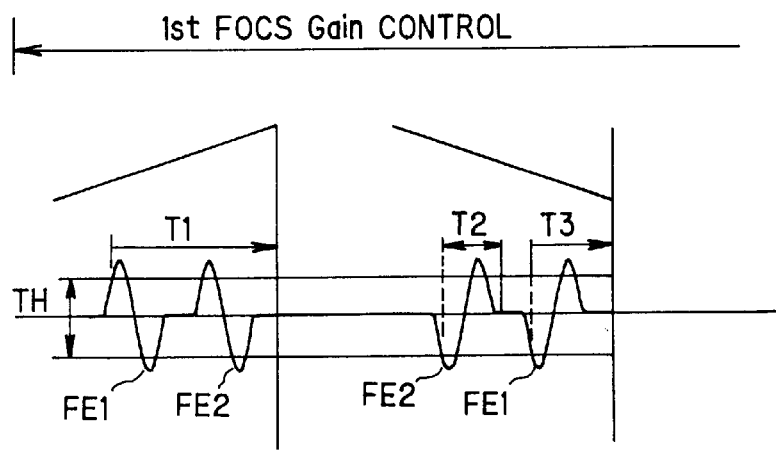
FIG. 3B is another time chart of the generation of the focus error signal of the first layer in the first embodiment.
Figure 5:
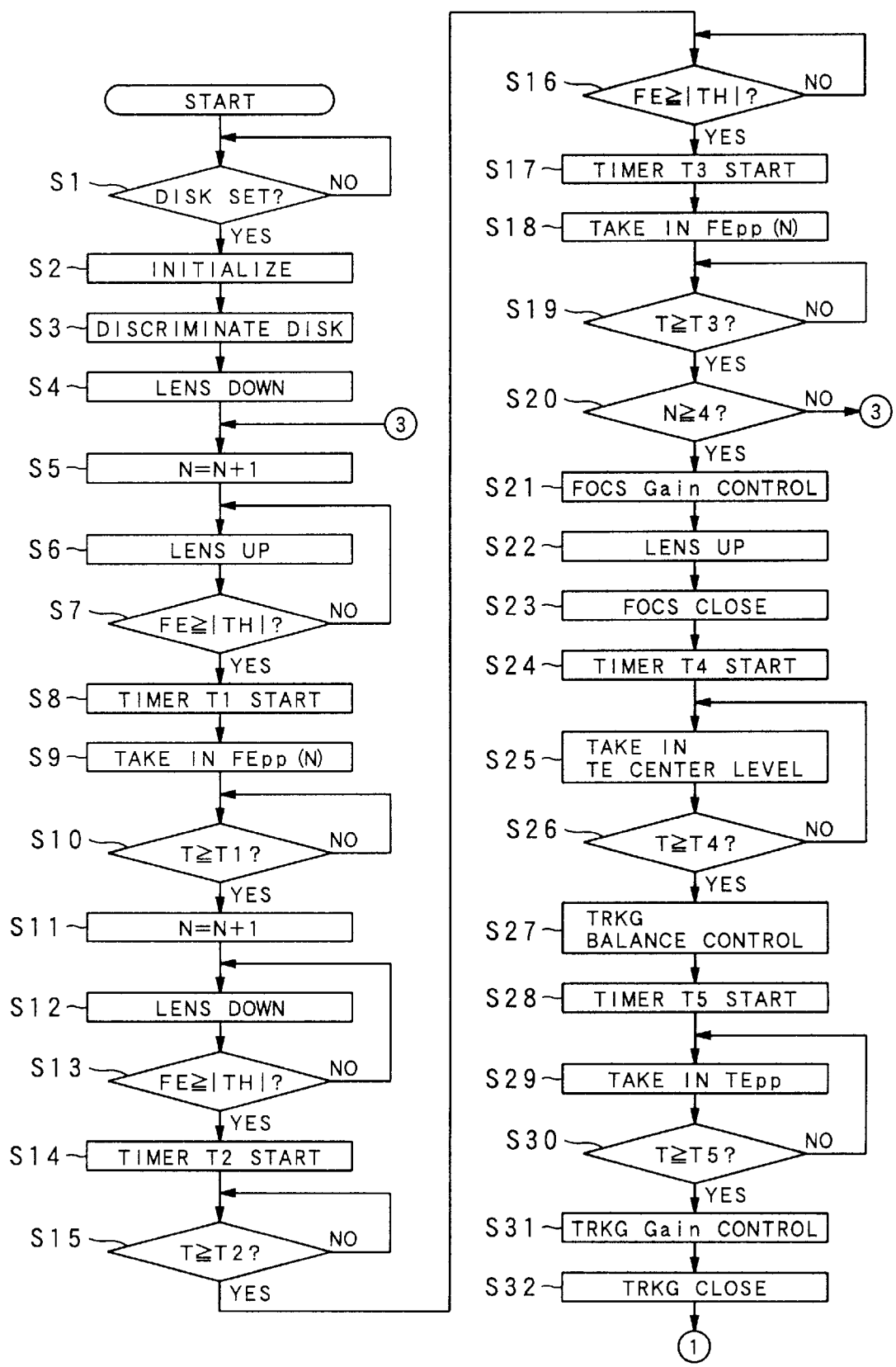
FIG. 5 is one flow chart showing an operation of the first embodiment.
Figure 6:
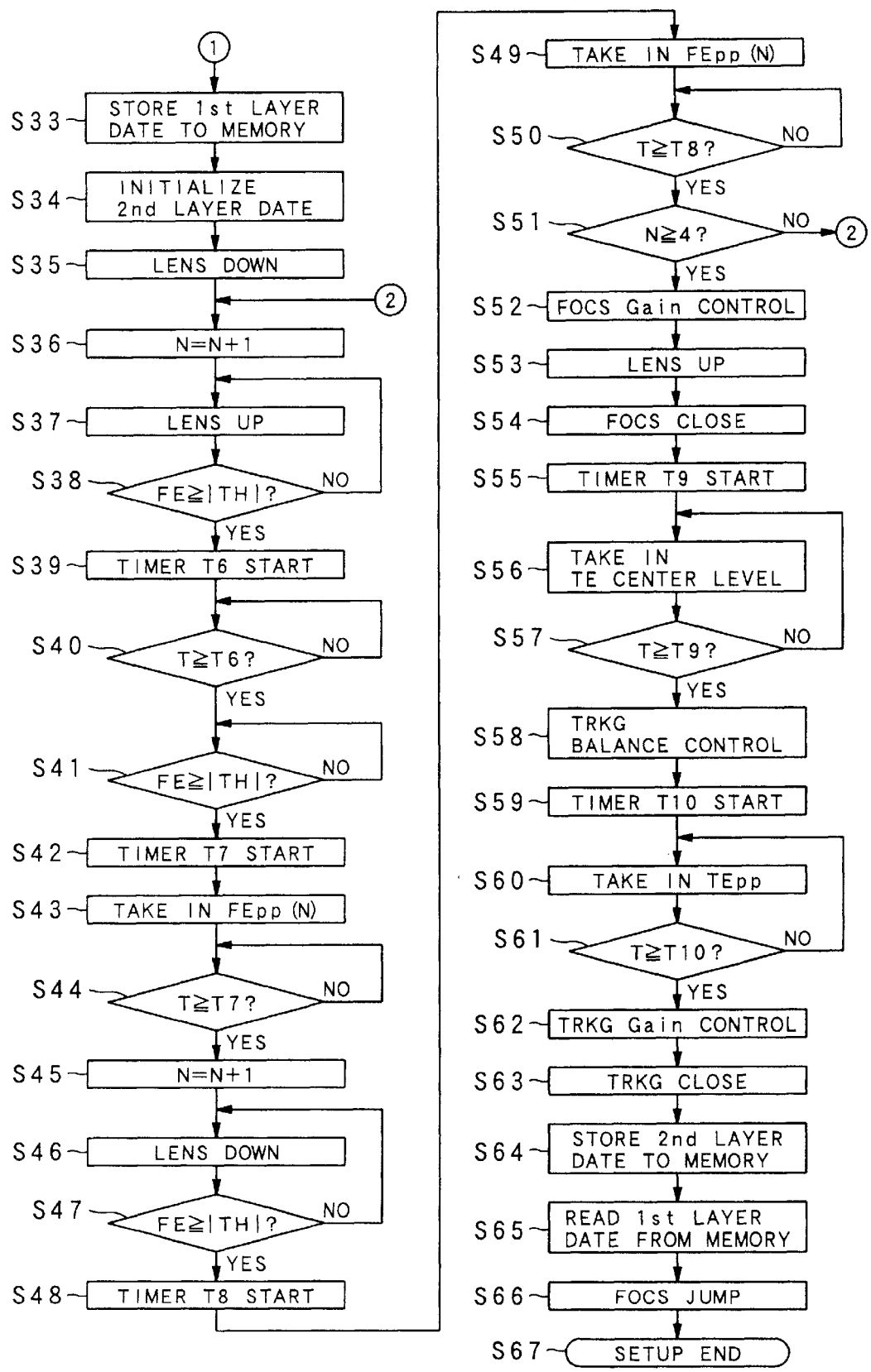
FIG. 6 is another flow chart, continued from FIG. 5, showing the operation of the first embodiment.

An operation of the first embodiment according to the present invention is explained with reference to operation time charts in FIGS. 3 and 4 and flow charts of FIGS. 5 and 6. At first, FIG. 3A shows two focus error signals (hereafter, referred to as FE) detected by the optical pickup 22 when the lens is moved up and down (in a case of two layers). FIGS. 3A to 3C show only an S shape of the FE original to the disk, among the +1 order light, the pseudo light and the 0 order light. That is, only the S shape of the FE generated by the 0 order light is shown in this embodiment. In FIG. 3A, a symbol N indicates a number at which the lens is moved up and down. As shown in FIG. 3B, T1 is a time required from a time point when an amplitude voltage of FE1 firstly generated since the up action of the lens exceeds a defined threshold (referred to as TH) stored in the ROM 39 of the multiple layer disk type of the reproducing apparatus, until a time point when the lens is moved up to the maximum set position.

T2 is a time required from a time point when an amplitude voltage of FE2 firstly generated since the down action of the lens exceeds the threshold TH, until a time point corresponding to an end of the S-shaped characteristics of the FE2. T3 is a time required from a time point when an amplitude voltage of a second FE1 exceeds the threshold TH, until a time point when the lens is moved down to a set end position in the down action of the lens. In FIG. 3C, T4 is a time required for a tracking balance adjustment to be firstly performed described later. T5 is a time required for a tracking gain adjustment to be firstly performed.

Figure 3C:
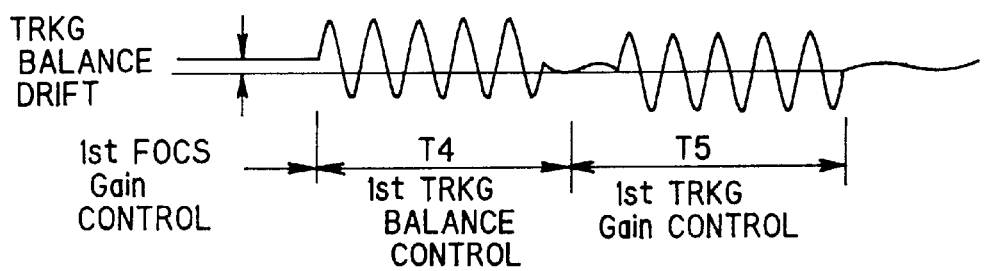
FIG. 3C is another time chart of the generation of the focus error signal of the first layer in the first embodiment.
Figure 4A:
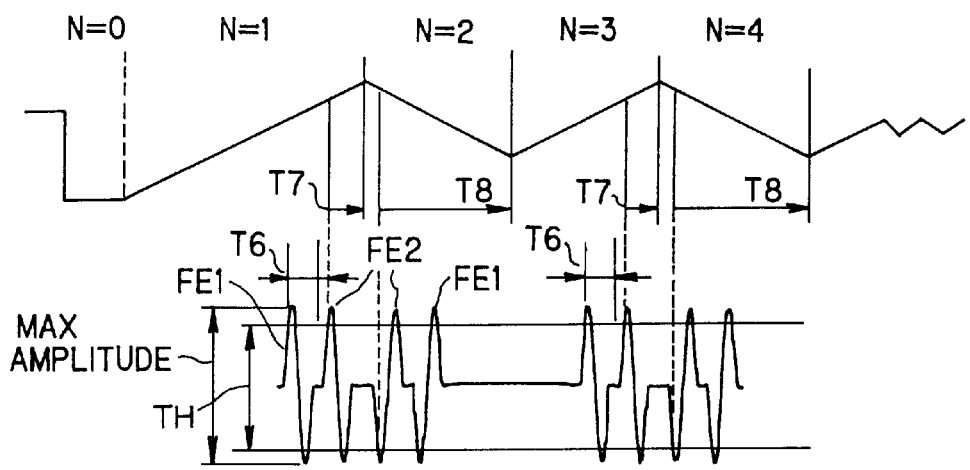
FIG. 4A is one time chart of a generation of a focus error signal of a second layer in the first embodiment.
Figure 4B:
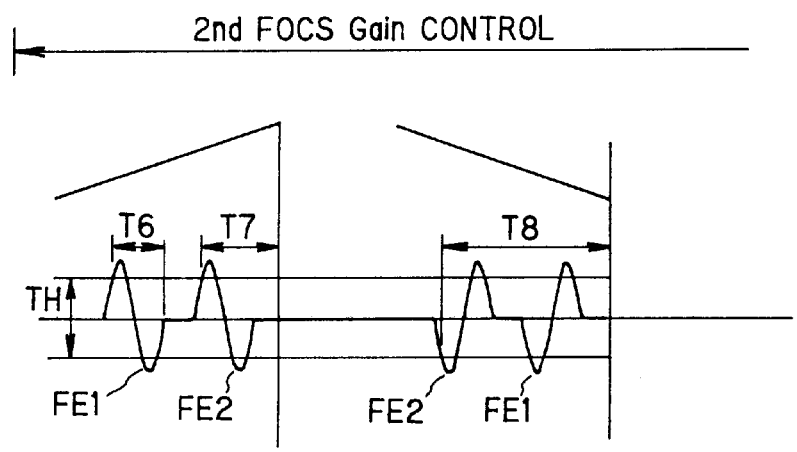
FIG. 4B is another time chart of the generation of the focus error signal of the second layer in the first embodiment.
Figure 4C:
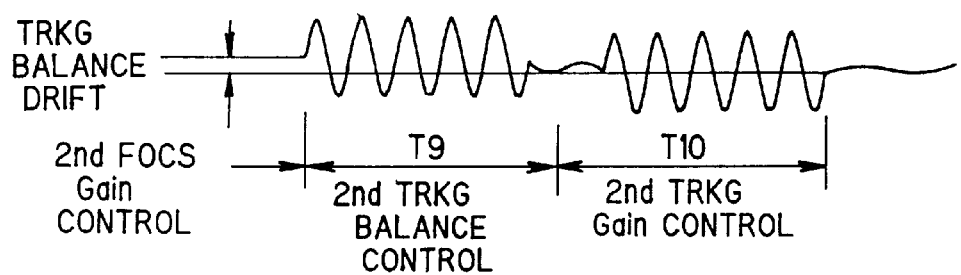
FIG. 4C is another time chart of the generation of the focus error signal of the second layer in the first embodiment.

FIGS. 4A to 4C show operation time charts in a case that the optical pickup 22 is moved to a second layer, similarly to the case of FIGS. 3A to 3C. T6 is a time required from a time point when the amplitude voltage of the FE1 firstly generated since the up action of the lens exceeds the defined TH stored in the ROM 39 of the multiple-layer disk type of the reproducing apparatus, until a time point corresponding to an end of the S-shaped characteristics of the FE1.

T7 is a time required from a time point when an amplitude voltage of a second focus error signal FE2 exceeds the threshold TH, until a time point when the lens is moved up to the maximum set Position. T8 is a time required from a time point when the amplitude voltage firstly generated since the down action of the lens exceeds the threshold TH, until a time point when the lens is moved down to the set end point in the down action of the lens. In FIG. 4C, T9 is a time required for a tracking balance adjustment to be performed for the second layer. T10 is a time required for a tracking gain adjustment to be performed for the second layer.

The operation of the first embodiment according to the present invention is explained with reference to flow charts shown in FIGS. 5 and 6. At first, it is judged at a step S1 whether or not the optical disk is set. If the optical disk is set, various data set when previously reproducing the optical disk is initialized at a step S2. That is, values of counters and timers (which are not shown) are reset which are incorporated within the multiple-layer disk type of the reproducing apparatus used from now.

A disk discrimination of various disks is performed at a step S3. The operation of the disk discrimination is explained with reference to flow charts in FIGS. 12 and 13 described later in detail. The lens is moved down to a defined position at a step S4. A number that the lens is repeated to be moved up and down is counted at a step S5. Each time the lens is moved up or down, one is added to the number. A value of N at that time is stored in an RAM 42. The lens is moved up at a defined speed at a step S6. A defined threshold (referred to as TH), which is stored in advance in the ROM 39 of the multiple-layer disk type of the reproducing apparatus, is compared with the obtained FE value at the step S6. In a case that the FE value is not obtained (step S7: NO), the operation flow returns to the step S6. The lens is continued to be moved up at the defined speed. If the obtained FE1 complies with FE1≧TH (step S7: YES), the operation flow proceeds to a step S8. The timer starts a counting operation for the time T1.

Next, the maximum amplitude value FEp-p of the FE1 at N= a first time is taken in at a step S9, and stored in the RAM 42. At a step S10, it is judged whether or not the counted time by the timer exceeds the defined time T1. If it is judged that the counted time does not exceed the defined time T1 (Step S10 ; NO), the lens is continued to be moved up until the counted time by the timer reaches the defined time T1. If it reaches the defined time T1 (Step S10; YES), the operation flow proceeds to a step S11, one is added to the N, and further the lens is moved down at a step S12. Next, the operation flow proceeds to a step S13, and it is judged whether or not the FE value in the second layer obtained when the lens is moved down is equal to or more than the threshold TH. If the FE value is equal to or less than the threshold TH (Step S13 ; NO), this indicates that the FE resulting from the 0 order light is not obtained yet in the output of the RF Amp 23. Thus, the operation flow returns to the step S12, and the lens is continued to be moved down. If the FE value exceeds the threshold TH (Step S13 ; YES), the operation flow proceeds to a step S14, and this causes the timer to start the counting operation for the defined time T2.

In a case where it is judged at a step S15 that the counted time T by the timer reaches the defined time T2 (step S12: YES), the operation flow proceeds to a step S16, and the FE value equal to or more than the threshold TH is detected. The FE value detected at this step indicates the FE1 of the first layer when the lens is moved down. At a time point when an amplitude value of the FE1 crosses the TH level, this causes the timer to start the counting time for the defined time T3 (Step S17). Next, the maximum amplitude value FEp-p of the FE1 at N= a second time is taken in at a step S18, and stored in the RAM 42. Then, at a step S19, it is judged whether or not the counted time T by the timer exceeds the defined time T3. If it exceeds the defined time T3 (step S19: YES), the operation flow proceeds to a step S20, and the number N that the lens is moved up and down is monitored. If the number N is less than 4 (Step S20 NO), the operation flow returns to the step S5, and then the maximum amplitude value of the FE1 associated with the up and down action of the lens is continued to be taken in.

On the other hand, if the number N exceeds 4 (Step S20; YES), the operation flow proceeds to a step S21, and the focus gain is adjusted for the first layer. At this time, the adjusted gain value is determined by the maximum amplitude value of the FE1, in the up and down action of the lens, which is stored in the RAM 42 at the steps S9 and S18. For example, in a case that the up and down action of the lens is performed four times, the maximum amplitude values of the FE1s of the four samples are stored in the RAM 42. Thus, an average value of these maximum amplitude values of the four samples is calculated, and then the servo gain is set such that this average value becomes a predetermined amplitude value. Incidentally, the example in which the number of the up and down actions of the lens is 4 is explained in this embodiment. However, it is not limited to this number. So, it is possible to properly change the number as the occasion demands.

Next, after the lens is moved up to a position at which the FE1 in the first layer is adjacent to a zero-cross point (Step S22), a servo close signal is outputted by the servo controller 38. The PWM 29 generates a pulse signal for driving a focus coil on the basis of the output signal from the FGA 27, that is, the focus error signal, corresponding to the servo close signal outputted by the servo controller 38. In this way, since the PWM 29 becomes active, a focus servo loop is made close (Step S23). Then, the operation flow proceeds to a step S24, and this causes the timer to start the counting time for the defined time T4. Next, in order to detect a center level (TRCL) of the tracking error (TE) signal, for example, the maximum peak value and the minimum peak value of the TE signal are taken in, and a difference thereof is calculated.

This difference is corresponding to an offset amount from a zero level of the TE signal center, that is, a balance drift amount in a differential circuit and the like for generating the TE signal. In this embodiment, these offset amounts are obtained for a plurality of samples, and an averaged amount thereof is assumed to be the center level of the TE signal (Step S25). The defined time T4 is set to a time at which the sample value of the TE signal enough to detect the average center level can be taken in. This detecting operation of the center level of the TE signal is repeated until the counted time by the timer reaches the defined time T4 at a step S26 (NO). In a case that the counted time by the timer exceeds the defined time T4 at the step S26 (YES), the operation flow proceeds to a step S27. Then, a tracking balance is adjusted through the TRBL circuit 43 such that the TRCL becomes the zero level on the basis of the offset amount determined at the step S25.

Next, the operation flow proceeds to a step S28, and this causes the timer to start the counting operation for the defined time T5. Next, the operation flow proceeds to a step S29, and the TEp-p is taken in which is the maximum amplitude value of the TE signal. This take-in operation is repeated until the counted time T by the timer reaches the defined time T5 (Step S30: NO). At this time, an averaging process is performed for the maximum amplitude values which are repeatedly taken in. In a case that the counted time T by the timer exceeds the defined time T5 at the step S30 (YES), the operation flow proceeds to a step S31, and the tracking gain is adjusted. The gain value to be adjusted is determined by the maximum averaged amplitude value of the TE signals determined at the step S29. That is, the servo gain is set such that the maximum averaged amplitude value becomes a predetermined amplitude value. Next, the operation flow proceeds to a step S32, and the servo close signal is outputted by the servo controller 38 such that the tracking servo loop is made close. The PWM 36 generates a pulse signal for driving a tracking coil on the basis of the output signal from the TGA 34, that is, the tracking error signal, corresponding to the servo close signal outputted by the servo controller 38.

In this way, since the PWM 36 becomes active, the tracking servo loop is made close. Next, the operation flow proceeds to a step S33 in FIG. 6. Then, the various adjustment values (the maximum amplitude value of the focus error signal, the adjustment value of the focus gain, the center level of the tracking error signal, the adjustment value of the tracking balance, the maximum amplitude value of the tracking error signal, the adjustment value of the tracking gain and the like) in relation to the focus servo and the tracking servo to the first layer determined at the steps S1 to S32 are stored in predetermined addresses to store the information of the first layer in the RAM 42. Incidentally, the example of setting the servo gain has been explained in this embodiment. However, it is possible to change the gain as well as an equalizer value corresponding to each of the record layers to thereby optimize it. At this time, the equalizer value is also stored in the RAM 42.

Next, the operation flow proceeds to a step S34, and parameters, counter values and the like are initialized which are used to determine the defined values to the first layer. Next, the operation flow proceeds to a step S35, and the lens is moved down to a defined position. Then, one is added to the value N indicative of the repetition number of the up or down actions of the lens, and the lens is moved up at the defined speed (Steps S36 and S37). Next, at a step S38, it is judged whether or not the FE value complying with the condition of FE1≧TH is obtained similarly to the step S7. If it is not obtained (Step S38; NO), the operation flow returns to the step S37, and the lens is continued to be moved up.

On the other hand, if the FE value is obtained (Step S38 YES), the operation flow proceeds to a step S39, and this causes the timer to start the counting operation for the defined time T6. After the elapse of the defined time T6 at a step S40 (YES), the operation flow proceeds to a step S41, and it is performed to detect the FE value equal to or more than the threshold TH.

The FE value detected at this step S41 indicates the FE2 of the second layer when the lens is moved up. At a time point when an amplitude value of the FE2 crosses the TH level, this causes the timer to start the counting operation for the defined time T7 (Step S42). Next, the maximum amplitude value FEp-p of the FE2 at N =a first time is read out and taken in at a step S43, and stored in the RAM 42. Then, at a step S44, it is judged whether or not the counted time by the timer exceeds the defined time T7. If it is judged that the counted time does not exceed the defined time T7 (Step S44 ; NO), the lens is continued to be moved up until the counted time by the timer reaches the defined time T7. If it reaches the defined time T7 (Step S44 ; YES), the operation flow proceeds to a step S45, and one is added to the N. Further, the lens is moved down at a step S46.

Next, the operation flow proceeds to a step S47, and it is judged whether or not the FE value in the second layer determined when the lens is moved down is equal to or more than the threshold TH. If the FE value is equal to or less than the threshold TH (Step S47; NO), this indicates that the FE resulting from the 0 order light is not obtained yet in the output of the RF Amp 23. Thus, the operation flow returns to the step S46, and the lens is continued to be moved down.

If the FE value exceeds the threshold TH (Step S47; YES), the operation flow proceeds to a step S48. This causes the timer to start the counting operation for the defined time T8. Then, the maximum amplitude value FEp-p at N= a second time is taken in at a step S49, and stored in the RAM 42. At a step S50, it is judged whether or not the counted time T by the timer exceeds the defined time T8. If it exceeds the defined time T8 (step S50: YES), the operation flow proceeds to a step S51, and the number N that the lens is moved up and down is monitored. If the number N is less than 4 (Step S51; NO), the operation flow returns to the step S36, and then the maximum amplitude value of the FE2 associated with the up and down action of the lens is continued to be taken in.

On the other hand, if the number N exceeds 4 (Step S51; YES), the operation flow proceeds to a step S52, and the focus gain is adjusted for the second layer. At this time, the adjusted gain value is determined by the maximum amplitude value of the FE2, in the up and down action of the lens, which is stored in the RAM 42 at the steps S43 and S49. For example, in a case that the up and down action of the lens is performed four times, the maximum amplitude values of the FE1s of the four samples are stored in the RAM 42. Thus, an average value of the maximum amplitude values of the four samples is calculated, and then the servo gain is set such that this average value becomes a predetermined amplitude value.

Next, after the lens is moved up (step S53) to a position at which the FE2 of the second layer is adjacent to a zero-cross point, the servo close signal is outputted by the servo controller 38 (Step S54). The PWM 29 generates the pulse signal for driving the focus coil on the basis of the output signal from the FGA 27, that is, the focus error signal, corresponding to the servo close signal outputted by the servo controller 38. In this way, since the PWM 29 becomes active, the focus servo loop is made close (Step S54). Then, the operation flow proceeds to a step S55, and this causes the timer to start the counting operation for the defined time T9. Next, in order to detect the center level (TRCL) of the tracking error (TE) signal, for example, the maximum peak value of the TE signal is taken in, and a difference thereof is calculated. This difference is corresponding to the offset amount from the zero level of the TE signal center, that is, the balance drift amount in the differential circuit for generating the TE signal.

In this embodiment, these offset amounts are determined for a plurality of samples, and the averaged amount thereof is assumed to be the center level of the TE signal (Step S56). The defined time T9 is set to the time at which the sample values of the TE signal enough to detect the average center level can be taken in. This detecting operation of the center level of the TE signal is repeated until the counted time by the timer reaches the defined time T9 at a step S57. In a case that the counted time by the timer exceeds the defined time T9 at the step S57(YES), the operation flow proceeds to a step S58, and then the tracking balance is adjusted through the TRBL circuit 43 such that the TRCL becomes the zero level on the basis of the offset amount determined at the step S56.

Next, the operation flow proceeds to a step S59, and this causes the timer to start the counting operation for the defined time T10. Next, the operation flow proceeds to a step S60, and the TEp-p is taken in which is the maximum amplitude value of the TE signal. This take-in operation is repeated until the counted time T by the timer reaches the defined time T10 (Step S61). At this time, the averaging process is performed for the maximum amplitude values which are repeatedly taken in. In a case that the counted time T by the timer exceeds the defined time T10 at the step S61 (YES), the operation flow proceeds to a step S62, and the tracking gain is adjusted. The gain value to be adjusted is determined by the maximum averaged amplitude value of the TE signals determined at the step S60. That is, the servo gain is set such that the maximum averaged amplitude value is the predetermined amplitude value.

Next, the operation flow proceeds to a step S63, and the servo close signal is outputted by the servo controller 38 such that the tracking servo loop is made close. The PWM 36 generates the pulse signal for driving the tracking coil on the basis of the output signal from the TGA 34, that is, the tracking error signal, corresponding to the servo close signal outputted by the servo controller 38. In this way, since the PWM 36 becomes active, the tracking servo loop is made close. Next, the operation flow proceeds to a step S64. Then, the various adjustment values (the maximum amplitude value of the focus error signal, the adjustment value of the focus gain, the center level of the tracking error signal, the adjustment value of the tracking balance, the maximum amplitude value of the tracking error signal, the adjustment value of the tracking gain and the like) in relation to the focus servo and the tracking servo to the second layer determined at the steps S34 to S63 are stored in predetermined addresses to store the information of the second layer in the RAM 42.

Thanks to the operations at the steps S33 to S64, the adjustment values in relation to the optimal focus servo for the respective record layers in the two-layer disk are stored in predetermined addresses corresponding to the respective record layers in the memory RAM 42. Next, in order to transfer the pickup to a start position (for example, the innermost circumference track of the first layer) of the record information recorded on the two-layer disk, after reading out the adjustment values of the first layer stored in the predetermined addresses of the RAM 42 (Step S65), a focus jump operation is performed at a step S66. That is, a focal position of the reading beam is shifted from the record layer of the second layer to that of the first layer, or from the record layer of the first layer to that of the second layer. The initial operation (setup operation) to the two-layer disk 20 loaded on the reproducing apparatus is completed in accordance with the above mentioned operations (step S67).

Incidentally, the focus jump operation is performed as described below. At first, the tracking servo loop is made close. Then, the focus servo loop is made open. After the lens is forced to be transferred in a focus direction (a direction vertical to the disk record surface) by a predetermined length (a distance between the layers), the closing action of the focus servo is performed. The closing action of the tracking servo is successively performed, and the pickup is moved to search to a desired track as the occasion demands. In this way, after the focus servo and the tracking servo are once made open in conjunction with the focus jump, when they are again made close, the adjustment values are used which correspond to the record layer of a jumped destination read out from the RAM 42. Thus, even during reproducing, in a case of performing the jump operation from the record layer in the first layer to that in the second layer or the record layer in the second layer to that in the first layer, it is Possible to read out the various adjustment values corresponding to the record layer at the jumped destination from the RAM 42 prior to the jump operation to thereby adjust the servo gain on the basis of the read adjustment values in the servo closing operation after the jump operation. As a result, it is possible to quickly perform the stable servo control.

Second Embodiment of the Invention

In a second embodiment of the present invention, focus error signals are successively extracted, which are generated from the first and second layers, among focus error signals generated by applying the UP or DOWN operation to the objective lens while emitting light beams to the one-sided two-layer disk loaded on the disk loading surface of the reproducing apparatus. A gain value is set for a focus servo on the basis of each of these focus error signals. After that, a gain value setting is performed for a tracking servo on the basis of a tracking error signal of the first layer. Next, a focus jump is performed to the second layer, and a gain value setting is performed for a tracking servo on the basis of a tracking error signal of the second layer. The above mentioned operation is also performed as a setup (initial setting) operation prior to the actual reproduction operation.

An operation of the second embodiment according to the present invention is explained with reference to the block diagram of FIG. 1, operation time charts in FIGS. 7A to 7C and flow charts of FIGS. 8 and 9.

Figure 7A:
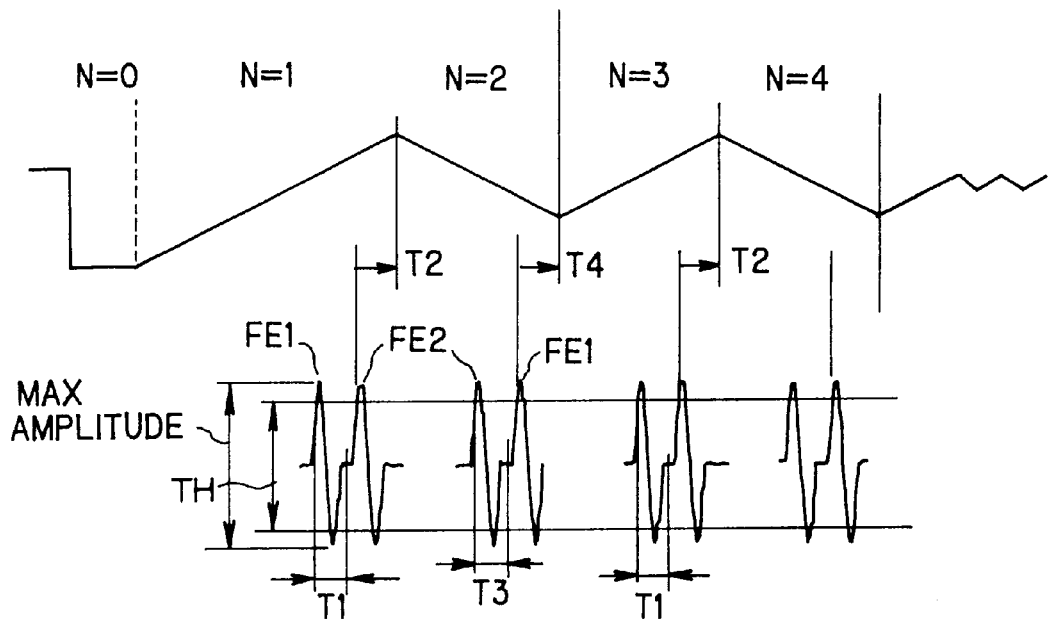
FIG. 7A is one time chart of a generation of a focus error signal in a second embodiment of the present invention.
Figure 7B:
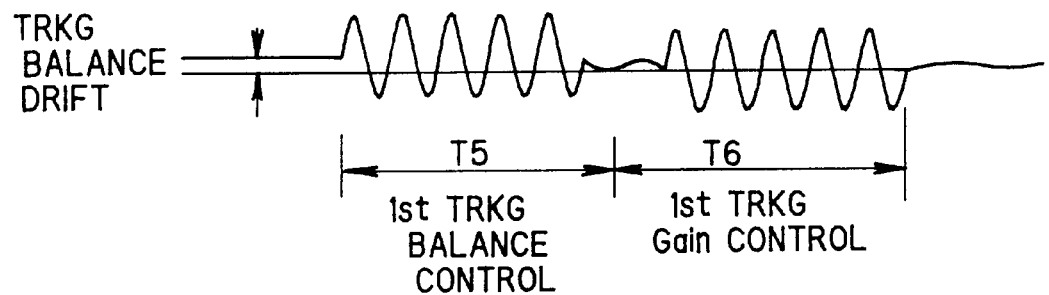
FIG. 7B is another time chart of the generation of the focus error signal in the second embodiment.
Figure 7C:
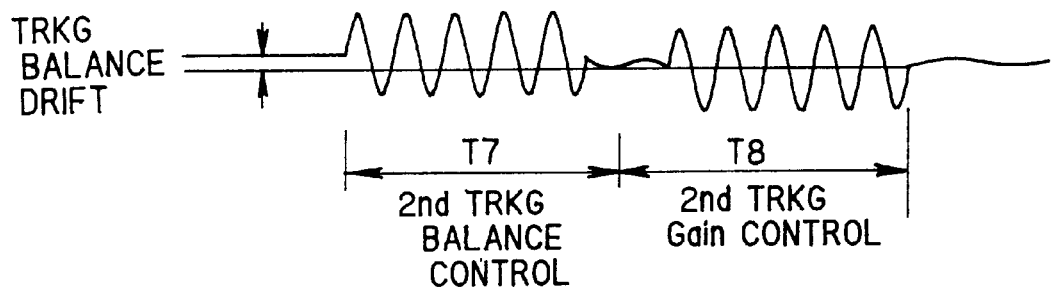
FIG. 7C is another time chart of the generation of the focus error signal in the second embodiment.

At first, FIG. 7A shows two focus error signals (FE) detected by the optical pickup 22 when the lens is moved up and down (in a case of two layers). In FIG. 7A, a symbol N indicates a number at which the lens is moved up and down. As shown in FIG. 7A, T1 is a time required from a time point when the amplitude voltage of FE1 (of the first layer) firstly generated since the up action of the lens exceeds a defined threshold TH stored in the ROM 39 of the multiple layer disk type of the reproducing apparatus, until a time point corresponding to an end of the FE1. T2 is a time required from a time point when an amplitude voltage of the FE2 (of the second layer) exceeds the threshold TH, until a time point when the lens is moved up to the maximum set position.

T3 is a time required from a time point when the amplitude voltage of the FE2 (of the second layer) exceeds the threshold TH until a time point corresponding to an end of the S-shaped characteristics of the FE2, as for the case of moving down the lens. T4 is a time required from a time point when the amplitude voltage of the FE1 (of the first layer) exceeds the threshold TH, until a time point when the lens is moved down to the maximum set position. In FIG. 7B, T5 is a time required for a tracking balance adjustment to be firstly performed for the first layer, and T6 is a time required for a tracking gain adjustment for the first layer. Similarly in FIG. 7C, T7 is a time required for a tracking balance adjustment for the second layer, and T8 is a time required for a tracking gain adjustment for the second layer.

The operation of the second embodiment according to the present invention is explained with reference to flow charts shown in FIGS. 8 and 9.

At first, it is judged at a step S101 whether or not the optical disk is set. If the optical disk is set (step S101: YES), various data set when previously reproducing the optical disk is initialized at a step S102. That is, values of counters and timers (which are not shown) are reset which are incorporated within the multiple-layer disk type of the reproducing apparatus used from now.

A disk discrimination of various disks is performed at a step S103. The operation of the disk discrimination is explained later in detail. The lens is moved down to a defined position at a step S104. Then, the lens is moved up at a defined speed at a step S105. At a step S106, a number N that the lens is repeated to be moved up and down is counted, and a number M that the FE is taken in is counted. Then, at a step S107, a defined threshold TH, which is stored in advance in the ROM 39 of the multiple-layer disk type of the reproducing apparatus, is compared with the obtained FE value. In a case that the FE value is not obtained (step S107: NO), the lens is continued to be moved up. If the obtained FE1 complies with FE1≧TH (step S107: YES), the operation flow proceeds to a step S108. The timer starts a counting operation for the time T1.

This counting operation in the timer for the defined time T1 is started at a time point when the amplitude of the FE1 crosses (exceeds) the TH level. The defined time T1 is set in the ROM 39 etc. in advance as a time until the first FE is finished. Next, the maximum amplitude value FEp-p of the FE of the first layer is taken in at a step S109, and stored in the RAM 42. At a step S110, it is judged whether or not the counted time by the timer exceeds the defined time T1. If it is judged that the counted time does not exceed the defined time T1 (Step S110; NO), the lens is continued to be moved up until the counted time by the timer reaches the defined time T1. If it reaches the defined time T1 (Step S110; YES), the operation flow proceeds to a step S111. One is added to the number M, and the operation flow proceeds to a step S112. Then, it is judged whether or not the FE value of the second layer is equal to or more than the threshold TH. If the FE value is less than the threshold TH (Step S112; NO), the moving up operation of the lens is continued until the FE value exceeds the threshold TH. If the FE value exceeds the threshold TH (Step S112; YES), the operation flow proceeds to a step S113.

At a step S113, the timer starts the counting operation for the defined time T2. Then, the maximum amplitude value FEp-p of the FE of the second layer is taken in at a step S114, and stored in the RAM 42. At a step S115, it is judged whether or not the counted time by the timer exceeds the defined time T2. In a case where it is judged at the step S115 that the counted time T by the timer reaches the defined time T2 (step S115: YES), the operation flow proceeds to a step S116, and the lens is moved down. Then, one is added to each of the numbers N and M at a step S117. Next, at a step S118, it is judged whether or not the FE value of the second layer is equal to or more than the threshold TH. If the FE value is less than the threshold TH (step S118: NO), it is continued to move down the lens until the FE value exceeds the threshold TH. If the FE value exceeds the threshold TH (step S118: YES), the operation flow proceeds to a step S119, and the timer starts the counting operation for the defined time T3. Then, the maximum amplitude value FEp-p of the FE of the second layer is taken in, and stored in the RAM 42 at a step S120. Then, at a step S121, it is judged whether or not the counted time T by the timer exceeds the defined time T3. If it exceeds the defined time T3 (step S121: YES), the operation flow proceeds to a step S122, and one is added to the number M.

Next, at a step S123, it is judged whether or not the FE value of the first layer is equal to or more than the threshold TH. If the FE value is less than the threshold TH (step S123: NO), it is continued to move down the lens until the FE value exceeds the threshold TH. If the FE value exceeds the threshold TH (step S123: YES), the operation flow proceeds to a step S124, and the timer starts the counting operation for the defined time T4. Then, the maximum amplitude value FEp-p of the FE of the first layer is taken in, and stored in the RAM 42 at a step S125. Then, at a step S126, it is judged whether or not the counted time T by the timer exceeds the defined time T4. If it exceeds the defined time T4 (step S126: YES), the operation flow proceeds to a step S127, and the number N that the lens is repeated to be moved up and down is monitored. If the number N is less than 4 (step S127: NO), the operation flow returns to the step S105.

On the other hand, if the number N exceeds 4 (Step S127 YES), the operation flow proceeds to a step S128, and the focus gains are adjusted for the first and second layers. Then, at a step S129, the adjusted focus gains for the first and second layers are stored into the RAM 42. After that, the lens is moved up at a step S30. Then, at a step S31, the PWM 29 generates a pulse signal for driving a focus coil on the basis of the output signal from the FGA 27, and the focus servo loop is made close by the servo controller 38.

Then, the operation flow proceeds to a step S132, and this causes the timer to start the counting time for the defined time T5. Next, in order to detect a center level (TRCL) of the tracking error (TE) signal, for example, the maximum peak value and the minimum peak value of the TE signal are taken in, and a difference thereof is calculated (step S133) in FIG. 9. This difference is corresponding to an offset amount from a zero level of the TE signal center, that is, a balance drift amount in a differential circuit and the like for generating the TE signal.

In this embodiment, these offset amounts are obtained for a plurality of samples, and an averaged amount thereof is assumed to be the center level of the TE signal (Step S133). The defined time T5 is set to a time at which the sample value of the TE signal enough to detect the average center level can be taken in. This detecting operation of the center level of the TE signal is repeated until the counted time by the timer reaches the defined time T5 at astep S134 (NO). In a case that the counted time by the timer exceeds the defined time T5 at the step S134 (YES), the operation flow proceeds to a step S135. Then, a tracking balance is adjusted through the TRBL circuit 43 such that the TRCL becomes the zero level on the basis of the offset amount determined at the step S133.

Next, the operation flow proceeds to a step S136, and this causes the timer to start the counting operation for the defined time T6. Next, the operation flow proceeds to a step S1 37, and the TEp-p is taken in which is the maximum amplitude value of the TE signal. This take-in operation is repeated until the counted time T by the timer reaches the defined time T6 (Step S138: NO). At this time, an averaging process is performed for the maximum amplitude values which are repeatedly taken in. In a case that the counted time T by the timer exceeds the defined time T6 at the step S138 (YES), the operation flow proceeds to a step S139, and the tracking gain is adjusted. The gain value to be adjusted is determined by the maximum averaged amplitude value of the TE signals determined at the step S137. That is, the servo gain is set such that the maximum averaged amplitude value becomes a predetermined amplitude value. Next, the adjusted tracking gain for the first layer is stored into the RAM 42 at a step S140. Then, the focus jump operation is performed at a step S141. That is, a focal position of the reading beam is shifted from the record layer of the first layer to that of the second layer.

Next, after the lens is moved up to a position at which the FE2 of the second layer is adjacent to a zero-cross point, the servo close signal is outputted by the servo controller 38 (Step S142). The PWM 29 generates the pulse signal for driving the focus coil on the basis of the output signal from the FGA 27, that is, the focus error signal, corresponding to the servo close signal outputted by the servo controller 38. In this way, since the PWM 29 becomes active, the focus servo loop is made close (Step S142). Then, the operation flow proceeds to a step S143, and this causes the timer to start the counting operation for the defined time T7. Next, in order to detect the center level (TRCL) of the tracking error (TE) signal, for example, the maximum peak value of the TE signal is taken in, and a difference thereof is calculated. This difference is corresponding to the offset amount from the zero level of the TE signal center, that is, the balance drift amount in the differential circuit for generating the TE signal.

In this embodiment, these offset amounts are determined for a plurality of samples, and the averaged amount thereof is assumed to be the center level of the TE signal (Step S144). The defined time T7 is set to the time at which the sample values of the TE signal enough to detect the average center level can be taken in. This detecting operation of the center level of the TE signal is repeated until the counted time by the timer reaches the defined time T7 at a step S145. In a case that the counted time by the timer exceeds the defined time T7 at the step S145 (YES), the operation flow proceeds to a step S146, and then the tracking balance is adjusted through the TRBL circuit 43 such that the TRCL becomes the zero level on the basis of the offset amount determined at the step S144.

Next, the operation flow proceeds to a step S147, and this causes the timer to start the counting operation for the defined time T8. Next, the operation flow proceeds to a step S148, and the TEp-p is taken in which is the maximum amplitude value of the TE signal. This take-in operation is repeated until the counted time T by the timer reaches the defined time T8 (Step S149). At this time, the averaging process is performed for the maximum amplitude values which are repeatedly taken in. In a case that the counted time T by the timer exceeds the defined time T8 at the step S49 (YES), the operation flow proceeds to a step S150, and the tracking gain is adjusted. The gain value to be adjusted is determined by the maximum averaged amplitude value of the TE signals determined at the step S148. That is, the servo gain is set such that the maximum averaged amplitude value is the predetermined amplitude value. Next, the operation flow proceeds to a step S151, and the servo close signal is outputted by the servo controller 38 such that the tracking servo loop is made close. The PWM 36 generates the pulse signal for driving the tracking coil on the basis of the output signal from the TGA 34, that is, the tracking error signal, corresponding to the servo close signal outputted by the servo controller 38.

In this way, since the PWM 36 becomes active, the tracking servo loop is made close. Next, at a step S152, the adjusted tracking gain for the second layer is stored. Finally, the setup of the multiple layer disk substrate is ended (step S53).

In the second embodiment, although the explanations have been made for a case where only the gains for focusing and tracking are adjusted and stored, it is also possible in the second embodiment that the equalizer values etc. can be adjusted and stored in the same manner as the first embodiment.

In this way, according to the second embodiment, it is possible to more speedily set the gain value than the first embodiment, since the focus error signals for obtaining the loop gain value of the focus servo loop of each layer are all taken in by one up and down movement of the lens.

Third Embodiment of the Invention

Although the focus jump is performed to the second layer in order to extract the tracking error signal of the second layer in the case of the second embodiment of the present invention, a third embodiment of the present invention is a method of setting the focus and tracking gain values in the first and second layers without performing the focus jump.

The third embodiment of the present invention is explained with reference to the block diagram of FIG. 1 and the flow charts of FIGS. 8 to 10.

Figure 9:
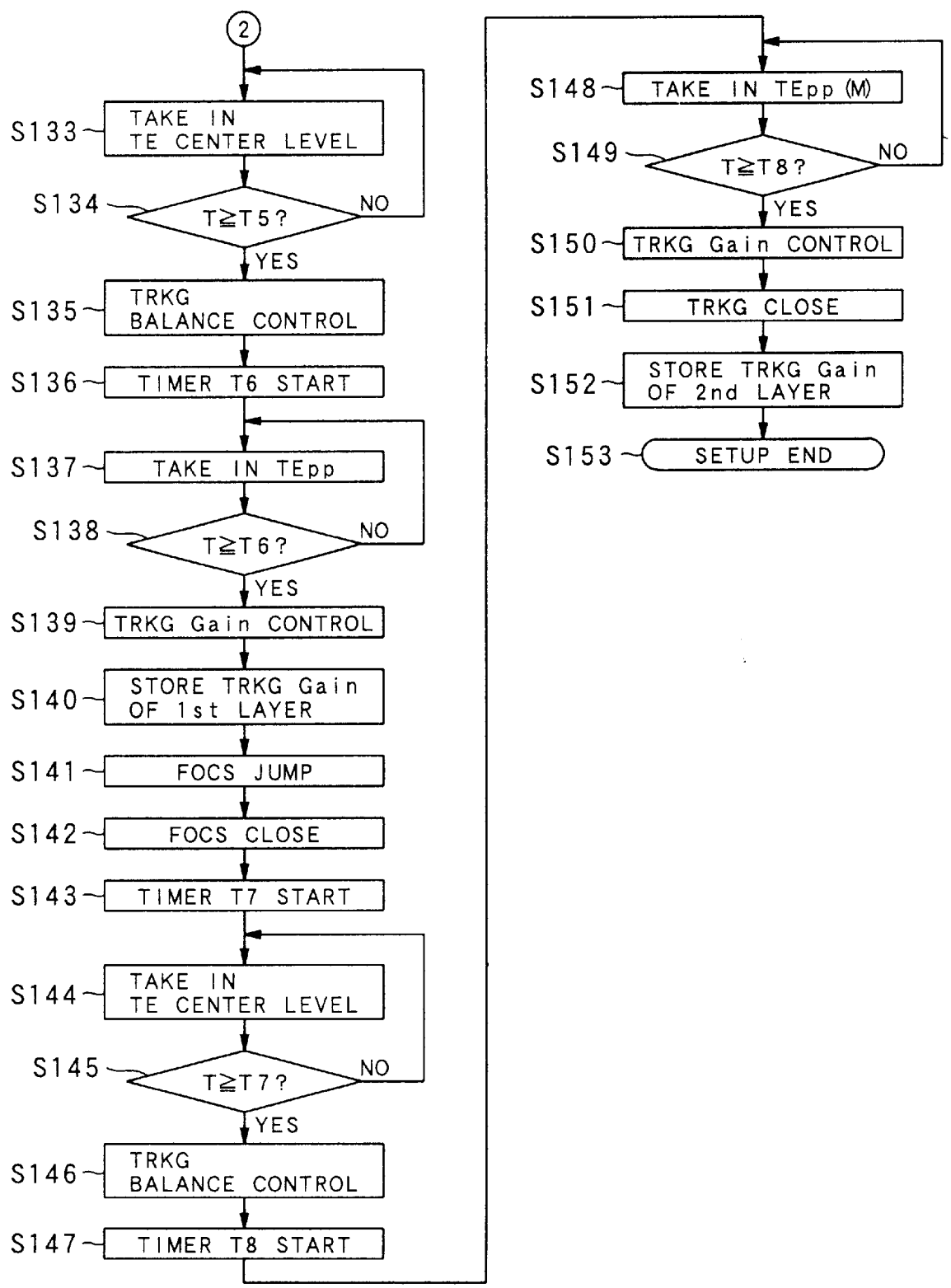
FIG. 9 is another flow chart, continued from FIG. 8, showing the operation of the second embodiment.

In the third embodiment, the steps S101 to S132 in FIG. 8 and the steps S133 to S140 in FIG. 9 as for the processes of adjusting the focus gain value for the first layer, the focus gain value for the second layer and the tracking gain value for the first layer in the second embodiment are performed at first.

Figure 10:
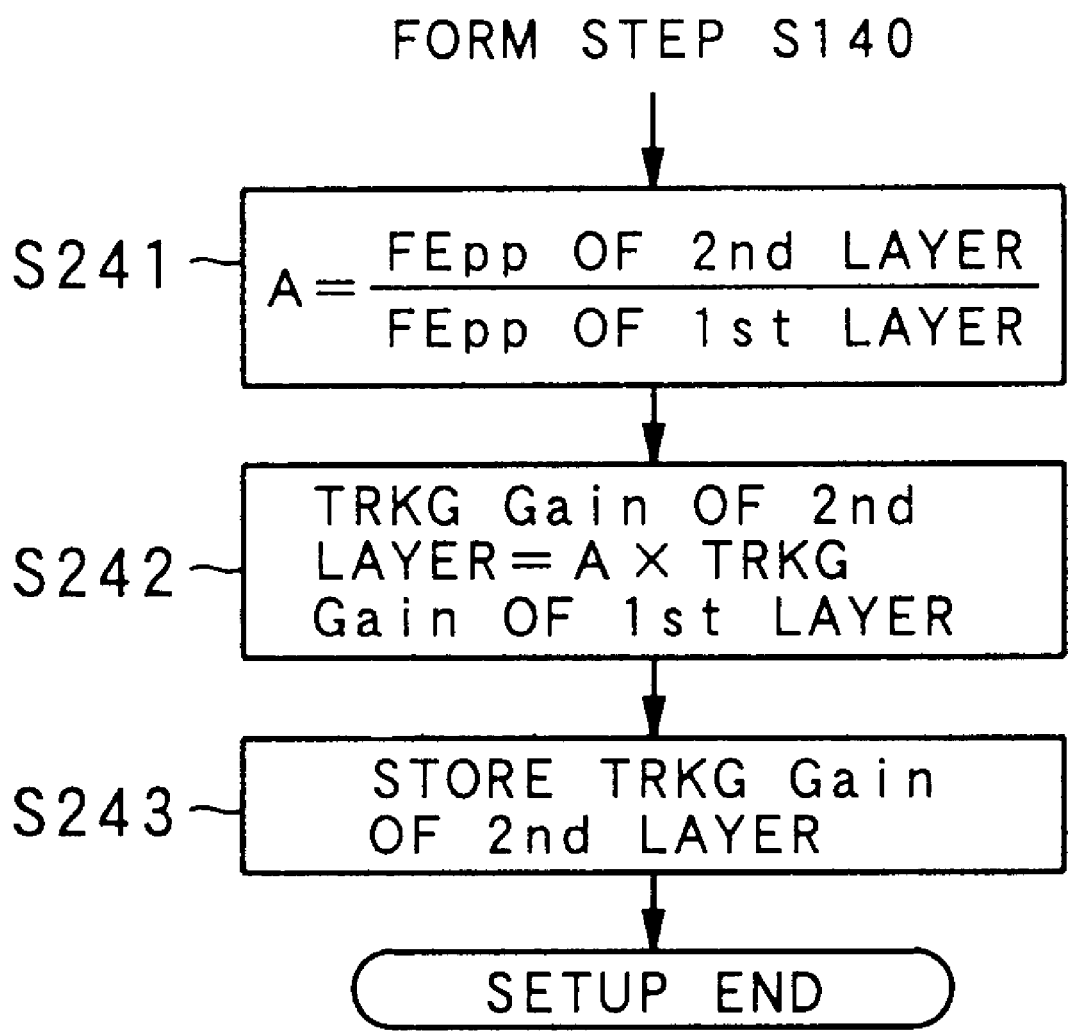
FIG. 10 is a flow chart showing an operation of a third embodiment of the present invention.

From the step S140 of FIG. 9, the operation flow proceeds to a step S241 in FIG. 10. In FIG. 10, the same steps as those in FIG. 9 carry the same reference numerals and the explanations thereof are omitted.

At a step S241, the servo controller 38 determines a ratio of the average value of the maximum amplitude values of the focus errors of the first layer to the average value of the maximum amplitude values of the focus errors of the second layer, for example, among the FEp-p values taken in at the steps S109, S114, S120 and S125. Then, it is stored in the RAM 42 as a value A. Next, at a step S242, the tracking gain for the second layer is calculated by multiplying the value A stored at the step S241 by the tracking gain value for the first layer, and is stored in the RAM 42 as the tracking gain value for the second layer at a step S243.

As mentioned above, since the tracking gain for the second layer is determined on the basis of the ratio of the amplitude values of the focus errors in the respective layers, it is possible to save the adjusting time for the tracking gain for the second layer. Although the ratio is calculated on the basis of the amplitude values of the focus errors in the respective layers in this embodiment, it is naturally possible to get the same effect, even if calculating the ratio from the values of the focus gains in the respective layers stored at the step S129.

Although the third embodiment of the present invention has been explained as the variation of the second embodiment, the method of the third embodiment of the present invention can be also applied to the first embodiment of the present invention. That is, after the focus jump is performed to the second layer, the focus error signal obtained from the second layer is extracted, and the gain is set. After that, the method of the third embodiment of the present invention can be used in the tracking.

Disk Discrimination Method of the Invention

Figure 11:
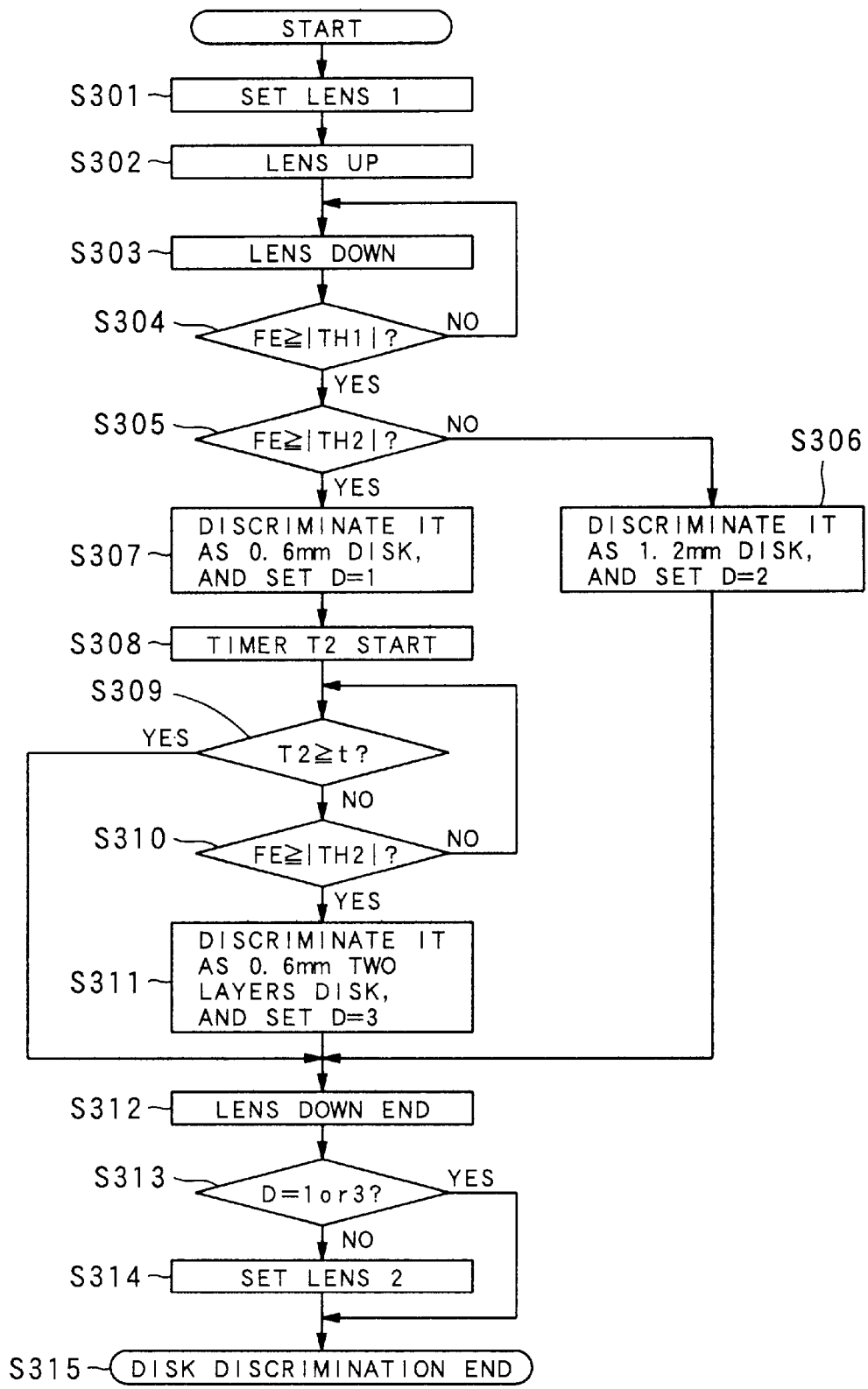
FIG. 11 is a flow chart showing an operation of a method of discriminating the disk in lens exchanging type for use in the embodiments.
Figure 12:
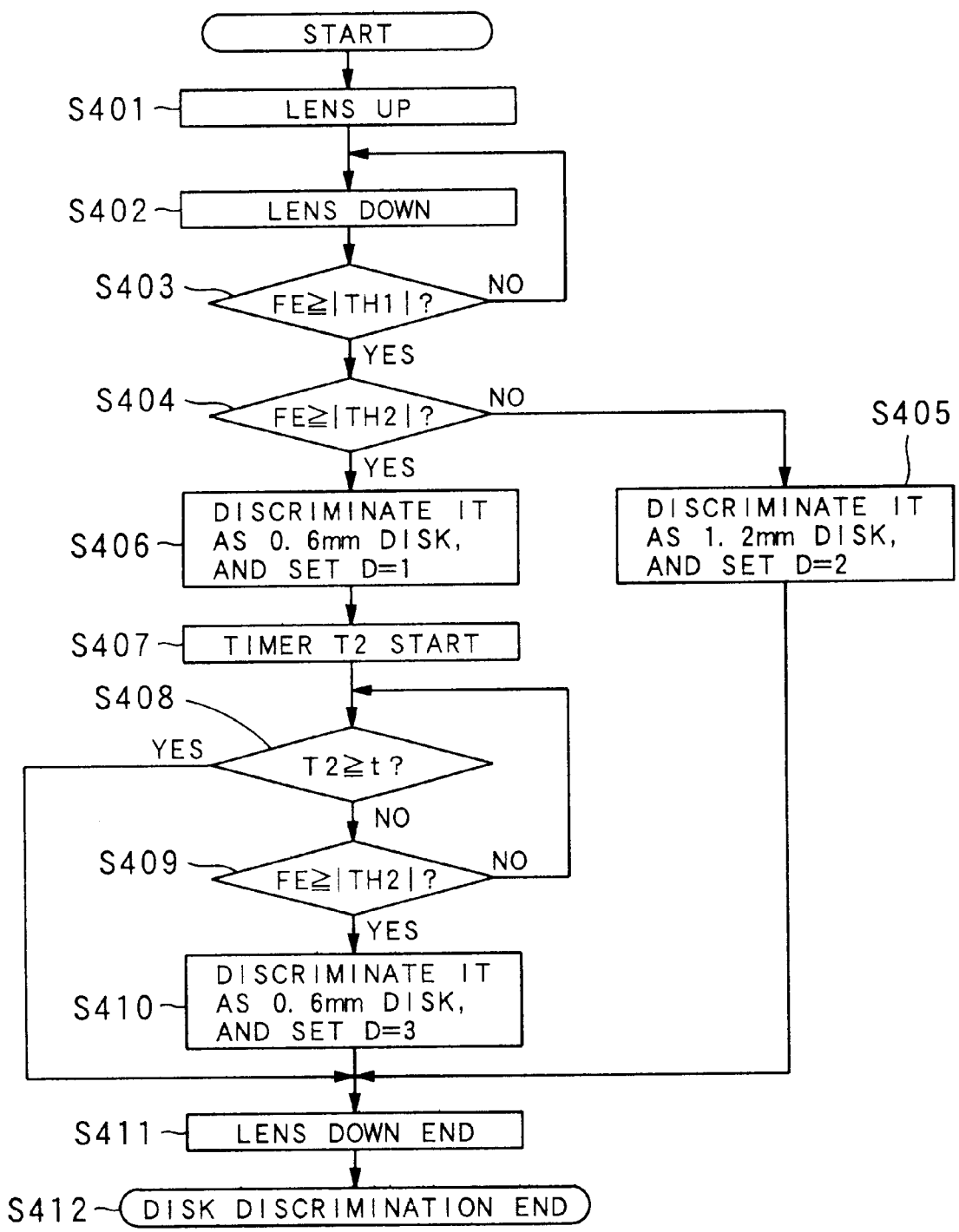
FIG. 12 is a flow chart showing an operation of a method of discriminating the disk in bifocal lens type for use in the embodiments.

The disk discrimination method used in the above mentioned flow charts is represented by a lens exchanging type of a disk discrimination method shown in a flow chart of FIG. 11, and by a disk discrimination method of using a bifocal lens shown in a flow chart of FIG. 12.

(1) Lens Exchanging Type of Disk Discrimination Method

At first, in FIG. 11, a lens 1 is set to the optical pickup at a step S301. Next, at a step S302, the lens is moved up to a defined position. After that, the lens is moved down at a defined speed at a step S303. At a step S304, a focus error signal is detected, and the obtained FE value is compared with a threshold TH1 that is one of predetermined thresholds. If the obtained FE value exceeds the threshold TH1 (step S304: YES), the focus error signal is again detected at a step S305. At the step S305, a threshold TH2 that is another one of the predetermined thresholds is compared with the FE, separately from the step S304.

The two thresholds TH1 and TH2 are defined on the basis of the difference between the maximum amplitude values of the FEs generated in the CD and the DVD at a time of using the lens 1 respectively. That is, the threshold TH1 is used for the CD, and the threshold TH2 is used for the DVD. Therefore, in a case that the loaded optical disk is the DVD, it complies with a condition of FE≧|TH1| at the step S304. On the other hand, if it does not comply with a condition of FE≧|TH2| at the step S305 (NO), it is discriminated as the CD. Moreover, at a step S306, it is required to set D=2, and the operation flow proceeds to a step S312. Then, the down action of the lens is stopped. If it complies with the condition of FE≧|TH2| at the step S305 (YES), it is judged as the first layer of the DVD, and thereby D=1 is set at a step S307. After that, the timer T2 is set at a step S308. This timer T2 is set to this required value, since it waits for a time when the S shape in the first layer is completed, in a case of the multiple-layer disk.

A generation time of the FE is monitored at a step S309. If the FE exceeding the threshold TH2 is again generated at a step S310, it is discriminated as the two-layer disk at a step S311, and D=3 is set. If it complies with a condition of T2≧t at the step S309 (YES), this means that there is no S shape of the FE in the second layer. Thus, the operation flow proceeds to the step S312, and then the down action of the lens is stopped. The value D is checked at a step S313 (YES), so that if D=1, it is discriminated as a one-layer disk of 0.6 mm. Or, if D=3 at the step S313 (YES), it is discriminated as a two-layer disk of 0.6 mm. So, the disk discrimination is finished at a step S315. If D=2 at the step S313 (NO), it is discriminated as a 1.2 mm disk. So, the lens 2 is set at a step S314, and the disk discrimination is finished at the step S315.

(2) Disk Discrimination Method When Using Bifocal lens

FIG. 12 shows a disk discrimination method in a case of using the bifocal lens. In FIG. 12, the lens is firstly moved up to a defined position at a step S401. After that, the lens is moved down at a defined speed at a step S402. At a step S403, a focus error signal is detected, and the obtained FE is compared with a threshold TH1 that is one of predetermined thresholds. If the obtained FE value exceeds the threshold TH1 (step S403: YES), the focus error signal is again detected at a step S404. At the step S404, a threshold TH2 that is one of the predetermined thresholds is compared with the FE, separately from the step S403. The two thresholds TH1 and TH2 are defined on the basis of the difference between the maximum amplitude values of the FEs generated by the 0 order light or the +1 order light in the CD and the DVD at a time of using the bifocal lens respectively.

That is, the threshold TH1 is used for the CD, and the threshold TH2 is used for the DVD. Thus, in a case that the loaded optical disk is the DVD, it complies with the condition of FE≧|TH1| at a step S403 (YES). If it does not comply with the condition of FE≧|TH2| at a step S404 (NO), it is discriminated as the CD. At a step S405, it is required to set D=2, and the operation flow proceeds to a step S411. Then, the down action of the lens is stopped. If it complies with the condition of FE≧|TH2| at the step S404 (YES), it is judged as the first layer of the DVD, and thereby D=1 is set at a step S406. After that, the timer T2 is set at a step S407. This timer T2 is set to this required value, since it waits for the time when the S shape in the first layer is completed, in a case of the multiple-layer disk.

A generation time of the FE is monitored at a step S408. If the FE exceeding the threshold TH2 is again generated at a step S409 (YES), it is discriminated as the two-layer disk at a step S410, and D=3 is set. If it complies with the condition of T2≧t at the step S409, this means that there is no S shape of the FE of the second layer. Thus, the operation flow proceeds to a step S411, and then the down action of the lens is stopped. The value D is checked at a step S412. If D=1, it is discriminated as the one-layer disk of 0.6 mm. Or, if D=3, it is discriminated as the two-layer disk of 0.6 mm. So, the disk discrimination is finished at a step S412.

The CD, the DVD (one-layer) and the DVD (two-layer) are discriminated by the above mentioned disk discrimination method. The DVD (two-layer) is used in this embodiment, for example.

Fourth Embodiment of the Invention

A fourth embodiment of the present invention is a method of setting the focus and tracking gain values as well as the gain value for the RF signal.

Figure 13:
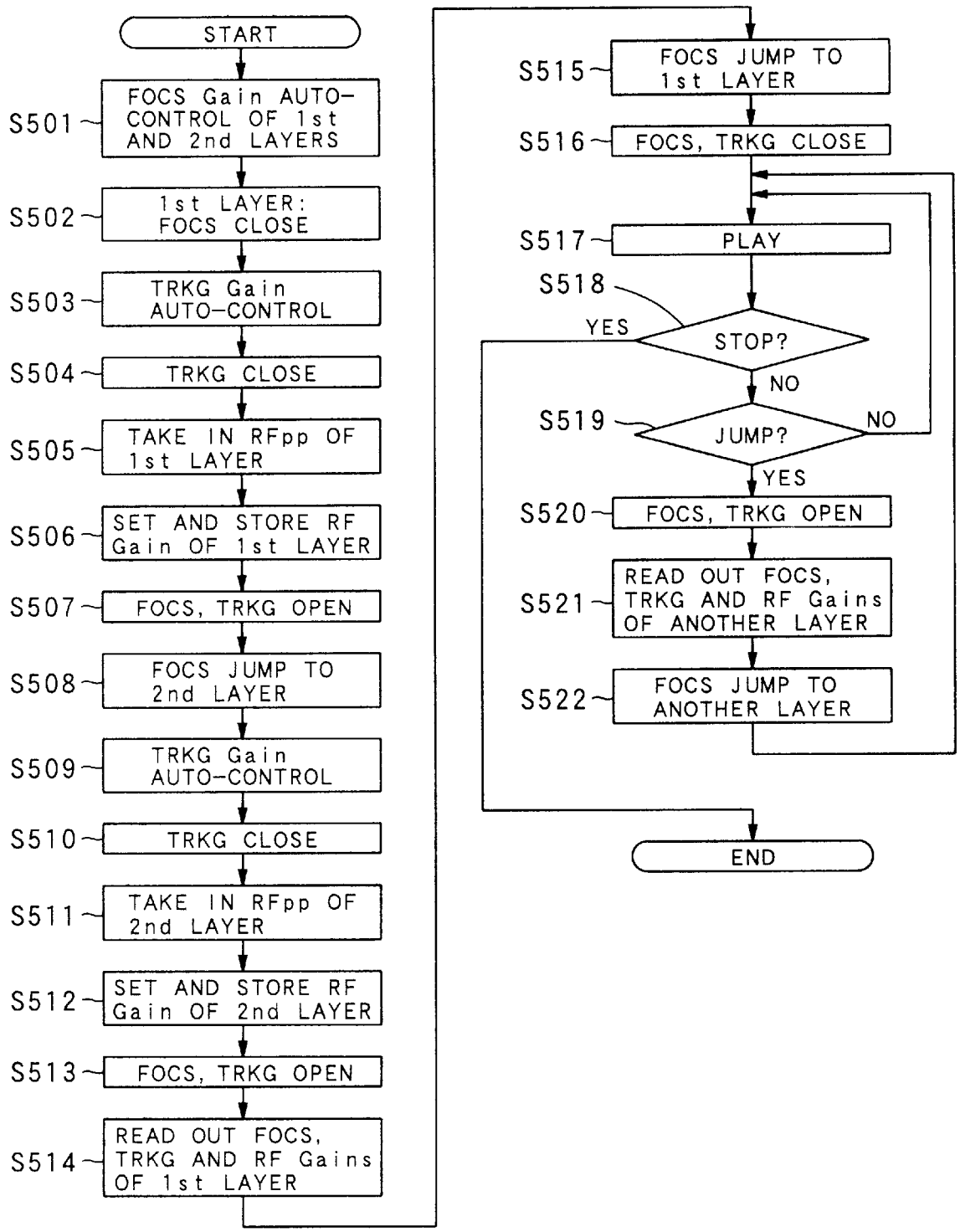
FIG. 13 is a flow chart showing an operation of a fourth embodiment of the present invention.
Figure 14:
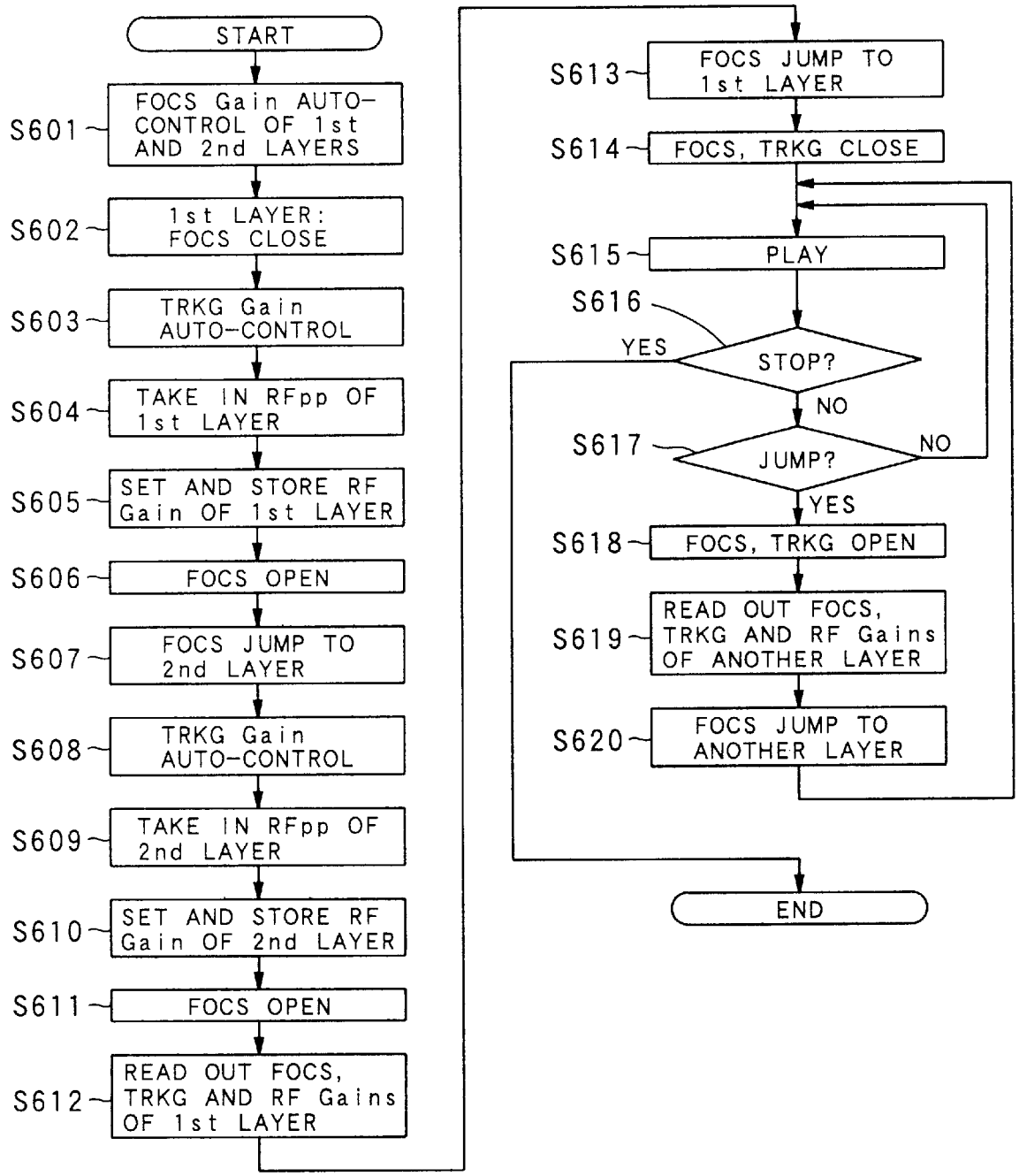
FIG. 14 is a flow chart showing an operation of a fifth embodiment of the present invention.

FIGS. 13 and 14 show flow charts in which the gain for the RF signal is adjusted, and show portions that are not included in the flow charts used in the first and second embodiments of the present invention. At first, the fourth embodiment is explained with reference to FIG. 13. At a step S501, the focus gains for the first and second layers are automatically adjusted as indicated in the above mentioned embodiments. Then, the focus loop of the first layer is made close at a step S502. After that, the tracking gain for the first layer is adjusted at a step S503. Then, the tracking loop is made close at a step S504. The maximum amplitude value of the RF signal of the first layer is taken in at a step S505. The gain value is calculated by the RGA 48 and the servo controller 38, and stored in the RAM 42 at a step S506.

Next, the focus and tracking loops are made open at a step S507. The operation flow proceeds to the second layer at a step S508. Since operations at the steps S509 to S513 for the second layer are similar to those at the steps S503 to S507 for the first layer, the explanations thereof are omitted.

After that, the focus gain value, the tracking gain value and the RF gain value for the first layer stored in the RAM 42 are read out at a step S514. Then, the focus is again made open and the jump is performed to the first layer at a step S515. The focus and tracking loops are made close at a step S516. At a step S517, the multiple-layer disk type of the reproducing apparatus is made in a play state so as to perform a reproduction. If the reproduction of the loaded disk is completed or a stop command is issued at a step S518 (YES), the operation is ended. On the other hand, when the stop command is not issued at the step S518 (NO), and if a command to jump to another layer is issued at a step S519 (YES), the tracking and focus loops are made open at a step S520, and the focus gain value, the tracking gain value and the RF gain value for another layer are read out at a step S521. Then, the jump to another layer is performed at a step S522, and the operation flow returns to the step S517 so as to perform the play of the multiple-layer. If the play is completed (step S18: YES), the reproduction is ended.

As mentioned above, since the gain values for the RF signals in the respective layers are also set and stored, it is possible to make the respective servos stable at a time of reproducing to thereby accurately reproduce the signal.

Fifth Embodiment of the Invention

A fifth embodiment of the present invention is a method of taking in the maximum amplitude signal of the RF signal without making the tracking loop close, as a modification of the fourth embodiment of the present invention.

The fifth embodiment of the present invention is explained with reference to FIG. 14. Since operations at steps S601 to S603 are same as the steps S501 to 503 of FIG. 13, the explanations thereof are omitted. At a step S604, the maximum amplitude value of the RF signal of the first layer is read while the tracking open state is kept. Then, the gain is calculated by the RGA 48 and the servo controller 38, and stored in the RAM 42 at a step S605.

Next, the focus loop is made open at a step S606, and the jump to the second layer is performed at a step S607. Since operations of steps S608 to S610 for the second layer are similar to those of steps S603 to S605 for the first layer, the explanations thereof are omitted. After that, the focus loop is made open at a step S611. Then, the focus gain value, the tracking gain value and the RF gain value for the first layer stored in the RAM 42 are read out at a step S612. The jump to the first layer is performed at a step S613, and the focus and tracking loops are made close at a step S614. Since operations at steps S615 to S620 are the same as to those at the steps S517 to S522 in FIG. 13, the explanations thereof are omitted.

As mentioned above, in the fifth embodiment of the present invention, the maximum amplitude values of the RF signals in the respective layers are taken in while the tracking is kept in the open state. Thus, the adjustment time is shorter than that of the fourth embodiment of the present invention to thereby make the setting operation quicker.

Sixth Embodiment of the Invention

A sixth embodiment of the present invention is a method of preparing and storing a set value of the gain value for the RF signal for each disk and each layer in advance, as a modification of the fifth embodiment of the present invention.

Figure 15:
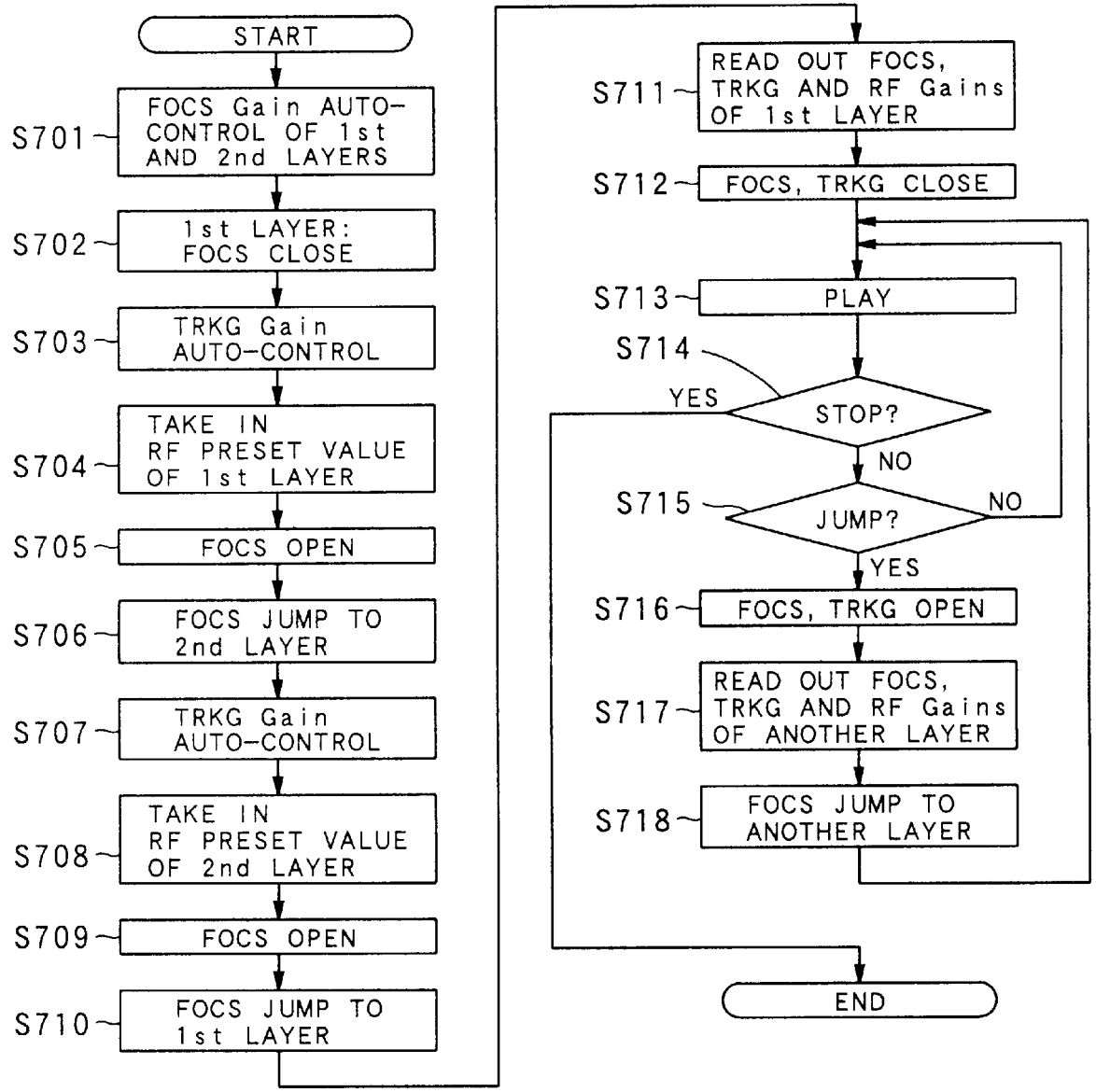
FIG. 15 is a flow chart showing an operation of a sixth embodiment of the present invention.

The sixth embodiment of the present invention is explained with reference to FIG. 15. Since operations at steps S701 to S703 are the same as those at the steps S601 to 603 of FIG. 14, the explanations thereof are omitted. At a step S704, the gain value for the RF signal of the first layer is read and set, which is stored in the ROM 39 in advance as defined value for each disk and each layer. The focus loop is made open at a step S705, and the jump to the second layer is performed at a step S706. After the tracking gain is adjusted at astep S707, the gain value for the RF signal of the second layer is read and set, which is stored in the ROM 39 in advance, similarly to the case of the first layer, at a step S708. The focus loop is made open at a step S709, and the jump to the first layer is performed at a step S710. Then, the focus gain value, the tracking gain value and the RF gain value for the first layer stored in the RAM 42 are read out at a step S711. Then, the focus and tracking loops are made close at a step S712. Operations on and after a step S713 are the same as those at the steps S615 to S620 in FIG. 14. Thus, the explanations thereof are omitted.

As mentioned above, in the sixth embodiment of the present invention, the gain value for the RF signal is prepared and stored as a set value for each disk and each layer in advance. Thus, the adjustment time is shorter than that of the fifth embodiment of the present invention to thereby make the setting operation quicker.

Although the example of adjusting the focus and tracking gains as well as the RF gain has been explained in the embodiments, it is naturally possible to adjust only the RF gain. Further, it is allowable to: extract a signal in a particular frequency band, for example, 3T (minimum time width) through the RGA 48 and the servo controller 38 or extract only the 3T through the BPF (Band Pass Filter); perform an A/D conversion thereof; take in a level of the 3T; send it to the RGA 48; and make the level of at least the 3T frequency up, so as to simultaneously perform the equalizer adjustment or perform only the equalizer adjustment. Accordingly, this enables an eye pattern of the RF signal to be open, and a proper spindle servo to be performed, to thereby improve the signal reading capability.

In the embodiments, as shown in FIGS. 13 or 14, the maximum amplitude value of the RF signal is read by the tracking close circuit/open circuit, and thereby the gain of the RF signal is adjusted. However, in a case of generating the RF signal from a four-division light converter (not shown) within the optical pickup 22 similarly to the focus error, it is possible to read the maximum amplitude value of the focus errors of the first and second layers and set and store the gain values for the RF signals of the respective layers from this value, to thereby achieve the similar effect.

More concretely, in this case, a standard value as for a level of the FE of a standard disk, for example, for each of layers, is stored in the RAM 42 in advance, and the standard value of each layer is compared with the FE value of each layer, so that the gain value as a ratio to the RF signal for each layer is set and stored.

Further, in the embodiments, the RF gains are adjusted and stored only for the first and second layers of the two-layer disk. However, as for the first layer disk of the DVD or the CD, it is also allowable to adjust, store and use the respective gain values for the focus, the tracking and the RF, and/or the equalizer value. Further, in a case of measuring the focus and tracking gain values and/or the equalizer value to thereby adjust and store them, the set value may be prepared in advance for each disk and each layer with respect to the RF gain value and/or the equalizer value, and stored in the ROM 39. Then, this set value may be used without performing the adjustment.

Furthermore, in order to cope with a flaw of a disk during measuring or adjusting the gain value and/or the equalizer value, the flaw detecting circuit (not shown) may be separately mounted, so that the measurement can be stopped until the flaw is solved, or the measurement can be performed again.

Incidentally, in a case of producing a disk in which one pair of the above mentioned two-layer disks are formed on both sides thereof, it is possible to store the adjustment values in the respective record layers as well as surface discrimination information thereof, so as to perform a quick correspondence even if a disk reproduction surface is changed. Further, by storing the information peculiar to the disk with the adjustment value, it is possible to discriminate the peculiar information at a time of reproducing, so as not to perform the initial setting operation again with respect to the disk, to which the initial setting operation has been once performed.

Seventh Embodiment of the Invention

At first, a seventh embodiment of the present invention is explained with reference to FIGS. 16 to 21. Although an apparatus of this embodiment is a DVD/CD compatible type of a reproducing apparatus, a case of reproducing the DVD as an information record medium is explained in this embodiment.

Figure 16:
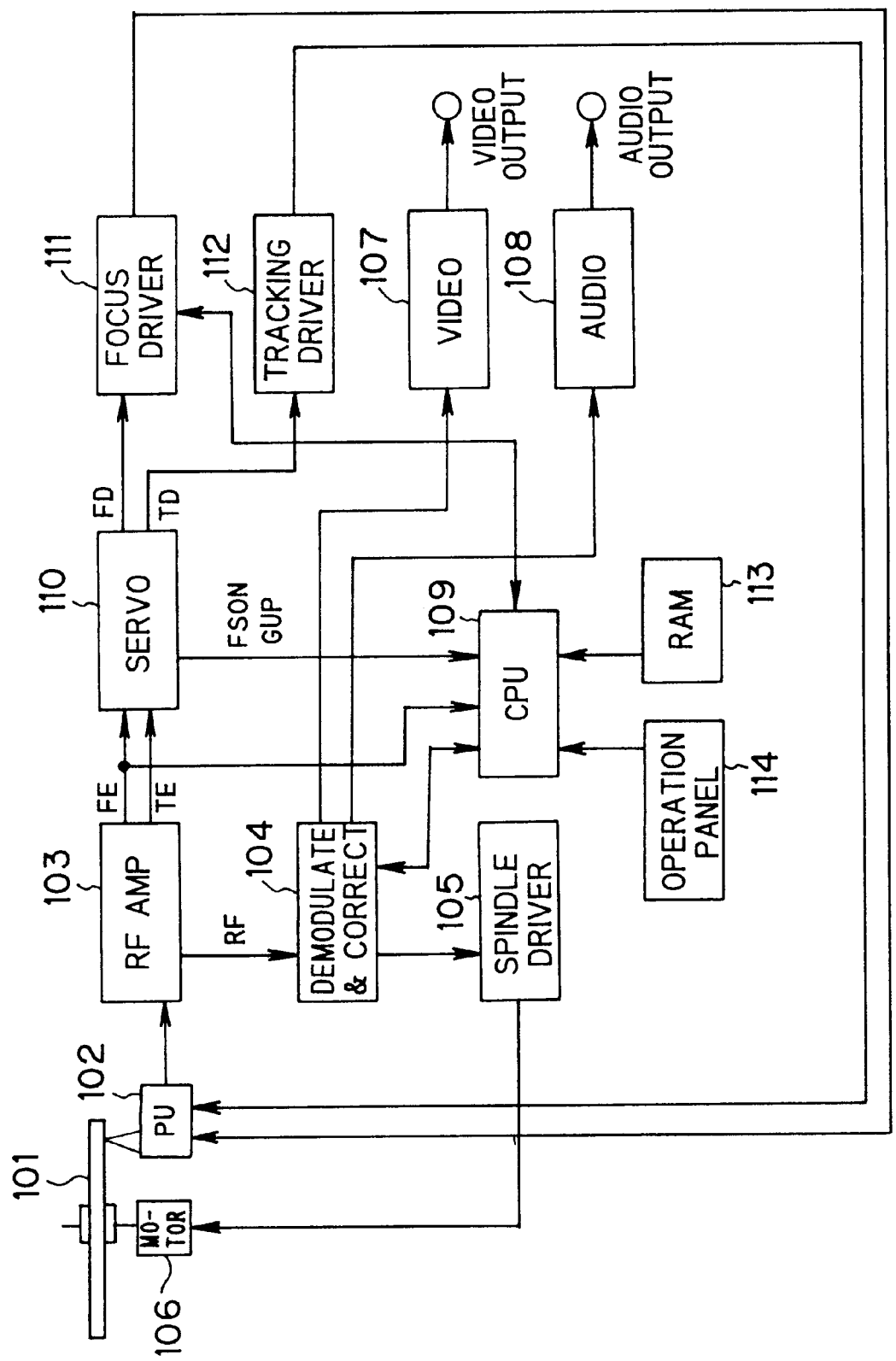
FIG. 16 is a block diagram showing a summarized construction of a reproducing apparatus for an information record medium as a seventh embodiment of the present invention.

FIG. 16 shows a block diagram indicating a schematic configuration of the reproducing apparatus of this embodiment. In FIG. 16, an optical disk 101 is the DVD as one example of the information record medium. In the optical disk 101, information is recorded on an information track by using, for example, a phase pit or a magnetic record mark. An optical spot is formed by light beams from a laser diode (not shown) included in an optical pickup 102 as one example of a reading device.

A reflection light of this optical spot is inputted to a receiving optics such as a four-division photo detector (not shown) included in the optical pickup 102 and the like, as a reflection light to which astigmatism is given. A detection signal is outputted from the receiving optics.

An RF Amplifier 103, which is a constitutional element of one example of a reproduction process device, generates an RF (Radio Frequency) signal from the detection signal outputted by the receiving optics of the optical pickup 102, and also outputs a focus error signal FE and a tracking error signal TE.

This RF signal is inputted to a spindle driver 105 as a standard signal to achieve a synchronization for a spindle motor 106 after the RF signal is demodulated and corrected by a demodulation and correction circuit 104, and is also inputted to a video circuit 107 and an audio circuit 108, respectively, as a video signal and an audio signal. Accordingly, a video output and an audio output can be generated, respectively.

On the other hand, the focus error signal FE and the tracking error signal TE are outputted from a servo circuit 110 controlled by a CPU 109 as one example of a control device, to a focus driver 111 and a tracking driver 112 as one example of a drive device, respectively, as a focus drive signal FD and a tracking drive signal TD. Accordingly, a focus servo and a tracking servo are performed. The servo operation by this servo circuit 110 is switched between a close state and an open state by a servo control signal FSON from the CPU 109. A gain up signal GUP for making a servo sensibility higher is also outputted from the CPU 109 to the servo circuit 110. Moreover, the focus drive signal FD and the tracking drive signal TD are controlled and outputted by the servo circuit 110 when the servo is close. A focus jump signal and a rising/lowering signal of the focus are outputted by an output command from the CPU 109 when the servo is open. For this reason, a RAM 113 in which a pulse width of the focus drive signal FD and the like are stored is connected to the CPU 109.

An operation panel 114 is connected to the CPU 109. Operation information, such as start or stop of the reproduction of the optical disk 1 and the like, are inputted through the operation panel 114 to the CPU 109. Incidentally, a signal for indicating whether or not the optical disk 1 is loaded is also inputted to the CPU 109 through a sensor and the like, although this mechanism is not shown in FIG. 16.

Figure 17:
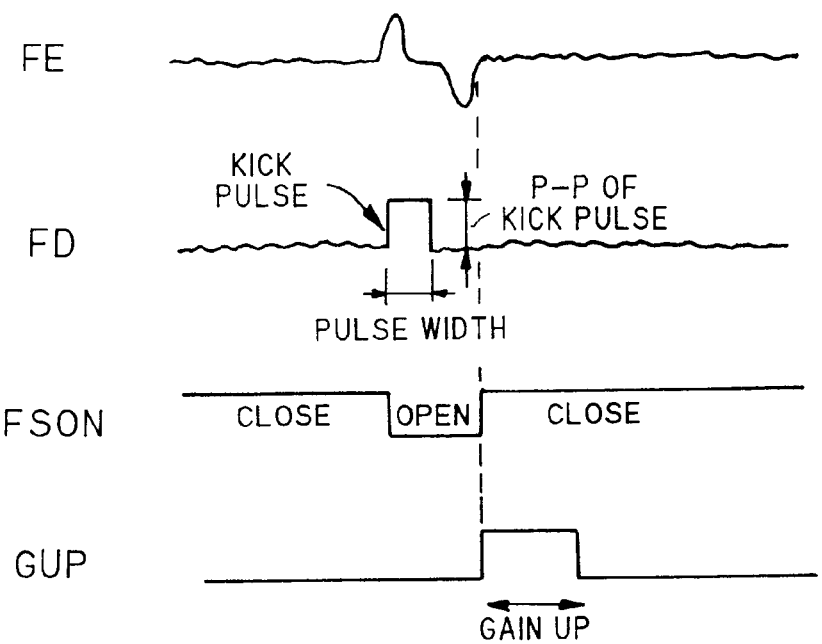
FIG. 17 is a timing chart showing one example of control signals etc. with respect to a focus driver in the seventh embodiment.

In a case of the reproducing apparatus of this embodiment having the above mentioned configuration, it is necessary to jump an objective lens of the optical pickup 102 from one information record layer to another information record layer in order to reproduce the optical disk having multiple layers. This jump is performed by outputting a kick pulse as the focus drive signal FD as shown in FIG. 17, to the focus driver 111. A kick pulse height i.e. peak to peal (p—p) value and a pulse width of this kick pulse are set from the viewpoints of an interval between the information record layers and a moving amount of the objective lens. For example, it is possible to make the peak value larger and the pulse width shorter, to thereby jump the objective lens to a target position more quickly.

In case of outputting the kick pulse, the servo control signal FSON is outputted from the CPU 109 to the servo circuit 110 to thereby make the servo open, and then an output request of the focus drive signal FD is issued so as to output a kick pulse with a predetermined pulse width and peak value to the servo circuit 110. Accordingly, a kick pulse as shown in FIG. 17 is outputted from the servo circuit 110 to the focus driver 111. Then, the objective lens of the optical pickup 102 is jumped by a predetermined amount corresponding to a drive signal based on the kick pulse, from the focus driver 111. If the objective lens is jumped, for example, from a lower portion to an upper portion, it is moved upward from a focal point by the kick pulse. Thus, for example, an upward focus error signal FE is generated. Further, when it is faced to a focal point in a second layer, a downward focus error signal FE is generated. Therefore, the focus is made close at a position at which this downward focus error signal FE is generated. So, the CPU 109 detects the zero cross of this focus error signal FE to thereby output the servo control signal FSON to the servo circuit 110 so as to make the servo close. Moreover, the CPU 9 outputs to the servo circuit 110 the gain up signal GUP for transiently making a focus gain larger, so as to stabilize the focus coil at the jumped point. An output time for this gain up signal GUP is referred to as a gain up time.

Figure 18:
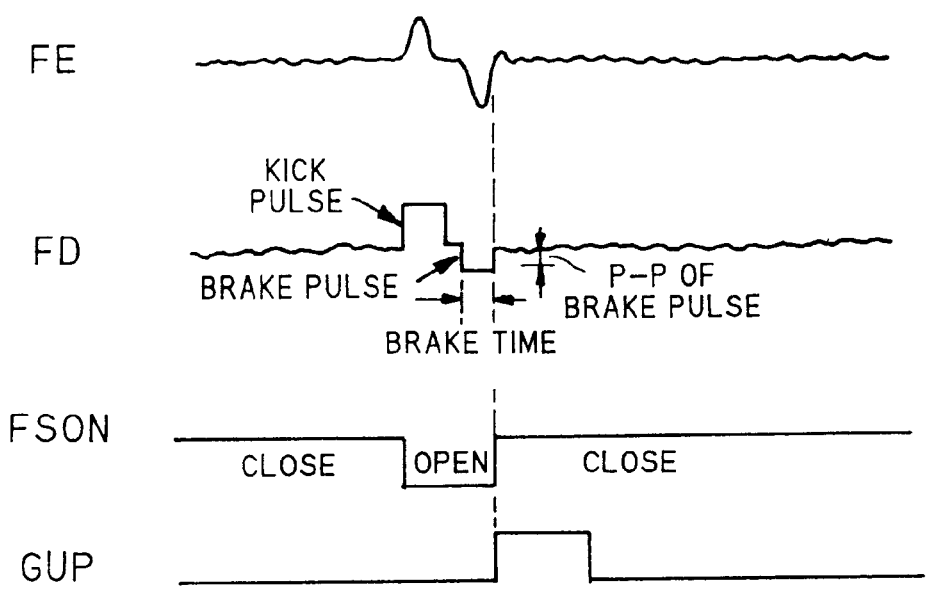
FIG. 18 is a timing chart showing another example of control signals etc. with respect to the focus driver in the seventh embodiment.

Furthermore, in order to suddenly stop the optical pickup at the jumped point, a brake pulse may be applied to the focus driver 111 as the focus drive signal FD after the jump pulse, as shown in FIG. 18. Since a moving part is tried to be suddenly stopped also in this case, there may be a possibility that a focus coil cannot become quickly stable. Thus, such a method is performed in which not only the brake pulse is applied, but also the focus gain is transiently made higher until it becomes stable.

As mentioned above, it is necessary to set the pulse width, the peak value, the brake pulse width and the gain up time to predetermined values, in order to jump the optical pickup to thereby reproduce the multiple-layer disk. In a case that the interval between the information record layers is not known, it is necessary to set an average pulse width, peak value, brake pulse width and gain up time and to output the kick pulse to thereby detect the zero cross signal of the focus error signal FE. Thus, in a case that these values are not appropriate, for example, in a case that the interval between the layers is longer than an average interval, and in other cases, an excess time is required until the servo is made close.

However, by examining relations between the moving amount of the objective lens and the pulse width, the peak value, the brake pulse width and the gain up time in advance, it is possible to select an appropriate pulse width and the like in accordance with the interval between the layers to thereby jump the objective lens in the shortest time.

Then, this embodiment is constituted so as to store in advance the pulse width, the peak value, the brake pulse width and the gain up time which correspond to the several intervals between the layers, and measure the intervals between the layers in the information record layers immediately after loading the optical disk and then read out the pulse width and the like corresponding to the measured interval between the layers when switching between the information record layers, to thereby jump the objective lens of the optical pickup 102 to the target position quicker and much accurate.

In this embodiment, the pulse width, the peak value, the brake pulse width and the gain up time which correspond to the interval between the layers are measured in advance, and stored in a ROM and the like (which are not shown) within the CPU 109 as a table. Then, the pulse width and the like corresponding to the interval between the layers are selected from the table at a predetermined time, and stored in the RAM 113. That is, the CPU 109 and the RAM 113 are used as one example of a selection device and one example of a parameter memory respectively, in this embodiment.

Figure 19:
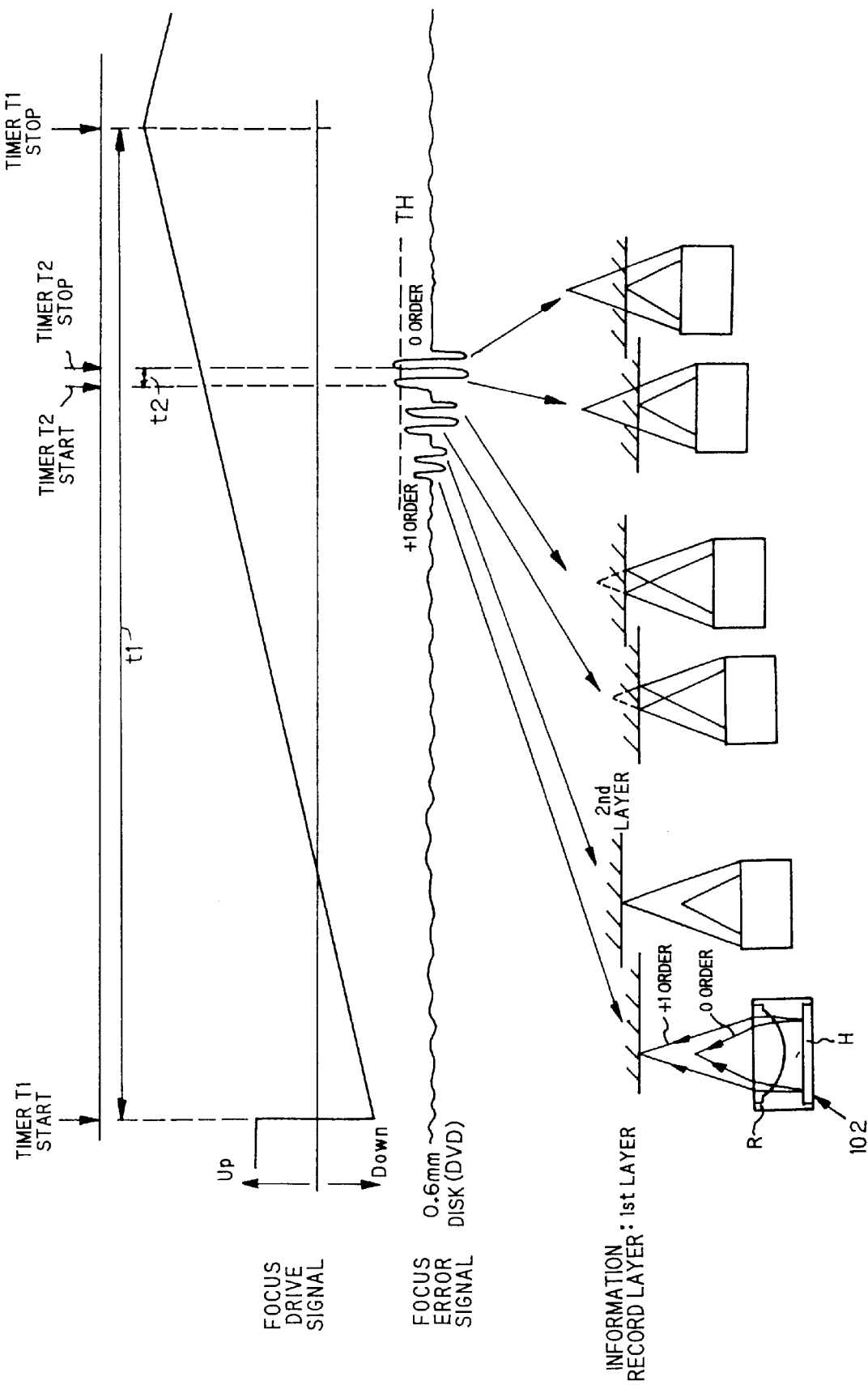
FIG. 19 is a timing chart showing a moving condition of an objective lens of an optical pickup, a focus error signal obtained thereat and a start and stop operation of a timer in the seventh embodiment

Next, a method of measuring the interval between the layers in this embodiment is explained. At first, the optical pickup 102 used in the apparatus of this embodiment is explained in detail. The optical pickup 102 of this embodiment comprises, for example, a bifocal lens as shown in FIG. 19.

The optical pickup 102 comprising this bifocal lens has a structure in which it is possible to emit two light beams focused on different positions on one straight line. That is, in the bifocal lens, a diffraction grating H and an objective lens R are arranged on one optical path, as shown in FIG. 19. Light beams made parallel to each other by a collimator lens (not shown) are divided into three beams: a 0 order light and ±1 order lights, by the diffraction grating H. Utilization of a difference between the optical path lengths of the 0 order light and the +1 order light among them enables the 0 order light and the +1 order light to be focused on the different positions on one straight line.

Actually, the +1 order light, is adapted to be focused on a farther position from the objective lens R than the 0 order light. The 0 order light is set so as to be optimally collected on the information record surface of the DVD, and further the +1 order light is set to be optimally collected on the information record surface of the CD. The utilization of the optical pickup having such a bifocal lens enables the apparatus of this embodiment to reproduce both of the CD and the DVD.

In the two light beams from the optical pickup 102 having the bifocal lens, the +1 order light is set to be optimally collected on the CD, and the 0 order light is set to be optimally collected on the DVD. Accordingly, the +1 order light is longer in focal length. Thus, for example, as shown in FIG. 19, when the bifocal lens is moved up for the multiple-layer DVD, the +1 order light is firstly collected on a first layer of the information record surface of the DVD, and then a focus error signal is detected. Next, it is collected on a second layer of the information record layer, and the similar focus error signal is detected. Apseudo focus error signal is detected which is generated since a reflection light from the first layer of the +1 order light is routed through an optical path of the 0 order light. Moreover, the similarly pseudo focus error signal is detected by a reflection light from the second layer. Finally, a focus error signal is detected from the first layer corresponding to the 0 order light. Furthermore, a focus error signal is also detected from the second layer.

As mentioned above, in the multiple-layer disk, a total of six focus error signals are generated by using the optical pickup 102 having the bifocal lens. However, by setting a threshold TH which is larger than a peak value of the pseudo focus error signal and smaller than a peak value of the focus error signal for the 0 order light, a focus error signal exceeding the threshold TH is only the focus error signal for the 0 order light. Thus, since a moving speed of the optical pickup is constant, it is possible to measure an interval between the occurrences of the bifocal error signals for this 0 order light to thereby measure an interval between the first layer and the second layer in the information record layers.

That is, a timer as one example of a time counting device is actuated at a time of detecting the focus error signal larger than the threshold TH. Then, the timer is stopped at a time of detecting a next focus error signal. Accordingly, it is possible to determine an interval between two successive focus error signals. Assuming that a value determined by the timer counting action is t, and that a constant based on the up and down moving speed of the objective lens is a. Then, X=t/a is a value peculiar to an interval between layers. By the CPU 109 as one example of the calculation device, for example, if X is defined by a following expression (1) as:

$$1.6 \leq X \leq 2.5 \qquad (1)$$

the interval between the layers is judged as 40 μm. Or, if X is defined by a following expression (2) as:

$$2.6 \leq X \leq 3.5 \qquad (2)$$

the interval between the layers is judged as 60 μm. When t=4 msec, and if a=2, the loaded disk is discriminated as a disk having an interval of 40 μm since X=4 msec/2=2, in this example.

Figure 20A:
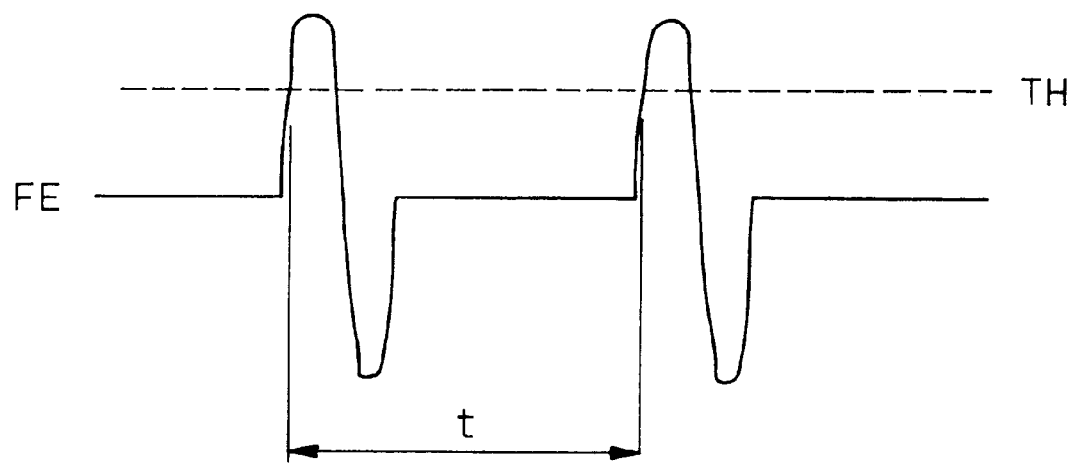
FIG. 20A is a timing chart showing one example of a time-measurement timing for intervals of the focus error signals in the seventh embodiment.
Figure 20B:
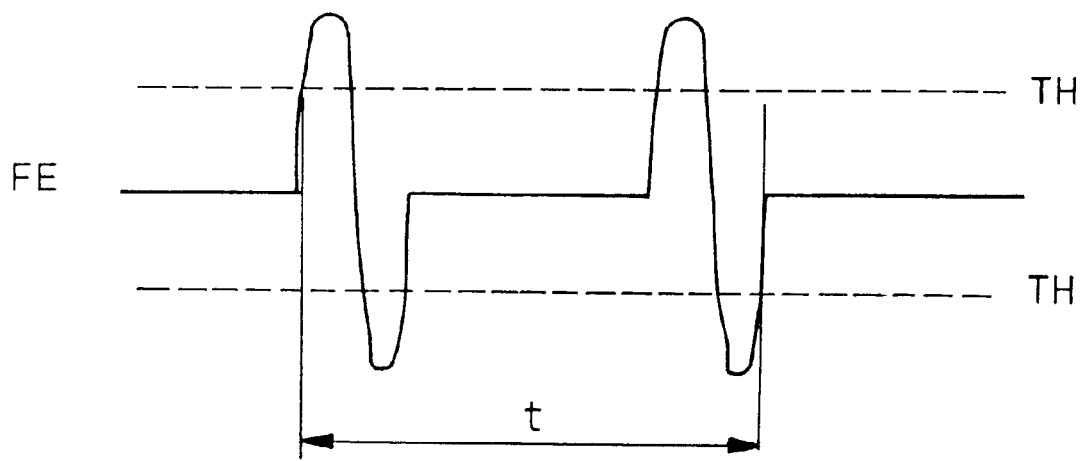
FIG. 20B is a timing chart showing another example of a time-measurement timing for intervals of the focus error signals in the seventh embodiment.

A measured interval between the focus error signals may be from a time point when the focus error signal exceeds the predetermined threshold TH, to a time point when the next focus error signal exceeds the threshold TH, as shown in FIG. 20A. Alternatively, by setting the thresholds at an upper side and a lower side as shown in FIG. 20B, the measured interval may be from a time point when a first rising portion of the focus error signal exceeds the threshold at the upper side, to a time point when a second trailing portion of the focus error signal drops below the threshold at the lower side.

Figure 21:
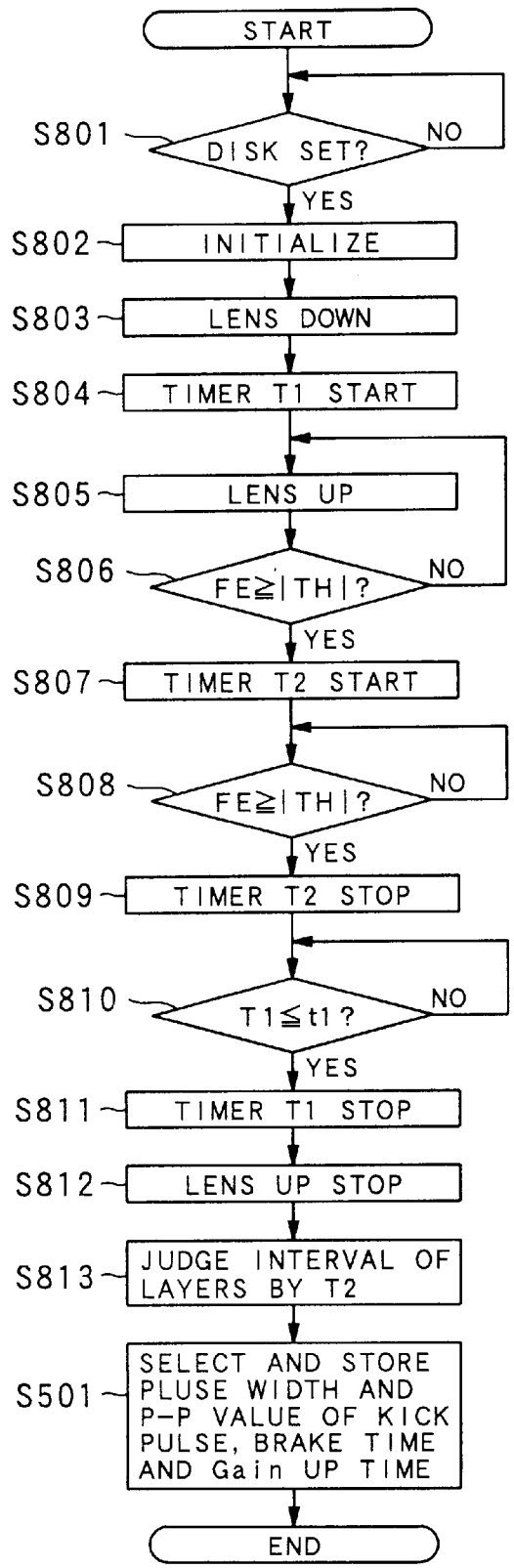
FIG. 21 is a flow chart showing an operation of controlling a layer interval measurement in the seventh embodiment.

Next, operations of the apparatus of this embodiment are explained with reference to FIGS. 19 and 21. Incidentally, respective processes shown in FIG. 21 are mainly performed by the CPU 109. Timers T1 and T2 described later as one example of a time counting device are built in the CPU 109.

As shown in FIG. 21, it is firstly judged whether or not the disk is set (Step S801). If the disk is judged to be set, a content of the RAM 113 and the timers T1 and T2 are cleared, and a register and the like included in the CPU 109 are initialized (Step S802). Next, the objective lens is moved down to a lower limit shown in FIG. 19 (Step S803). After the objective lens arrives at the lower limit, an operation of the timer T1 is started (Step S804) in order to check the arrival of the objective lens to an upper limit. Moreover, the objective lens is moved up (Step S805). As for a focus error signal detected during the up action (refer to FIG. 19), it is judged whether or not any of the peak values exceeds the threshold TH (Step S806). If the peak value exceeds the threshold TH (Step S806; YES), an operation of the timer T2 is started (Step S807) in order to measure a time required until a next peak value exceeds the threshold TH. Next, it is judged whether or not the next peak value exceeds the threshold TH (Step S808). If it exceeds (Step S808 ; YES), the operation of the timer T2 is finished (Step S809).

After that, the operation waits until the value of the timer T1 exceeds a predetermined value t1 (Step S810). If it exceeds (Step S810; YES), it is judged that the objective lens is moved to the upper limit. The timer T1 is stopped (Step S811), and the up action of the objective lens is stopped (Step S812).

The interval between the information record layers is determined from the aforementioned judgment expressions (1) and (2) on the basis of the value of the timer T2 (Step S813). At least one value among the pulse width, the peak value, the brake time and the gain up time for the optimal kick pulse is selected from the table, on the basis of the interval between the layers. Then, it is stored in the RAM 113 (Step S814).

Since the value to jump the objective lens is stored as mentioned above, unless the disk is replaced after that, it is possible to output a control signal to the servo circuit 110 on the basis of the stored value to thereby jump the objective lens to a position suited for each of the information record layers accurately and quickly.

Eighth Embodiment

Next, an eighth embodiment of the present invention is explained with reference to FIGS. 22 and 23. Incidentally, identical reference numbers are assigned to parts common to the seventh embodiment. Then, the explanations thereof are omitted.

In this embodiment, a disk discrimination is performed at the same time when the interval between the layers is measured as mentioned above. For example, it is discriminated that any of the one-layer DVD, the multiple-layer DVD and the CD is loaded. Thus, the CPU 109 functions as one example of a discrimination device in this embodiment.

Since a structure of a hardware of this embodiment is the same as that of the seventh embodiment, the explanation thereof is omitted. Then, a control in this embodiment is explained with reference to FIGS. 22 and 23.

Figure 22:
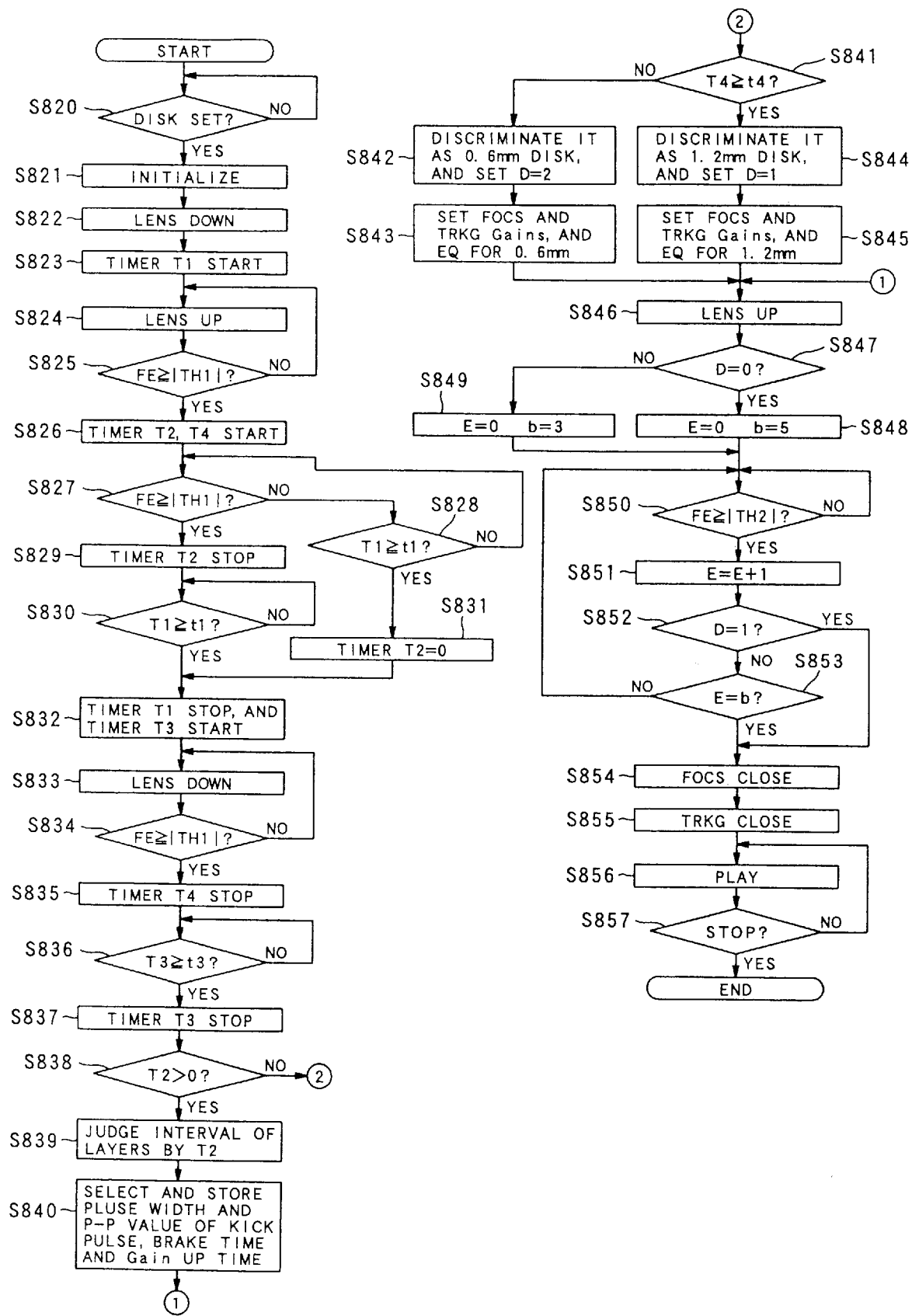
FIG. 22 is a flow chart showing an operation of controlling a layer interval measurement in an eighth embodiment of the present invention.
Figure 23:
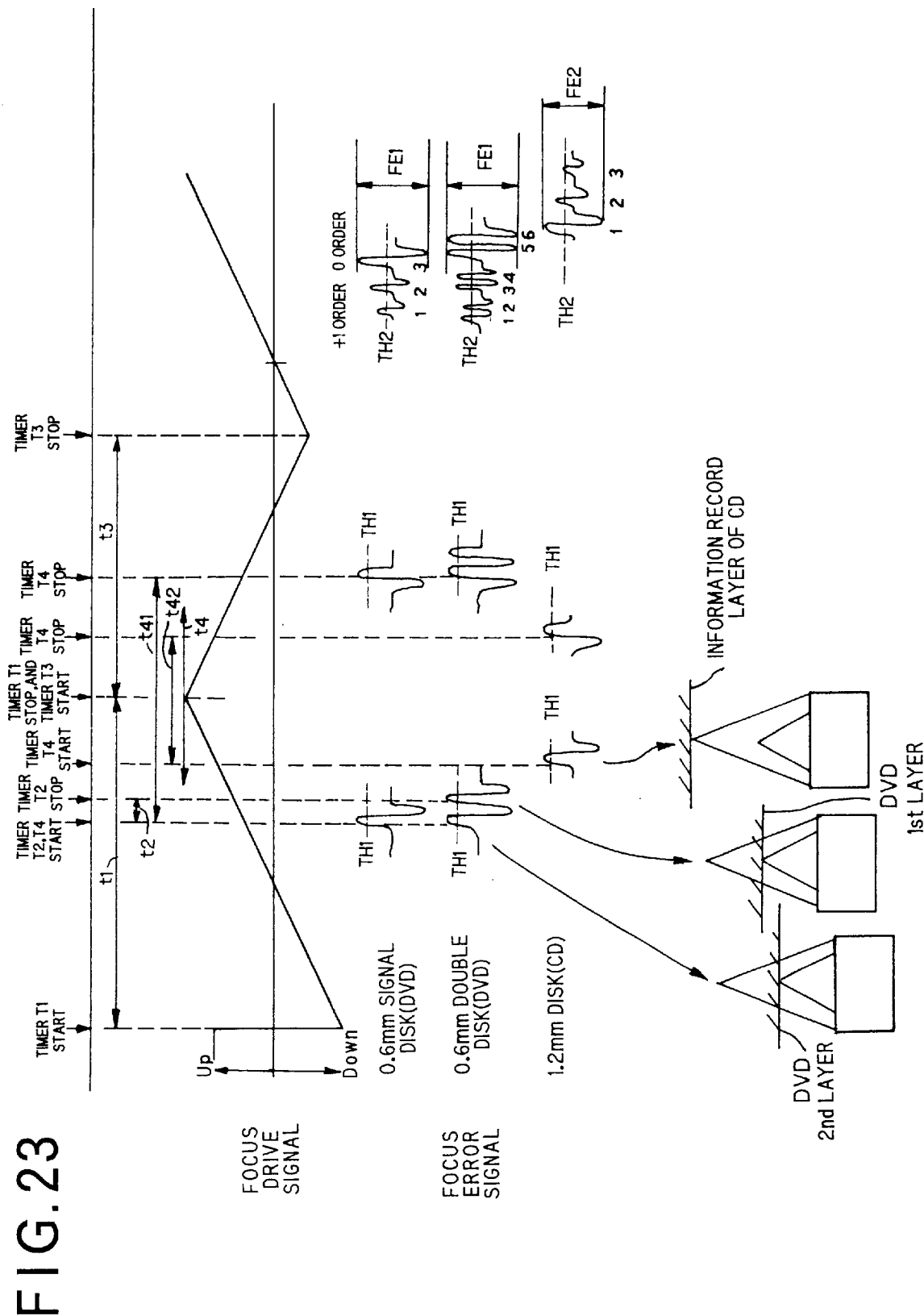
FIG. 23 is a timing chart showing a moving condition of an objective lens of an optical pickup, a focus error signal obtained thereat and a start and stop operation of a timer in the eighth embodiment.

As shown in FIG. 22, it is firstly judged whether or not the disk is set (Step S820). If the disk is judged to be set (YES), the following initializations are performed. That is, a content of the RAM 113 is cleared, and registers included in the CPU 109, for example, a register D and a counter E described later are cleared (Step S821). Next, the objective lens is moved down to a lower limit shown in FIG. 23 (Step S822). After the objective lens arrives at the lower limit, the operation of the timer T1 is started (Step S823) in order to check the arrival of the objective lens to an upper limit. Further, the objective lens is moved up (Step S824). As for a focus error signal detected during the up action (refer to FIG. 23), it is judged whether or not any of the peak values exceeds a threshold TH1 (refer to a symbol TH1 in FIG. 23) (Step S825). If the peak value exceeds the threshold TH1 (Step S825; YES), operations of the timers T2 and T4 are started (Step S826).

This timer T2 is used to measure the interval between the layers in a case that the loaded disk is the multiple-layer DVD, similarly to the seventh embodiment. The timer T4 is used to perform the discrimination between the one-layer DVD and the CD.

Next, it is judged whether or not a next peak value exceeds the threshold TH1 (Step S827). Before the timer T1 reaches the predetermined value t1, that is, when the objective lens does not arrive at the upper limit (Step S828; NO), if it exceeds the threshold TH1 (Step S827; YES), the loaded disk can be discriminated as the two-layer DVD as shown in FIG. 23. Then, the operation of the timer T2 is finished similarly to the seventh embodiment (Step S829). The operation waits until the value of the timer T1 exceeds the predetermined value t1 (Step S830).

On the other hand, even if the timer T1 reaches the predetermined value t1, when the peak does not exceed the threshold TH1 (Step S827; NO, and Step S828; YES), the loaded disk can be discriminated as the one-layer DVD or the CD as shown in FIG. 23. Then, the value of the timer T2 is cleared (Step S831).

If the timer T1 reaches the predetermined value t1 as mentioned above, it is judged that the objective lens arrives at the upper limit. Thus, the operation of the timer T1 is finished. Further, an operation of a timer T3 is started (Step S832) in order to check the arrival of the objective lens to the lower limit. Then, the objective lens is started to be moved down (Step S833).

It is judged whether or not the peak value again exceeds the threshold TH1 (Step S834). If it exceeds the threshold TH1 (Step S834; YES), an operation of a timer T4 is finished (Step S835). As shown in FIG. 23, an interval t41 at which the FE peak values are generated in a case that the disk is the one-layer DVD is shorter than an interval t42 at which the FE peak values are generated in a case of the CD.

Next, the operation waits until the timer T3 reaches a predetermined value t3 (Step S836). If it is judged that the timer T3 reaches the predetermined value t3 and the lens arrives at the lower limit (Step S836; YES), the operation of the timer T3 is finished (Step S837). A content of the timer T2 is judged (Step S838) in order to discriminate the loaded disk as the multiple-layer disk or the one-layer disk.

As mentioned above, in a case of the one-layer disk, the content of the timer T2 is already cleared. Thus, it is possible, by judging whether or not the content of the timer T2 exceeds 0 (Step S838), to discriminate it as the one-layer or multiple-layer. Namely, if the content of the timer T2 exceeds 0 (Step S838; YES), the loaded disk is discriminated as the multiple-layer DVD, similarly to the seventh embodiment. The interval between the layers is determined from the aforementioned judgment expressions (1) and (2) on the basis of the value of the timer T2, similarly to the seventh embodiment (Step S839). At least one value among the pulse width, the peak value, the brake time and the gain up time for the optimal focus jump is selected from the table, on the basis of the interval between the layers. Then, it is stored in the RAM 113 (Step S840).

On the other hand, if the content of the timer T2 is 0 (Step S838; NO), the loaded disk is discriminated as the one-layer disk. Since it is necessary to discriminate the loaded disk as the DVD or the CD, it is judged whether or not the value of the timer T4 is equal to or more than a predetermined value t4 (Step S841). This predetermined value t4 is set to a middle value between the peak value interval in the case of the DVD and the peak value interval in the case of the CD, as shown in FIG. 23. If it is equal to or more than the predetermined value t4, the loaded disk can be discriminated as the DVD. If it is less than the t4, the loaded disk can be discriminated as the CD.

Therefore, if it is more than the t4 (Step S841; NO), the loaded disk is discriminated as the DVD, and 2 is set to the register D (Step S842). Further, a focus gain, a tracking gain and an equalizer for the DVD are set (Step S843). On the other hand, if it is equal to or less than the t4 (Step S841; YES), the loaded disk is discriminated as the CD, and 1 is set to the register D (Step S844). Further, a focus gain, a tracking gain and an equalizer for the CD are set (Step S845).

Since all of the disk discriminations are finished, the objective lens is again moved up (Step S846) in order to make the focus servo close. Then, a number that the peak value exceeds a threshold TH2 is counted to thereby judge the detected light as the o order light or the +1 order light. In case of the DVD, the focus is locked by the 0 order light. In case of the CD, the focus is locked by the +1 order light. Namely, by setting this threshold TH2 to a value smaller than the peak value of the focus error signal for the +1 order light of the DVD, as shown in FIG. 23, in a case of the one-layer DVD, the focus is made close when the peak value of the focus error signal by the 0 order light exceeds the threshold TH2 at a third time. In a case of the multiple-layer DVD, the focus is made close when it exceeds the threshold TH2 at a fifth time. Or, in a case of the CD, the focus is made close when it exceeds the threshold TH2 at a first time,.

Then, it is judged whether or not the value of the register D is 0 (Step S847) in order to initialize and set the values of the registers and the counters, immediately after the objective lens is moved up. If the D is 0 (Step S847; YES), an input to the register D is not performed, and thereby the loaded disk can be discriminated as the multiple-layer disk. Thus, a value of the counter E is set to 0, and a value of the register b is set to 5 (Step S848). On the other hand, if the register D is not 0 (Step S847 ; NO), the loaded disk can be discriminated as the one-layer DVD or the CD, as mentioned above. Therefore, the value of the counter E is set to 0, and the value of the register b is set 3 (Step S849).

Then, it is judged whether or not the peak value exceeds the threshold TH2 (Step S850). If it exceeds the threshold TH2 (Step S850; YES), the counter E is incremented (Step S851). Next, the register D is judged (Step S852). Namely, if the register D is 1 (YES), the loaded disk is discriminated as the CD. Thus, in order to make the focus servo close when the focus error signal for the +1 order light is generated, this count process by the counter E is withdrawn (Step S852; YES). However, if the register D is 0 or 2, the loaded disk is discriminated as the DVD. Then, it is necessary to make the focus close when the focus error signal for the 0 order light is generated. Thus, the counting action of the counter E is repeated until the value of the counter E becomes the value of the register b set as mentioned above (Step S852; NO, and Step S853; NO).

After it is judged that the peak value of the focus error signal for the +1 order light or the 0 order light exceeds the threshold TH2 as mentioned above, the focus servo is made close (Step S854), and the tracking servo is made close (Step S855). Then, the reproduction is started (Step S856). If a stop command is issued (Step S857; YES), the reproduction is finished.

As mentioned above, parameters such as the pulse width of the kick pulse to jump the objective lens and the like are stored for the multiple-layer DVD. Thus, unless the disk is replaced after that, it is possible to jump the objective lens based on the stored parameters to thereby jump to a position corresponding to each of the information record layers accurately and quickly. Moreover, it is possible to perform the discrimination for the multiple-layer DVD, the one-layer DVD and the CD to thereby perform the correct focus servo control.

Ninth Embodiment

Next, a ninth embodiment of the present invention is explained with reference to FIGS. 24 to 27. Incidentally, identical reference numbers are assigned to parts common to the seventh embodiment. Then, the explanations thereof are omitted. This embodiment performs a focus gain adjustment and a tracking gain adjustment for each of the layers in the multiple-layer DVD, and simultaneously measures the interval between the layers.

Figure 24:
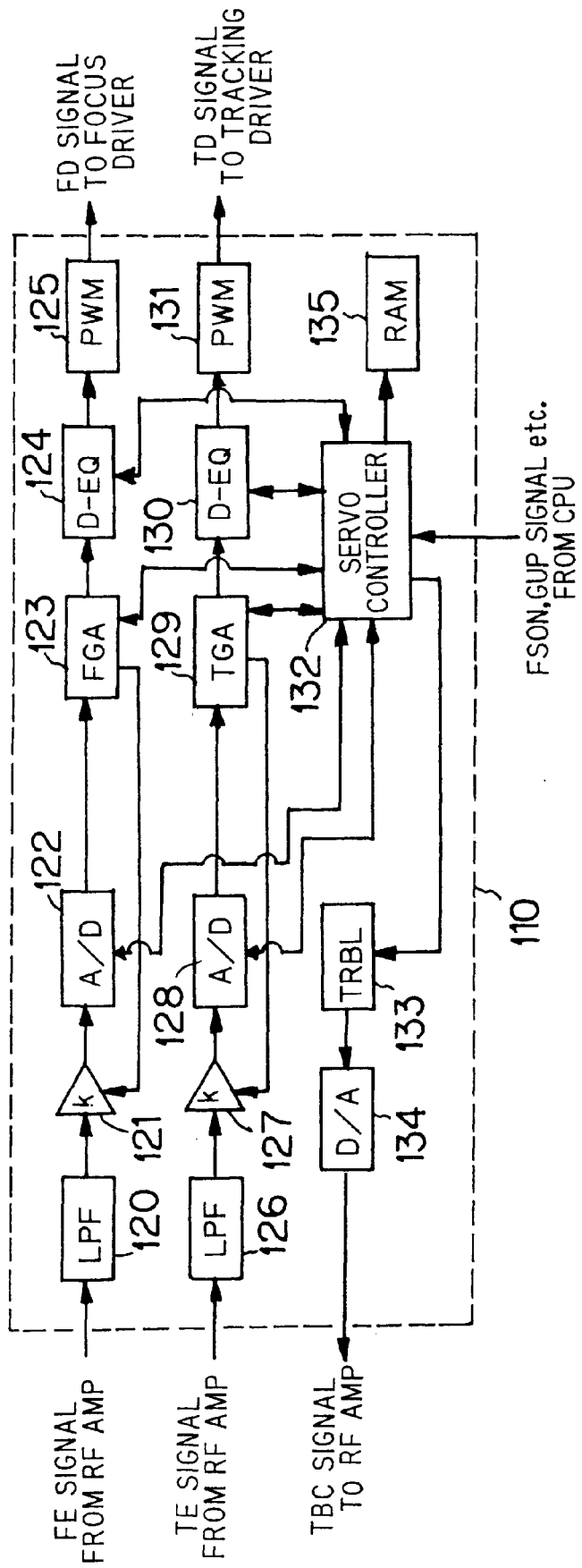
FIG. 24 is a block diagram showing a summarized construct ion of a reproducing apparatus for an information record medium as a ninth embodiment of the present invention.

FIG. 24 shows a block diagram indicating a schematic structure of the servo circuit 110 of the reproducing apparatus shown in FIG. 16. The other configuration of the reproducing apparatus of this embodiment is the same as the apparatus shown in FIG. 16. As shown in FIG. 24, an LPF (Low Pass Filter) 120 removes unnecessary frequency components equal to or more than a sampling frequency of an A/D converter 122 described later, from the focus error signal FE.

An amplifier 121 amplifies the focus error signal FE up to a predetermined voltage value to output it, and also changes the amplified amount on the basis of a focus servo gain from an FGA 123 described later.

The A/D converter 122 converts the focus error signal FE amplified by the amplifier 121 into a digital signal, outputs it to the next FGA 123 and also outputs this digitized focus error signal FE to a servo controller 132 described later.

The FGA 123 applies feedback to the amplifier 121 on the basis of the focus error signal FE outputted by the A/D converter 122, and automatically adjusts a focus servo loop gain.

A digital equalizer circuit (D-EQ) 124 is composed of a digital filter and the like, and sets a focus servo frequency band corresponding to the focus error signal FE converted into the digital signal, on the basis of a control signal from the servo controller 132 described later.

A PWM (Pulse Width Modulation) circuit 125 generates a focus drive signal FD having a pulse width corresponding to a signal level from the digital equalizer circuit 124.

An LPF 126, an amplifier 127, an A/D converter 128, a TGA 129, a digital equalizer circuit 130 and a PWM 131 are equipped in order to generate a tracking drive signal TD from a tracking error signal TE, similarly to the focus servo loop. Then, operations are performed which correspond to the respective means constituting the focus servo loop.

Further, a TRBL 133 is equipped which performs an automatic control of a tracking balance, on the basis of the control signal from the servo controller 132, in order to adjust the tracking balance. This TRBL 33 feeds back to the RF Amplifier 103 a TBC signal of adjusting a center level of the tracking error signal.

The servo controller 132 as one example of a servo calculation device and a servo controlling device calculates, on the basis of the focus error signals as described later, peak values thereof, and further outputs a control signal of setting a focus servo gain from an average of the peak values, and a control signal of setting a focus servo frequency band. Moreover, it calculates, on the basis of the tracking error signals, peak values thereof, and further outputs a control signal of setting a tracking servo gain from an average of the peak values, and a control signal of setting a tracking servo frequency band. Incidentally, data required to perform the focus servo control and the tracking servo control and the like are stored in a RAM 135 as one example of a gain memory.

Figure 25:
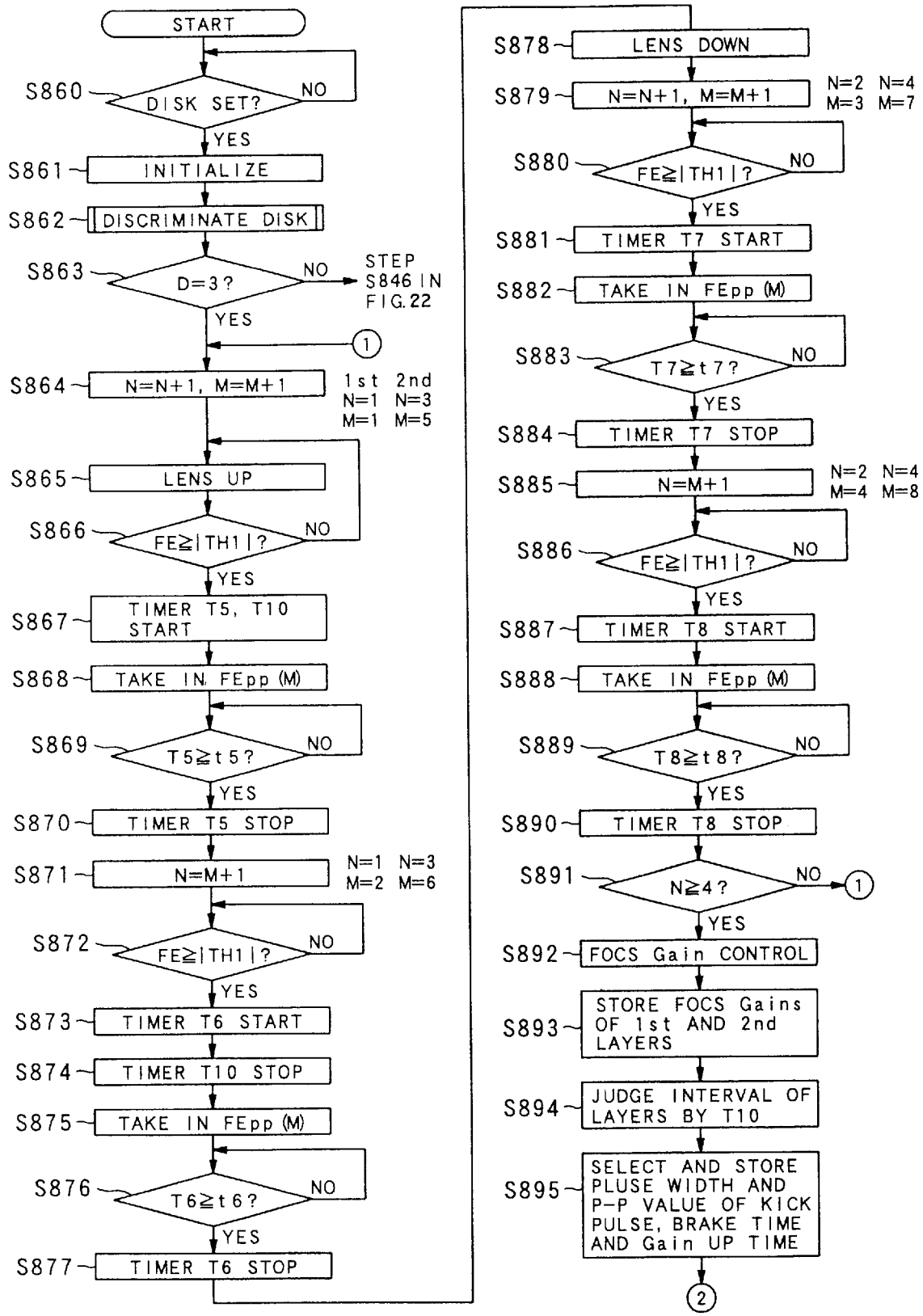
FIG. 25 is one flow chart showing an operation of controlling a layer interval measurement in the ninth embodiment.

A setup operation of the reproducing apparatus of this embodiment is explained which comprises the servo circuit 110 having the above mentioned structure. As shown in FIG. 25, it is firstly judged whether or not the disk is set (Step S860). If the disk is judged to be set (YES), the CPU 109 performs the initializing actions (Step S861). That is, it clears the content of the RAM 113 and clears registers included in the CPU 109, for example, a counter N and a counter M described later, and a timer of the servo controller 32 and the like.

Next, the disk discrimination is performed (Step S862). In this disk discrimination process, the objective lens is firstly moved to a lower limit as shown in FIG. 27 (Step S62-1).

Figure 27:
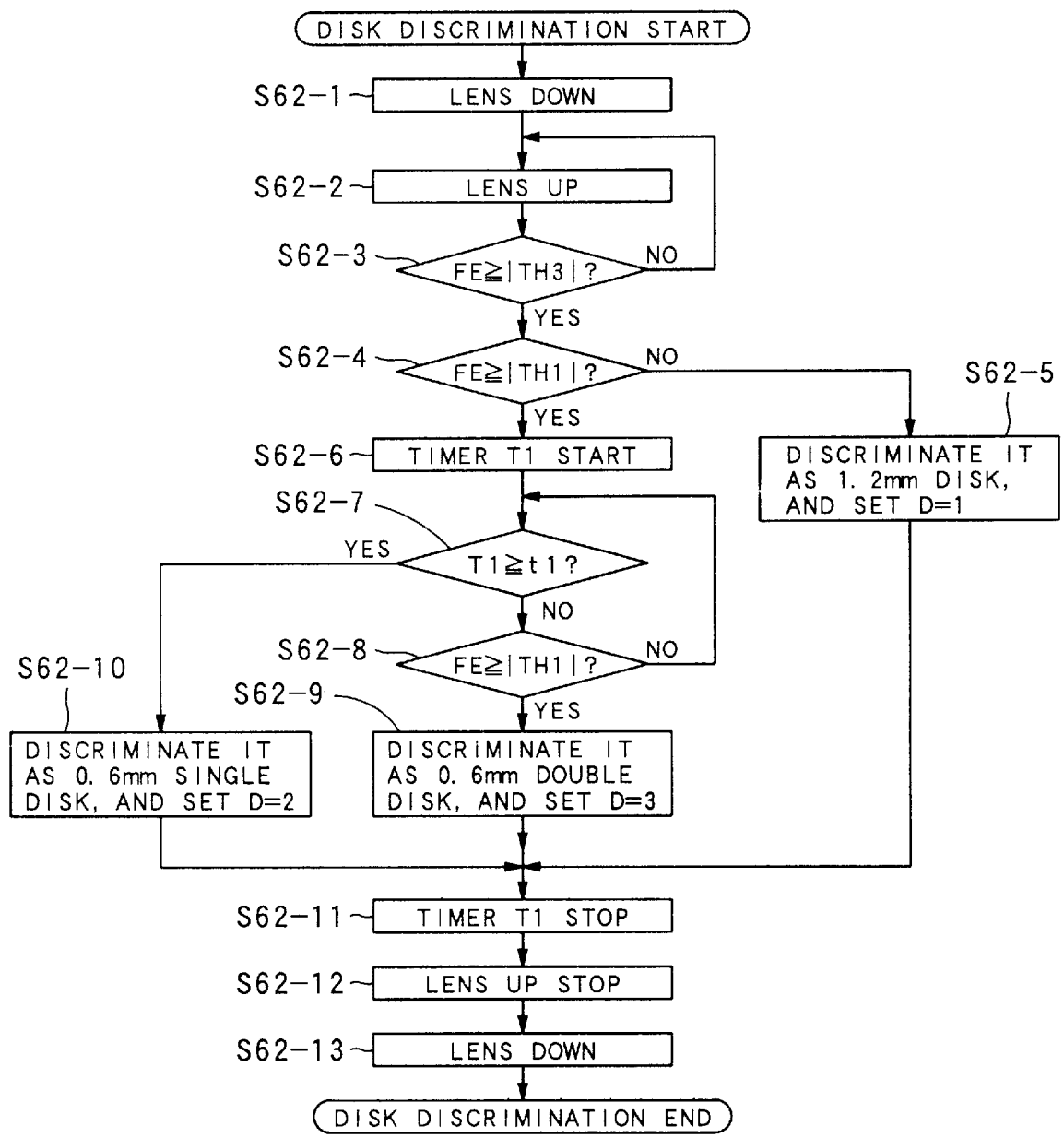
FIG. 27 is a flow chart showing an operation of discriminating a disk in the ninth embodiment.

In FIG. 27, next, while the objective lens is moved up (Step S62-2), it is judged whether or not the peak value of the focus error signal exceeds the threshold TH3 (Step S62-3). This threshold TH3 is set to a value smaller than the peak value of the focus error signal for the 0 order light in a case of the CD, as shown in FIG. 28A. In order to generate a focus error signal shown in FIG. 28A, a light division ratio of the 0 order light to the +1 order light in the optical pickup 2 is set to, for example, 70% to 30%, in this embodiment. When setting as mentioned above, a large focus error signal can be obtained for the 0 order light, even if the disk is the CD or the DVD. However, the focus error signal in a case of the DVD is larger than that in a case of the CD. Thus, even if the peak value of the obtained focus error signal exceeds the threshold TH3, when it is less than the threshold TH1, the disk can be discriminated as the CD. When it exceeds the threshold TH1, the disk can be discriminated as the DVD.

If the peak value of the focus error signal exceeds the threshold TH3 (Step S62-3; YES), it is judged whether or not the peak value further exceeds the threshold TH1 (Step S62-4). If it does not exceed (Step S62-4; NO), the disk is discriminated as the CD, and 1 is set to the register D (Step S62-5). On the other hand, if it exceeds the threshold TH1 (Step S62-4; YES), the operation of the timer T1 is started (Step S62-6) in order to judge whether or not the DVD has the multiple layers. Then, it is judged whether or not the value of the timer T1 reaches the predetermined value t1 and the objective lens arrives at the upper limit (Step S62-7). Moreover, it is judged whether or not a focus error signal exceeding the threshold TH1 is generated again before the value of the timer T1 reaches the predetermined value t1 (Step S62-8). In a case of the two-layer disk of the DVD, it is possible to obtain the focus error signal exceeding the threshold TH1 before the objective lens arrives at the upper limit as shown in FIG. 28A (Step S62-8; YES). Thus, the disk is discriminated as the two-layer disk, and 3 is set to the register D (Step S62-9). On the other hand, when it is impossible to obtain the focus error signal exceeding the threshold TH1 before the timer T1 reaches the predetermined value t1 (Step S62-7; YES), the disk is discriminated as the one-layer DVD, and 2 is set to the register D (Step S62-10).

As mentioned above, after any of the values is set to the register D, the operation of the timer T1 is finished (Step S6211). The up action of the objective lens is finished (Step S6212). The objective lens is moved down to the lower limit (Step S62-13). The disk discrimination process is finished.

In this embodiment, the following process is performed only in a case of the two-layer DVD. This reason is that, since the focus gain values and the tracking values in the first and second layers are different from each other in case of the two layer DVD, it is intended to store the focus gain value and the tracking gain value for each layer to thereby perform the proper focus servo and tracking servo.

Therefore, in order to check the discriminated result in the disk discrimination process, it is judged whether or not the value of the register D is 3 as shown in FIG. 25 (Step S863).

In FIG. 25 again, if the register D is not 3 (step S863: NO), and the disk is discriminated as the one-layer DVD or the CD, the servo close process is performed similarly to the eighth embodiment (on and after the step S846 in FIG. 22). Incidentally, the processes to this point are performed by the CPU 109, and processes on and after this point are performed by the servo controller 132, except a particular process.

On the other hand, If the value of the register D is 3 (step 863: YES) and the disk is discriminated as the two-layer DVD, the counter N for counting the number of the up and down actions of the objective lens is incremented, and the counter M for counting the focus error signals is incremented (Step S864).

Then, while the objective lens is moved up (Step S865), it is judged whether or not the focus error signal exceeding the threshold TH1 is detected during the up action of the lens (Step S866). The focus error signal exceeding this threshold TH1 is only the signal for the 0 order light. Only the focus error signal for the 0 order light is illustrated after the disk discrimination in FIG. 28A. For an easy explanation, the interval between the focus error signals after the disk discrimination process is widely illustrated in FIG. 28A.

In FIG. 25 again, if the focus error signal exceeding the threshold TH1 is detected (Step S866; YES), timers T5, T10 are actuated (Step S867).

This timer T5 is used to determine a timing of counting one focus error signal. The timer T10 is used to measure the interval between the layers in a case that the loaded disk is the multiple-layer DVD, similarly to the seventh embodiment.

Next, a peak to peak value FEpp (M) of the focus error signal is taken in and stored (Step S868). This peak to peak value FEpp (M) is used to later adjust the focus gain.

After that, the operation waits until the timer T5 exceeds a predetermined value t5 (Step S869). If it exceeds, the timer T5 is finished (Step S870). It is judged that an output of one focus error signal is finished. Then, the counter M is incremented (Step S871).

Next, it is judged whether or not the focus error signal exceeding the threshold TH1 is detected from the focus error signals for the second layer (Step S872). If such a focus error signal is detected (Step S872; YES), an operation of a timer T6 is started (Step S873) in order to measure an interval up to the upper limit of the objective lens. Further, the operation of the timer T10 for measuring the interval between the layers is finished (Step S874).

Then, a peak to peak value FEpp (M) of the focus error signal in this second layer is taken in and stored (Step S875). After that, the operation waits until the timer T6 reaches a predetermined value t6 and the objective lens arrives at the upper limit (Step S876). After that, if it is judged that this timer T6 reaches the predetermined value t6 and the objective lens arrives at the upper limit (Step S876; YES), the timer T6 is finished (Step S877).

In the process to this point, the objective lens is positioned at the upper limit, as shown in FIG. 28A. The counter N for counting the up and down actions of the objective lens is 1. Bifocal error signals are detected during this period. Thus, the counter M of the focus error signal is 2. Moreover, the peak to peak values for the respective focus error signals are stored.

Next, the objective lens is moved down (Step S878). The counters N and M are incremented (Step S879). Then, it is judged whether or not the focus error signal exceeding the threshold TH1 is detected from the focus error signals for the second layer in the down action (Step S880). If the focus error signal exceeding the threshold TH1 is detected (Step S880 ; YES), an operation of a timer T7 for determining a timing of masking the focus error signal is started (Step S881). The peak to peak value FEpp (M) of the focus error signal is taken in and stored (Step S882).

After that, the operation waits until the timer T7 exceeds a predetermined value t7 (Step S883). If it exceeds, the timer T7 is finished (Step S884). It is judged that an output of one focus error signal is finished. Then, the counter M is incremented (Step S885).

Next, it is judged whether or not the focus error signal exceeding the threshold TH1 is detected from the focus error signals for the first layer (Step S886). If such a focus error signal is detected (Step S886; YES), an operation of a timer T8 is started (Step S887) in order to measure an interval down to the lower limit of the objective lens.

Then, a peak to peak value FEpp (M) of the focus error signal in this first layer is taken in and stored (Step S888). After that, the operation waits until the timer T8 reaches a predetermined value t8 and the objective lens arrives at the lower limit (Step S889). If the value of the timer T8 reaches the predetermined value t8 (Step S889: YES), the timer T8 is finished (Step S890).

In the process to this point, the objective lens is positioned at the lower limit, as shown in FIG. 28A,. The counter N for counting the up and down actions of the lens is 2. Bifocal error signals are detected during this period. Thus, the counter M of the focus error signals is 4. Moreover, the peak to peak values for the respective focus error signals are also stored.

After that, the above mentioned process is repeated until the counter N becomes 4 (Step S891; NO, through Step S864). The process is stopped at a time point when the counter N becomes 4 (Step S891; YES). Thus, peak to peak values of four focus error signals are obtained respectively for the first layer and the second layer, at this time point.

Then, the focus gain value is calculated by calculating an average of the peak to peak values of the four focus error signals for each layer. Accordingly, the focus gain is adjusted (Step S892). Further, the focus gain values of the first and second layers are stored in the RAM 35.

Next, the CPU 109 determines the interval between the layers similarly to the seventh embodiment (Step S894) on the basis of the previously measured value of the timer T10, and selects at least one value among the pulse width, the peak value, the brake time and the gain up time for the optimal focus jump from the table, on the basis of the interval between the layers, and stores in the RAM 113 (Step S895).

In FIG. 26, then, the servo controller 132 moves up the objective lens (Step S896), and makes the focus servo in the first layer close, on the basis of the above calculated focus gain value in the first layer (Step S897). Next, an operation of a timer T12 is started (Step S898) in order to adjust the tracking balance in the first layer. A process of taking in a center level of the tracking error signal TE (Step S899) as shown in FIG. 28B is continued until a value of the timer T12 reaches a predetermined value t12 (Step S900; NO). If the value of the timer T12 reaches the predetermined value t12 (Step S900; YES), the operation of the timer T12 is finished (Step S901). The tracking balance in the first layer is adjusted (Step S902) on the basis of the value of the center level of the tracking error signal TE taken in the above manner.

A timer T13 is actuated (Step S903) in order to adjust the tracking gain in the first layer. A process of taking in a peak to peak value TEpp of the tracking error signal TE (Step S904) as shown in FIG. 28B is continued until a value of the timer T13 reaches a predetermined value t13 (Step S905; NO). If the value of the timer T13 reaches the predetermined value t13 (Step S905; YES), the timer T13 is stopped (Step S906). The tracking gain in the first layer is adjusted (Step S907) on the basis of the value of the peak to peak value TEpp of the tracking error signal TE taken in the above manner. The tracking servo is made close (Step S908). The tracking gain value in the first layer is stored in the RAM 135 (Step S909).

Next, in order to perform the above similar process for the second layer, the lens is jumped to a position relative to the second layer (Step S910), on the basis of the pulse width, the peak value, the brake time, the gain up time and the like for the previously stored kick pulse. The focus servo of the second layer is made close (Step S911) on the basis of the above calculated focus gain value for the second layer. Next, an operation of a timer T14 is started (Step S912) in order to adjust the tracking balance for the second layer. A process of taking in a center level of the tracking error signal TE (Step S913) as shown in FIG. 28C is continued until a value of the timer T14 reaches a predetermined value t14 (Step S914; NO). If the value of the timer T14 reaches the predetermined value t14 (Step S914; YES), the operation of the timer T14 is finished (Step S915). The tracking balance in the second layer is adjusted (Step S916) on the basis of a value of the center level of the tracking error signal TE taken in the above manner.

An operation of a timer T15 is started (Step S917) in order to adjust the tracking gain for the second layer. A process of taking in a peak to peak value TEpp of the tracking error signal TE (Step S918) as shown in FIG. 28C is continued until a value of the timer T15 reaches a predetermined value t15 (Step S919 ; NO). If the value of the timer T15 reaches the predetermined value t15 (Step S919; YES), the operation of the timer T15 is finished (Step S920). The tracking gain for the second layer is adjusted (Step S921) on the basis of a value of the peak to peak value TEpp of the tracking error signal TE taken in the above manner. The tracking servo is made close (Step S922). The tracking gain value for the second layer is stored in the RAM 135 (Step S923).

It is possible to perform the above mentioned processes to thereby perform the focus servo control and the tracking servo that are appropriate and accurate for each of the layers, and also possible to measure the interval between the two layers in the single layer to thereby set the optimally jumping condition. As a result, it is possible to jump between the layers accurately and quickly.

In the above mentioned examples, the present invention is applied to the apparatus which can reproduce both the CD and the DVD. However, the present invention is not limited to the examples. The apparatus dedicated to the DVD reproduction is allowable. Thus, it is not necessary that the optical pickup uses the above mentioned bifocal lens. It is allowable to use an optical pickup comprising a single-focus lens. Or, a type of switching between the respective lens for the CD and the DVD can be used similarly.

As for a moving direction of the lens at a time of measuring the interval between the layers, the example in which it is started from the up direction is explained. However, the present invention is not limited to the example. It is allowable to be started from the down direction.

In this embodiment, the pulse width, the peak value, the brake time and the gain up time for the focus jump are all selected, and all stored in the RAM. However, the present invention is not limited to it. It is allowable to select and store any one value or several values of them.

In this embodiment, the focus error signal resulting from the 0 order light is used to determine the interval between the layers in each of the record layers. However, it is possible to use the focus error signal resulting from the +1 order light or the pseudo light. At that time, an interval between the focus error signals is determined by properly changing a threshold.

In a case of a disk in which both surfaces of two layers are bonded together, it is possible to perform the various adjustments similar to this embodiment for two layers on an upper side and two layers on a lower side at a time of a first setup, to thereby record with layer information in the respective layers. Moreover, it is naturally possible to store and use a plurality of respective adjustment values with the information peculiar to the disk.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. In an information reproducing apparatus for reproducing information from a multiple layer disk, a method of preparing for reproducing the information from the multiple layer disk, the multiple layer disk comprising a plurality of layers including at least a first layer and a second layer, the information being recorded on each of the first layer and the second layer, the information reproducing apparatus comprising: a light emitting device that emits a light beam to the first layer or the second layer; an objective lens that focuses the light beam on the first layer or the second layer; a focus servo device that carries out a focus servo control for controlling a focal position of the light beam with respect to the first layer or the second layer; a tracking servo device that carries out a tracking servo control for controlling a position of the light beam in a radial direction of the multiple layer disk with respect to the first layer or the second layer; a reproducing device that reads the information recorded an the first layer or the second layer using the light beam and that reproduces the read information under the focus servo control and the tracking servo control; and a memory device, the method comprising the processes of:

determining a first gain value to be used for the focus servo control with respect to the first layer, by detecting a focus error signal with respect to the first layer;

determining a second gain value to be used for the focus servo control with respect to the second layer, by detecting a focus error signal with respect to the second layer; and storing the first and second gain values into the memory device, wherein the processes of determining the first and second gain values and the process of storing the first and second gain values are carried out before a start of reproducing the information from the multiple layer disk.

2. The method according to claim 1, wherein the process of determining the first gain value comprises the processes of:

detecting a first maximum amplitude value of the focus error signal with respect to the first layer by moving the objective lens in a direction perpendicular to a surface of the multiple layer disk; and determining the first gain value on the basis of the first maximum amplitude value, and the process of determining the second gain value comprises the processes of:

detecting a second maximum amplitude value of the focus error signal with respect to the second layer by moving the objective lens in a direction perpendicular to a surface of the multiple layer disk; and determining the second gain value on the basis of the second maximum amplitude value.

3. The method according to claim 2, wherein the first maximum amplitude value and the second maximum amplitude value are continuously detected while the objective lens performs a reciprocation motion one time.

4. In an information reproducing apparatus for reproducing information from a multiple layer disk, a method of preparing for reproducing the information from the multiple layer disk, the multiple layer disk comprising a plurality of layers including at least a first layer and a second layer, the information being recorded on each of the first layer and the second layer, the information reproducing apparatus comprising: a light emitting device that emits a light beam to the first layer or the second layer; an objective lens that focuses the light beam on the first layer or the second layer; a focus servo device that carries out a focus servo control for controlling a focal position of the light beam with respect to the first layer or the second layer; a tracking servo device that carries out a tracking servo control for controlling a position of the light beam in a radial direction of the multiple layer disk with respect to the first layer or the second layer; a reproducing device that reads the information recorded on the first layer or the second layer using the light beam and that reproduces the read information under the focus servo control and the tracking servo control; a memory device that stores various values, the method comprising the processes of:

determining a first gain value to be used for the tracking servo control with respect to the first layer, by detecting a tracking error signal with respect to the first layer;

determining a second gain value to be used for the tracking servo control with respect to the second layer, by detecting a tracking error signal with respect to the second layer; and storing the first and second gain values into the memory device, wherein the processes of determining the first and second gain values and the process of storing the first and second gain values are carried out before a start of reproducing the information from the multiple layer disk.

5. In an information reproducing apparatus for reproducing information from a multiple layer disk, a method of preparing for reproducing the information from the multiple layer disk the multiple layer disk comprising a plurality of layers including at least a first layer and a second layer, the information being recorded an each of the first layer and the second layer, the information reproducing apparatus comprising: a light emitting device that emits a light beam to the first layer or the second layer; an objective lens that focuses the light beam on the first layer or the second layer; a focus servo device that carries out a focus servo control for controlling a focal position of the light beam with respect to the first layer or the second layer; a tracking servo device that carries out a tracking servo control for controlling a position of the light beam in a radial direction of the multiple layer disk with respect to the first layer or the second layer: a reproducing device that reads the information recorded on the first layer or the second layer using the light beam and that reproduces the read information under the focus servo control and the tracking servo control; a memory device that stores various values, the method comprising the processes of:

determining a first offset amount value to be used for adjusting a tracking balance in the tracking servo control with respect to the first layer, by detecting a first center level of a tracking error signal with respect to the first layer;

determining a second offset amount value to be used for adjusting a tracking balance in the tracking servo control with respect to the second layer, by detecting a second center level of a tracking error signal with respect to the second layer; and storing the first and second offset amount values into the memory device, wherein the processes of determining the first and second offset amount values and the process of storing the first and second offset amount values are carried out before a start of reproducing the information from the multiple layer disk.

6. In an information reproducing apparatus for reproducing information from a multiple layer disk, a method of preparing for reproducing the information from the multiple layer disk, the multiple layer disk comprising a plurality of layers including at least a first layer and a second layer, the information being recorded on each of the first layer and the second layer, the information reproducing apparatus comprising: a light emitting device that emits a light beam to the first layer or the second layer; an objective lens that focuses the light beam on the first layer or the second layer; a focus servo device that carries out a focus servo control for controlling a focal position of the light beam with respect to the first layer or the second layer; a tracking servo device that carries out a tracking servo control for controlling a position of the light beam in a radial direction of the multiple layer disk with respect to the first layer or the second layer; a reproducing device that reads the information recorded on the first layer or the second layer using the light beam and that reproduces the read information under the focus servo control and the tracking servo control; a memory device that stores various values, the method comprising the processes of:

determining a first gain value to be used for the focus servo control with respect to the first layer, by detecting a focus error signal with respect to the first layer;

determining a second gain value to be used for the tracking servo control with respect to the first layer, by detecting a tracking error signal with respect to the first layer;

determining a third gain value to be used for the focus servo control with respect to the second layer, by detecting a focus error signal with respect to the second layer;

determining a fourth gain value to be used for the tracking servo control with respect to the second layer, by detecting a tracking error signal with respect to the second layer; and storing the first through fourth gain values into the memory device, wherein the processes of determining the first through fourth gain values and the process of storing the first through fourth gain values are carried out before a start of reproducing the information from the multiple layer disk.

7. In an information reproducing apparatus for reproducing information from a multiple layer disk, a method of preparing for reproducing the information from the multiple layer disk, the multiple layer disk comprising a plurality of layers including at least a first layer and a second layer, the information being recorded on each of the first layer and the second layer, the information reproducing apparatus comprising: a light emitting device that emits a light beam to the first layer or the second layer; an objective lens that focuses the light beam on the first layer or the second layer; a focus servo device that carries out a focus servo control for controlling a focal position of the light beam with respect to the first layer or the second layer; a tracking servo device that carries out a tracking servo control for controlling a position of the light beam in a radial direction of the multiple layer disk with respect to the first layer or the second layer; a reproducing device that reads the information recorded on the first layer or the second layer using the light beam and that reproduces the read information under the focus servo control and the tracking servo control; and a memory device, the method comprising the processes of:

determining a first equalizer value to be used for the focus servo control with respect to the first layer, by detecting a focus error signal with respect to the first layer;

determining a second equalizer value to be used for the focus servo control with respect to the second layer, by detecting a focus error signal with respect to the second layer; and storing the first and second equalizer values into the memory device, wherein the processes of determining the first and second equalizer values and the process of storing the first and second equalizer values are carried out before a start of reproducing the information from the multiple layer disk.

8. The method according to claim 7, wherein the process of determining the first equalizer value comprises the processes of:

detecting a first maximum amplitude value of the focus error signal with respect to the first layer by moving the objective lens in a direction perpendicular to a surface of the multiple layer disk; and determining the first equalizer value on the basis of the first maximum amplitude value, and the process of determining the second equalizer value comprises the processes of:

detecting a second maximum amplitude value of the focus error signal with respect to the second layer by moving the objective lens in a direction perpendicular to a surface of the multiple layer disk; and determining the second equalizer value on the basis of the second maximum amplitude value.

9. The method according to claim 8, wherein the first maximum amplitude value and the second maximum amplitude value are continuously detected while the objective lens performs a reciprocation motion one time.

10. In an information reproducing apparatus for reproducing information from a multiple layer disk, a method of preparing for reproducing the information from the multiple layer disk, the multiple layer disk comprising a plurality of layers including at least a first layer and a second layer, the information being recorded on each of the first layer and the second layer, the information reproducing apparatus comprising: a light emitting device that emits a light beam to the first layer or the second layer; an objective lens that focuses the light beam on the first layer or the second layer; a focus servo device that carries out a focus servo control for controlling a focal position of the light beam with respect to the first layer or the second layer; a tracking servo device that carries out a tracking servo control for controlling a position of the light beam in a radial direction of the multiple layer disk with respect to the first layer or the second layer; a reproducing device that reads the information recorded on the first layer or the second layer using the light beam and that reproduces the read information under the focus servo control and the tracking servo control; a memory device that stores various values, the method comprising the processess of:

determining a first equalizer value to be used for the tracking servo control with respect to the first layer, by detecting a tracking error signal with respect to the first layer;

determining a second equalizer value to be used for the tracking servo control with respect to the second layer, by detecting a tracking error signal with respect to the second layer; and storing the first and second equalizer values into the memory device, wherein the processes of determining the first and second equalizer values and the process of storing the first and second equalizer values are carried out before a start of reproducing the information from the multiple layer disk.

11. In an information reproducing apparatus for reproducing information from a multiple layer disk, a method of preparing for reproducing the information from the multiple layer disk, the multiple layer disk comprising a plurality of layers including at least a first layer and a second layer, the information being recorded on each of the first layer and the second layer, the information reproducing apparatus comprising: a light emitting device that emits a light beam to the first layer or the second layer; an objective lens that focuses the light beam on the first layer or the second layer; a focus servo device that carries out a focus servo control for controlling a focal position of the light beam with respect to the first layer or the second layer; a tracking servo device that carries out a tracking servo control for controlling a position of the light beam in a radial direction of the multiple layer disk with respect to the first layer or the second layer; a reproducing device that reads the information recorded on the first layer or the second layer using the light beam and that reproduces the read information under the focus servo control and the tracking servo control; a memory device that stores various values, the method comprising the processes of:

determining a first equalizer value to be used for the focus servo control with respect to the first layer, by detecting a focus error signal with respect to the first layer;

determining a second equalizer value to be used for the tracking servo control with respect to the first layer, by detecting a tracking error signal with respect to the first layer;

determining a third equalizer value to be used for the focus servo control with respect to the second layer, by detecting a focus error signal with respect to the second layer;

determining a fourth equalizer value to be used for the tracking servo control with respect to the second layer, by detecting a tracking error signal with respect to the second layer; and storing the first through fourth equalizer values into the memory device, wherein the processes of determining the first through fourth equalizer values and the process of storing the first through fourth equalizer values are carried out before a start of reproducing the information from the multiple layer disk.

* * * * *